US012205589B1

(12) United States Patent
Pemberton

(10) Patent No.: US 12,205,589 B1
(45) Date of Patent: Jan. 21, 2025

(54) PROCESSING SPECULATIVE DATA USING DATA HISTORY INFORMATION

(71) Applicant: Amazon Technologies, Inc., Seattle, WA (US)

(72) Inventor: Joe Pemberton, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 388 days.

(21) Appl. No.: 17/851,864

(22) Filed: Jun. 28, 2022

(51) Int. Cl.
G10L 15/22 (2006.01)
G10L 15/30 (2013.01)
G10L 17/22 (2013.01)

(52) U.S. Cl.
CPC .............. *G10L 15/22* (2013.01); *G10L 15/30* (2013.01); *G10L 17/22* (2013.01)

(58) Field of Classification Search
CPC .......... G10L 15/22; G10L 15/30; G10L 17/22
See application file for complete search history.

(56) References Cited

U.S. PATENT DOCUMENTS 10,685,669 B1 * 6/2020 Lan .......................... G10L 25/51
2016/0071107 A1 * 3/2016 Van .......................... G06F 21/00
705/44

* cited by examiner

Primary Examiner — Ibrahim Siddo
(74) Attorney, Agent, or Firm — Pierce Atwood LLP

(57) ABSTRACT

Techniques for processing speculative data using data history information are described. A system may receive, at a first component, first data and second data for use in a first operation. The component may use metadata associated with each of the first data and the second data to determine that the first data and the second data correspond to different versions of data of the same data type. Based on such a determination, the component may cease processing corresponding to the first operation with respect to the first data and the second data.

20 Claims, 20 Drawing Sheets

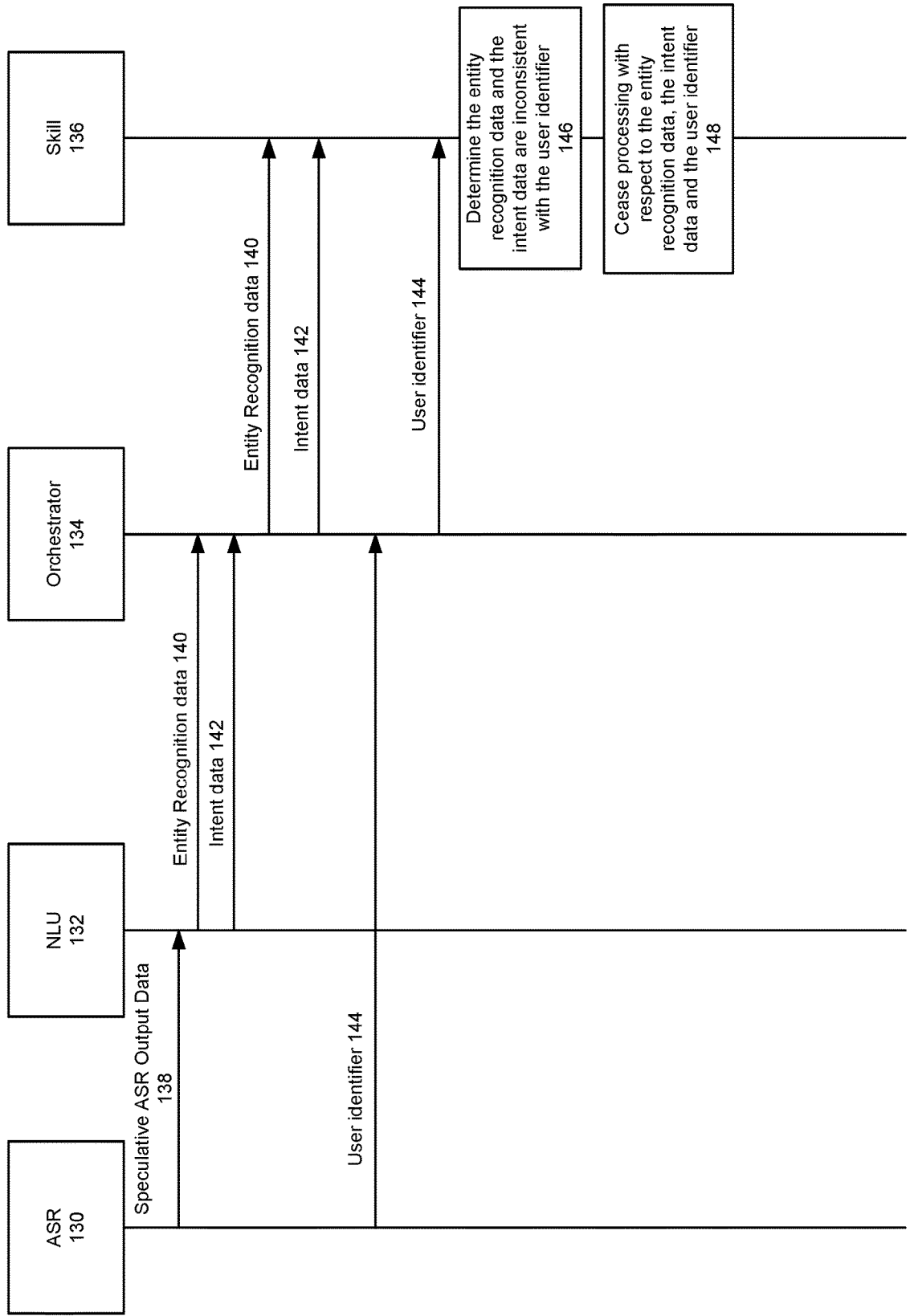

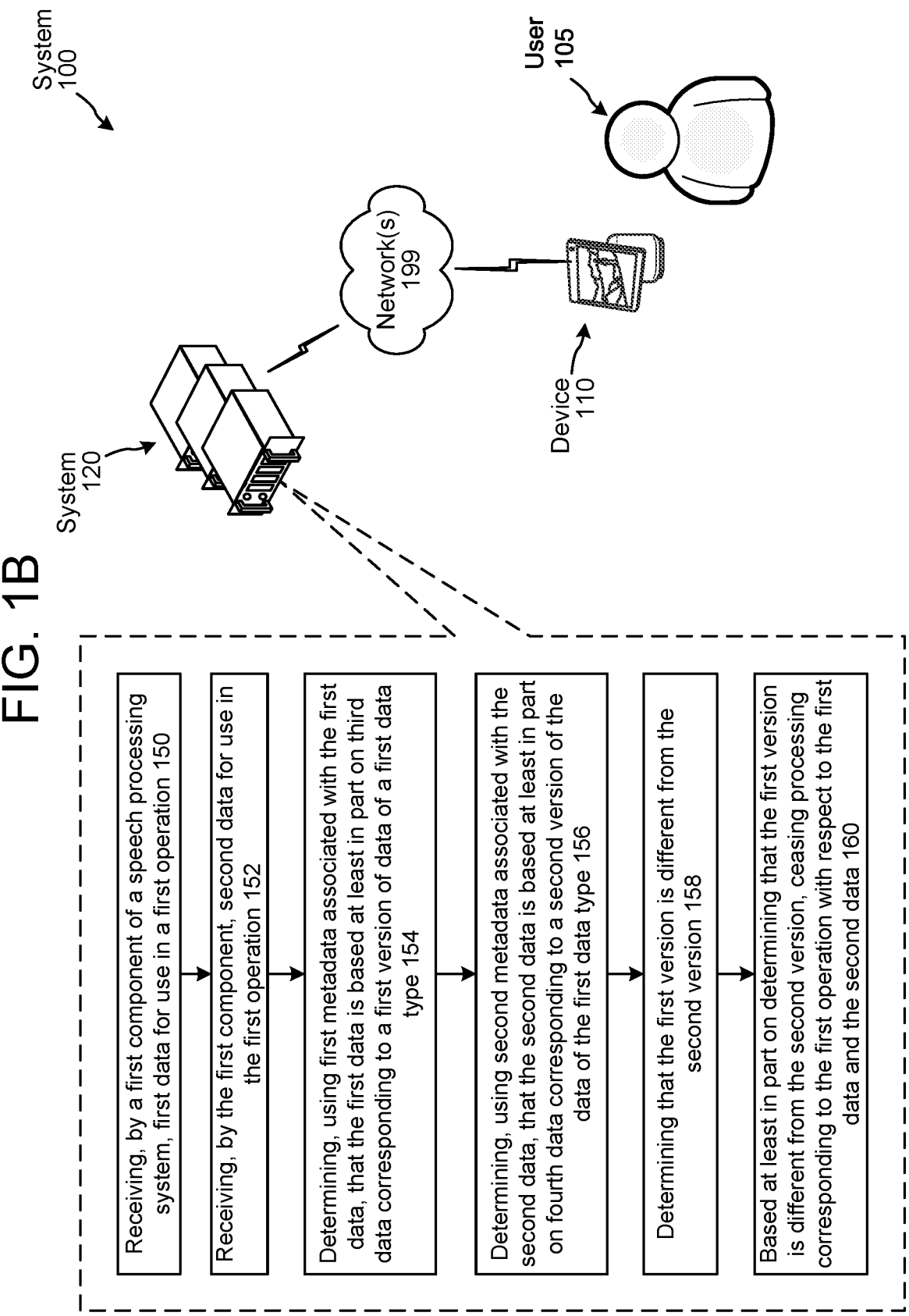

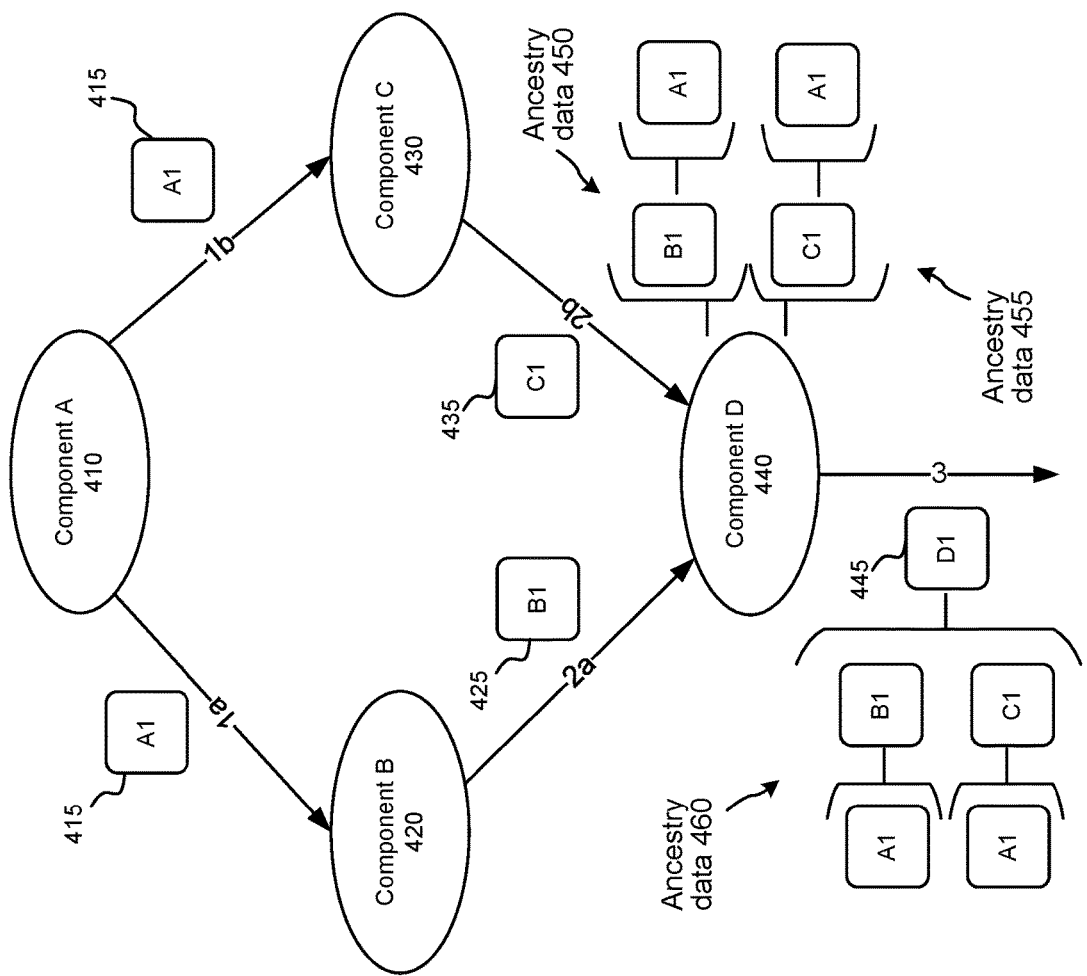

US 12,205,589 B1

PROCESSING SPECULATIVE DATA USING DATA HISTORY INFORMATION

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1A is a conceptual signal flow diagram illustrating example processing performable by a system for processing speculative data using ancestry data where the system uses ancestry data to determine that received data corresponds to different versions of a data type, according to embodiments of the present disclosure.

FIG. 1B is a conceptual diagram illustrating the system for processing speculative data using ancestry data, according to embodiments of the present disclosure.

FIG. 4A is a conceptual diagram illustrating further example processing performable by the system where the system uses ancestry data to determine that received data corresponds to the same version of a data type, according to embodiments of the present disclosure.

DETAILED DESCRIPTION

Figure 2A:
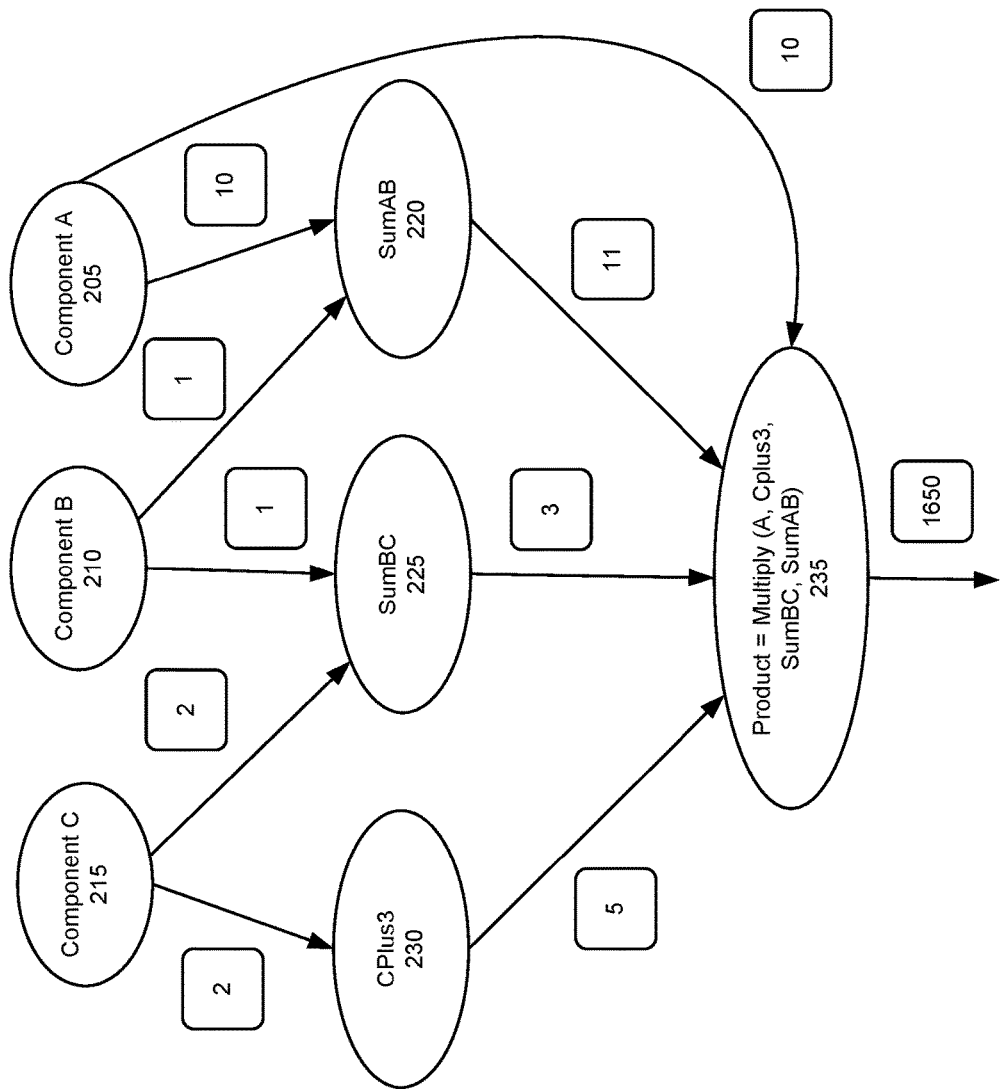
FIG. 2A is a conceptual diagram illustrating an example processing performable by the system where a component receives and processes data of the same version of a data type, according to embodiments of the present disclosure.

Automatic speech recognition (ASR) processing is concerned with transforming audio data including speech into a token or other textual representation of that speech. Similarly, natural language understanding (NLU) processing is concerned with enabling computers to derive meaning from natural language user inputs (such as spoken inputs). ASR processing and NLU processing are often used together as part of a spoken language processing component of a system. Text-to-speech (TTS) processing is concerned with transforming textual and/or other data into audio data that is synthesized to resemble human speech. Natural language generation (NLG) processing is concerned with automatically transforming data into natural language (e.g., English) content.

A system may be configured to cause actions to be performed in response to natural language user inputs (e.g., spoken and/or text-based natural language inputs). For example, for the natural language input "play workout music," a system may output music from a user's workout playlist. For further example, for the natural language input "turn on the lights," may turn on "smart" lights associated with a user's profile. In another example, for the natural language input "play my favorite movie," a system may output a movie tagged as a favorite movie in a profile of the user. In the foregoing examples, actions correspond to the outputting of music, the turning on of "smart" lights, and the outputting of the movie. Thus, as used herein, an "action" may refer to a result of, or an operation performed as part of, a system processing a natural language input.

A system orchestrates a processing workflow in order to process a natural language input. In at least some instances, the processing workflow may be implemented in a step-by-step sequential manner. For example, upon receiving audio data representing a spoken natural language input, a system may cause ASR processing to be performed on the audio data to generate ASR output data. Thereafter, the system may cause NLU processing to be performed on the ASR output data to generate NLU output data. As part of that NLU processing, or separately, the system may process context information to assist in the NLU processing and/or to re-rank or further process the NLU output data to determine which NLU output data to select for further processing (e.g., which NLU hypothesis is the most probable match to the natural language input). After that, the system may cause the selected NLU output data to be sent to a component (of the system) configured to select a skill to execute with respect to the NLU output data. Then, the system may cause the NLU output data to be sent to the skill to perform an action responsive to the natural language input.

As can be appreciated, system's orchestration of a natural language input processing workflow may be coded in a manner that causes components (of the system) to send data to other specific components of the system. In a sequential workflow, such as that described above, one specific component generally waits to execute until it receives its inputs from the upstream components whose outputs the specific component relies upon.

A system processing workflow does not necessarily have to operate in a sequential manner and indeed sometimes may operate partially in a reverse sequence. One benefit to operating in a non-sequential manner is that certain data that may be available earlier may be processed when it is available, even if the component that performs the processing may be further downstream. The system thus may implement a processing component-based processing workflow that defines system components, the data types to be input to the components, and the data types output by the components. Rather than wait for a first component to be called and then call a second component to process (as may be the situation in a system that implements its processing workflow sequentially), the system may commence processing of the second component prior to calling the first component to process, particularly if the data to be operated on by the second component is available prior to the first component finishing its processing. Further, particular types of data may be broken into several other types of data. For example, ASR output data may include a device identifier, a user identifier, and transcription data (e.g., data indicating words determined by an ASR component), a list or lattice of ASR hypotheses, ASR confidence scores, etc. For further example, NLU output data may include a ranked list of intents, entity recognition results, a list or lattice of NLU hypotheses, NLU confidence scores, etc. Rather than wait for the first component to complete the entirety of its processing, the first component may be configured to send portions of output data generated during processing to the second component. Such portions of output data may comprise preliminary results (e.g., an early ASR hypothesis prior to completion of ASR processing on an entire utterance), final, but partial, results (e.g., a user identifier that the ASR has finally determined even if the ASR component is still completing its transcription processing), updated results (e.g., a later ASR hypothesis to replace an earlier ASR hypothesis) and/or other data. The system may use these portions of output data, such as from an ASR component, NLU component, or any other component of the system, to operate in a non-sequential manner.

Determination of partial output data by a component, and/or processing of such partial output data by a downstream component, may result in what may be referred to as speculative data. Speculative data may include one or more portions of data which may correspond to one or more data types, where the one or more portions of data may not yet be confirmed as accurate/final by the system, even though the one or more portions of data may be determined to be accurate to some extent (e.g., correspond to a level of likelihood that meets a threshold). For example, if an ASR component outputs an early ASR hypothesis as an early "guess" as to the transcription of an utterance (but before the ASR component has finalized its processing), that early ASR hypothesis may be considered speculative data. Further, if that early ASR hypothesis is sent to an NLU component which processes the early ASR hypothesis to determine an early NLU hypothesis, that early NLU hypothesis may also be considered speculative data. Operations performed on speculative data may be referred to as speculative operations. If the early ASR hypothesis (and/or the early NLU hypothesis) is later confirmed to be correct, that particular batch of data may no longer be considered speculative and may be considered authoritative.

In some embodiments, a component may determine one or more portions of speculative data or authoritative data corresponding to the same data type in parallel. For example, after an ASR component finishes processing related to audio data, the ASR component may determine two speculative (or authoritative) top ASR hypotheses in parallel. The ASR component may send the two top ASR hypotheses to one or more instances of an NLU component, which may process the two top ASR hypotheses in parallel. Further, each instance of the NLU component may, after finishing processing related to each top ASR hypothesis, determine two speculative (or authoritative) top entity recognition hypotheses. Each instance of the NLU component may cause one or more instances of intent classification processing to be performed on each of its corresponding two top ASR hypotheses.

The system may be configured to send the speculative data from one component to other components (where those other components may be considered traditionally "downstream" or not) for processing before determining and/or acquiring authoritative data (e.g., data confirmed to be accurate). Authoritative data may be, for example, data confirmed to be accurate by a component. In some embodiments, the authoritative data may be determined by the component after the component has finalized processing related to the entirety of that data or after the component has determined speculative data. The system may further be configured to granulize a data type into its individual parts (e.g., NLU output data into ranked intents and entity recognition results, etc.) so that the system may perform speculative operations on individual portions of the data type. Further, the system may be configured to send the granulized data at different times and in a different order to different components that operate on such granulized data. This non-sequential distribution of data may allow different components to operate in a more parallel manner rather than waiting on serialized, sequential processing. Once the system determines the authoritative data, the system may send granulized portions of the authoritative data to the downstream components (e.g., the components that operate on such data) for further processing. As the system is capable of operating in a non-sequential manner, situations may arise where a downstream component may receive portions of data which correspond to speculative data and portions of data which correspond to authoritative data. In other words, the one or more downstream components may receive two or more portions of data which are associated with two or more different versions of data of the same/similar type (e.g., authoritative ASR output data and NLU output data determined using speculative ASR output data). For example, a component may receive at least a portion of authoritative ASR output data (or data determined from the authoritative ASR output data) and a portion of speculative NLU output data, which may have been determined from at least a portion of speculative ASR output data. Therefore, if the component were to perform processing on the at least a portion of authoritative ASR output data and the at least a portion of speculative NLU data, the component would be performing processing on at least two portions of data which are associated with two different versions of ASR output data (e.g., speculative ASR output data and authoritative ASR output data), which may correspond to different values, or the like.

Further, as stated above, the system may also be configured to operate in a sequential manner which includes generating multiple versions of data of the same data type in parallel, which may results in situations where a downstream component may receive portions of data which correspond to two different versions of speculative (or authoritative) data (e.g., parallel generation of two top ranked NLU hypotheses). As the system is capable of operating in a manner which results in the generation of multiple versions of speculative (or authoritative) data in parallel, situations may arise where a downstream component may receive portions of data which correspond to different versions of speculative (or authoritative) data of the same data type. In other words, the one or more downstream components may receive two or more portions of data which are associated with two or more different versions of data of the same/similar type. For example, a component may receive data determined from a first speculative (or authoritative) NLU hypothesis and data determined from a second speculative (or authoritative) NLU hypothesis. Therefore, if the component were to perform processing on the first data and the second data, the component would be performing processing on at least two portions of data which are associated with two different versions of speculative (or authoritative) NLU hypotheses, which may correspond to different values, or the like.

In some embodiments, the system may be configured to operate in both a non-sequential manner and a sequential manner that results in the parallel generation of multiple versions of data of the same data type.

Allowing a component to perform processing resulting from either of the above scenarios using the first and second portions of data which are associated with two or more different versions of data of the same/similar type may yield inaccurate results (as shown, for example, herein below in connection with FIGS. 2A and 2B).

The present disclosure provides, among other things, techniques for using ancestry data of two or more portions of data received at a component to determine whether the two or more portions of data are consistent with each other (e.g., correspond to/are based upon the same version of underlying data). The ancestry data (e.g., metadata representing the origin(s) of the particular piece of data) of a portion of data may represent previous ancestry data used to determine the portion of data. For example, if an NLU hypothesis was based on version 2.0 of an ASR hypothesis and the ASR hypothesis was based on version 1.5 of processed audio data, the ancestral history data for the NLU hypothesis may indicate something like [ASR data: 2.0; audio data: 1.5], or other examples, such as those discussed herein. The ancestry data for a portion of data may be sent to a component along with the portion of substantive data. A component may be configured to use the ancestry data to determine whether the two or more portions of data that the component is about to process correspond to the same version of data of the same data type. This may be done before the component performs substantive processing of the two or more portions of data. If the component determines that the two or more portions correspond to different versions of data of the same data type (e.g., correspond to different values of the same data type, corresponding to data created at different times or in different processing epochs, etc.), then the component will cease processing with respect to the two or more portions of data. The component may then wait until it receives updated data so the versions of the data are consistent with each other before proceeding with processing. If, instead, the component determines that the two or more portions are consistent with each other, then the component may perform processing with respect to the two or more portions of data. After performing processing with respect to the two or more portions of data, the component may update the ancestry data of the output data created by the component to indicate that the output data was determined from the particular portions of data. That is, the ancestry data for the output data may include the ancestry data of the two or more portions of data. Structuring components to generate and utilize ancestry data for portions of data received or determined allows components to safely execute on speculative/authoritative data and allow the components to make speculations on portions of data received from other components. Further, generating and utilizing ancestry data of portions of data allows components to minimize the amount of processing halted/the amount of re-execution needed in response to receiving authoritative data that is inconsistent with speculative data (as described herein below in connection with FIG. 4C).

Two or more portions of data may be determined to correspond to different versions of data of the same data type in a number of ways. A portion of data may correspond to a particular version of data when the ancestry data associated with the portion of data includes the particular version of data or data that was determined based on the particular version of data, among other things. In some embodiments, a component may determine that at least a portion of the ancestry data of the first portion of data and at least a portion of the ancestry data of the second portion of data correspond to different values of data of the same data type. For example, a first portion of data may correspond to a speculative ranking of NLU intents and a second portion of data may correspond to a different, authoritative ranking of NLU intents. The component may determine that the first and second portions correspond to different versions of data of the same data type based on the first and second portion corresponding to different rankings of NLU intents. In other embodiments, the component may determine that a similarity between at least a portion of the ancestry data of the first portion of data and at least a portion of the ancestry data of the second portion of data which correspond to data of the same data type fails to meet or exceed a threshold level of similarity. For example, the first portion of data may correspond to the speculative ranking of NLU intents and the second portion of data may correspond to an authoritative ranking of NLU intents, where the authoritative ranking of NLU intents includes a top-ranked NLU intent label different from the top-ranked NLU intent label of the speculative ranking of NLU intents. The component may determine that the first and second portions correspond to different versions of data of the same data type based on the first and second data corresponding to a different top-ranked NLU intent label. For further example, the first portion of data may correspond to a first authoritative ranking of NLU intents and the second portion of data may correspond to a second authoritative ranking of NLU intents output in parallel by a first component. A second component may determine that the first and second portions correspond to different versions of data of the same data type based on the first and second data corresponding to a different top-ranked NLU intent label. In still other embodiments, the component may determine that at least a portion of the ancestry data of the first portion of data and at least a portion of the ancestry data of the second portion of data which correspond to data of the same data type were generated during different periods of processing, where the period of processing may correspond to processing performed during a particular period of time. For example, the first portion of data may correspond to the speculative ranking of NLU intents determined during a first period of processing and the second portion of data may correspond to the authoritative ranking of NLU intents during a second, later period processing. The component may determine that the first and second portions correspond to different versions of data of the same data type based on the first and second portions of data corresponding to speculative and authoritative, respectively, rankings of NLU intents that were determine during different periods of processing. In still other embodiments, the component may determine that at least a portion of the ancestry data of the first portion of data and at least a portion of the ancestry data of the second portion of data which correspond to data of the same data type were generated during different branches of processing occurring during the same time period, where the different branches of processing correspond to the parallel generation and output of data of the same data type. For example, the first portion of data may correspond to a first authoritative ranking of NLU intents determined during a first period of processing and the second portion of data may correspond to a second authoritative ranking of NLU intents occurring in parallel during the first period of processing. The component may determine that the first and second portions correspond to different versions of data of the same data type based on the first and second portions of data corresponding to two different rankings of NLU intents that were determined as part of two different branches of processing performed during the first period of processing. In still other embodiments, the component may determine that, based on the data type, the amount of time since at least a portion of data corresponding to the ancestry data of the first portion of data was generated/determined meets or exceeds a threshold. For example, the first portion of data may correspond to first user presence data determined at a first time and the second portion of data may correspond to second user presence data determined at a second time. The component may determine that the first and second portions of data correspond to different versions of data of the data type based on the first portion of data corresponding to the first user presence data and the time since the first user presence data was generated/determined meeting or exceeding a threshold.

FIG. 1A illustrates an example signal flow scenario of a system configured to send portions of data and corresponding ancestry data to downstream components, where a downstream component may determine that portions of data received from one or more other components correspond to different versions of data of the same data type. With reference to FIG. 1A, an ASR component 130 may send speculative ASR output data 138 to an NLU component 132. The NLU component 132 may use the speculative ASR output data 138 to determine speculative NLU output data including entity recognition data 140 and intent data 142, and send the entity recognition data 140, the intent data 142, and associated ancestry data to an orchestrator component 134. The orchestrator component 134 may send the entity recognition data 140, the intent data 142, and associated ancestry data to the skill component 136. Thereafter, the ASR component 130 may determine authoritative ASR output data including a user identifier 144 and send the user identifier 144 to the orchestrator component 134. The orchestrator component 134 may send the user identifier 144 and the associated ancestry data to the skill component 136.

The skill component 136 may determine (146) the entity recognition data 140 and the intent data 142 are inconsistent with the user identifier 144. For example, the skill component 136 may use the ancestry data received along with the entity recognition data 140, the intent data 142, and the user identifier 144 to determine that the entity recognition data 140 and the intent data 142 correspond to speculative NLU output data which corresponds to the speculative ASR output data 138, and that the user identifier 144 corresponds to authoritative ASR output data. Based at least in part on determining that the entity recognition data 140 and the intent data 142 correspond to a different version of ASR output data than the user identifier 144, the skill component 136 may determine the received data is inconsistent. The skill component 136 may then cease (148) processing with respect to the entity recognition data 140, the intent data 142, and the user identifier 144.

FIG. 1B illustrates a system configured to send portions of data and corresponding ancestry data to downstream components. Although the figures and discussion of the present disclosure illustrate certain steps in a particular order, the steps described may be performed in a different order (as well as certain steps removed or added) without departing from the present disclosure. Further, while certain examples of the system may focus on a language/speech processing system, the present techniques may be used in other systems that perform non-sequential or similar processing.

As shown in FIG. 1B, the system 100 may include a device 110 (local to a user 105) in communication with a system 120 across one or more networks 199. The network(s) 199 may include a local or private network or may include a wide network such as the Internet. While the user 105 is illustrated as a human, other types of users (e.g., computing systems) may exist.

The device 110 may receive audio corresponding to a spoken natural language input of the user 105. The device 110 may generate audio data representing the audio, and may send the audio data to the system 120. Alternatively, the device 110 may receive a text-based (e.g., typed) natural language input from the user 105. The device 110 may generate text data representing the text-based natural language input, and may send the text data to the system 120. In at least some instances, the device 110 may include a camera that captures a sequence of images representing the user 105 performing a gesture. In these instances, the device 110 may send image data (representing the sequence of images) and/or an indication of the gesture performed to the system 120 (and the system 120 may determine the gesture is associated with a particular natural language input in storage). In at least some embodiments, the device 110 may include a motion sensor configured to detect motion. In these embodiments, when the device 110 detects movement, the device 110 may send data representing the detected movement to the system 120 (and the system 120 may determine the detected movement is associated with a particular natural language input in storage). Each of the foregoing (e.g., audio data representing a spoken natural language input, text data representing a text-based natural language input, image or other data representing a performed gesture, and sensor data) may corresponding to a different trigger event as each of the foregoing may commence processing by the system 120.

The system 120 receives data representing a trigger event. For example, the system 120 may receive audio data representing a spoken natural language input, text data representing the text-based natural language input, image data representing the performance of a gesture, or motion sensor data representing detected motion. The system 120 may commence processing of the trigger event by initiating processing of one or more components.

With reference once more to FIG. 1B, a first component of the system 120 may receive (150) first data for use in a first operation. In some embodiments, the first data may correspond to data representing the trigger event. In other embodiments, the first data may correspond to data received from another component of the system 120. For example, the first data may correspond to at least a portion of NLU output data.

The first component of the system 120 may also receive (152) second data for use in the first operation. Similar to the first data, in some embodiments, the second data may correspond to data representing the trigger event. In other embodiments, the second data may correspond to data received from another component of the system 120. In still other embodiments, the second data may correspond to a different version of data of the same data type as the first data. For example, the second data may correspond to a user identifier.

The first component may further receive metadata associated with the first data and receive metadata associated with the second data. In some embodiments the metadata associated with the first and second data may correspond to ancestry data associated with the first data and second data, respectively. Ancestry data for a present portion of data may represent previous operations performed by the system 120 (or component of the system 120 or the device 110) that resulted in the generation of the present portion of data, the data used in the previous operations to generate the present portion of data, the component(s) that performed the previous operations, and the ancestry data of the data used in the previous operations to generate the present portion of data.

With reference once more to FIG. 1B, the first component (or the system 120) may determine (154), using first metadata associated with the first data, that the first data is based at least in part on third data corresponding to a first version of data of a first data type. As discussed above, the first metadata associated with the first data may represent an ancestry history of the first data, including previous data operations performed to generate the first data. For example, the first component may use the first metadata associated with the portion of NLU output data to determine that the portion of NLU output data is based at least in part on a first version of ASR output data (e.g., speculative ASR output data).

Similar to the first metadata, the first component (or the system 120) may determine (156), using second metadata associated with the second data, that the second data is based at least in part on fourth data corresponding to a second version of data of the first data type. For example, the first component may use the first metadata associated with the user identifier to determine that the user identifier is based at least in part on a second version of the ASR output data (e.g., authoritative ASR output data).

The first component (or the system 120) may determine (158) that the first version of the data of the first data type is different from the second version of the data of the second data type. For example, the first component (or the system 120) may determine that the first version of the ASR output data is different than the second version of the ASR output data.

Based at least in part on determining that the first version is different from the second version, the first component (or the system 120) may cease (160) processing corresponding to the first operation with respect to the first data and the second data. For example, based at least in part on determining that the first version of the ASR output data is different from the second version of the ASR output data, the first component (or the system 120) may cease processing corresponding to the first operation with respect to the NLU output data and the user identifier.

Figure 2B:
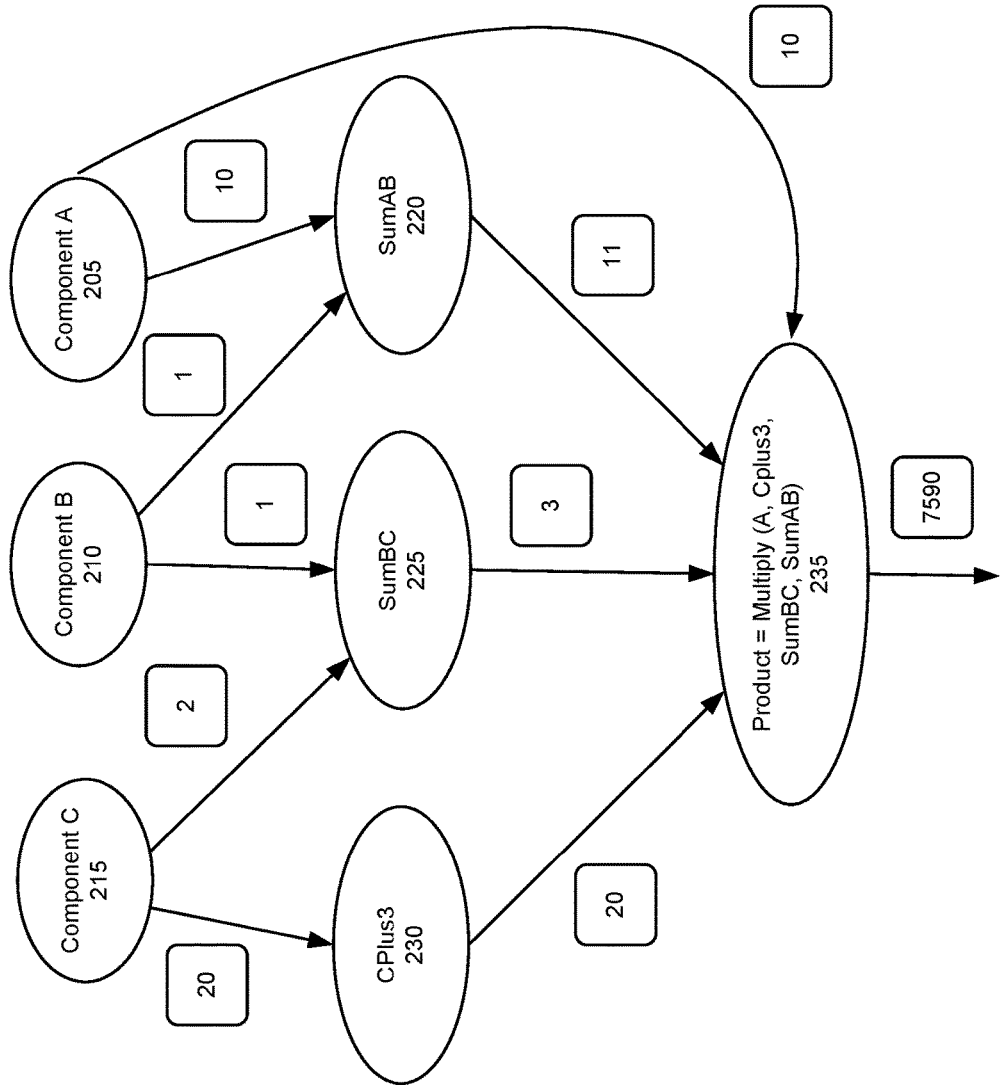
FIG. 2B is a conceptual diagram illustrating further example processing performable by the system where a component receives and processes data of different versions of a data type, according to embodiments of the present disclosure.

FIGS. 2A-2B illustrate example flows where a sample component 235 performs a multiplication operation based on data received from other components. These figures illustrate the potential collisions that may occur if inconsistent speculative data is used to perform operations, or if speculative data is updated in a manner that then renders it inconsistent. In each of these figures the components are configured to perform the following operations:

Component 205: Output A
Component 210: Output B
Component 215: Output C
Component 220: perform the operation A+B
Component 225: perform the operation B+C
Component 230: perform the operation C+3
Component 235: multiply the results of components 205, 220, 225, and 230

As illustrated in FIG. 2A, a component A 205 may send data with a value 10 to the sumAB component 220 and to the product component 235. A component B 210 may send data with a value of 1 to the sumAB component 220 and to the sumBC component 225. A component C 215 may send data with a value of 2 to the sumBC component 225 and to the cPlus3 component 220. The sumAB component 220 may perform an addition operation on the data received from the component A 205 and component B 210 to determine data with a value of 11 and send the data to the product component 235. The sumBC component 225 may perform an addition operation on the data received from the component B 210 and the component C 215 to determine data with a value of 3 and send the data to the product component 235. The cPlus3 component 230 may perform an addition operation on the data received from component C 215 to determine data with a value of 5 and send the data to the product component 235. The product component 235 may perform a multiplication operation on the data received from the component A 205, the sumAB component 220, the sumBC component 225, and the cPlus3 component 230 and correctly determine data with a value of 1650.

FIG. 2B illustrates an example flow where a product component 235 performs a multiplication operation based on data received from other components, where the data received corresponds to inconsistent versions of data of the same data type. FIG. 2B includes similar steps to those of FIG. 2A, except that the component C 215 may generate second data with a value of 20 and may send the second data (e.g., a second version of data output by the component C 215) to the cPlus3 component 230 before sending the data with the value of 2 to the cPlus3 component 230. As a result, the cPlus3 component 230 may determine data of a value of 20 and may send the data to the product component 235. The product component may receive the data from the component A 205, the sumAB component 220, the sumBC component 225, and the cPlus3 component 230 and incorrectly determine data with a value of 7590.

As illustrated in FIGS. 2 and 2B, the output of the product component 235 is data with a value of 1650 if the product component 235 performs the multiplication operation using consistent data and the output of the product component 235 is data with a value of 7590 if the product component 235 performs the multiplication operation using inconsistent data (e.g., using the data determined using the first data output by the component C 215 and the data determined using the second data output by the component C 215). If, instead, each of the components 205, 210, 215, 220, 225, 230 sent ancestry data along with the data output by each of the components 205, 210, 215, 220, 225, 230, then the product component 235 would be able to determine that, in FIG. 2B, the data received from the components 205, 220, 225, 230 were inconsistent (corresponded to different versions of data output by the component C 215).

Figure 3:
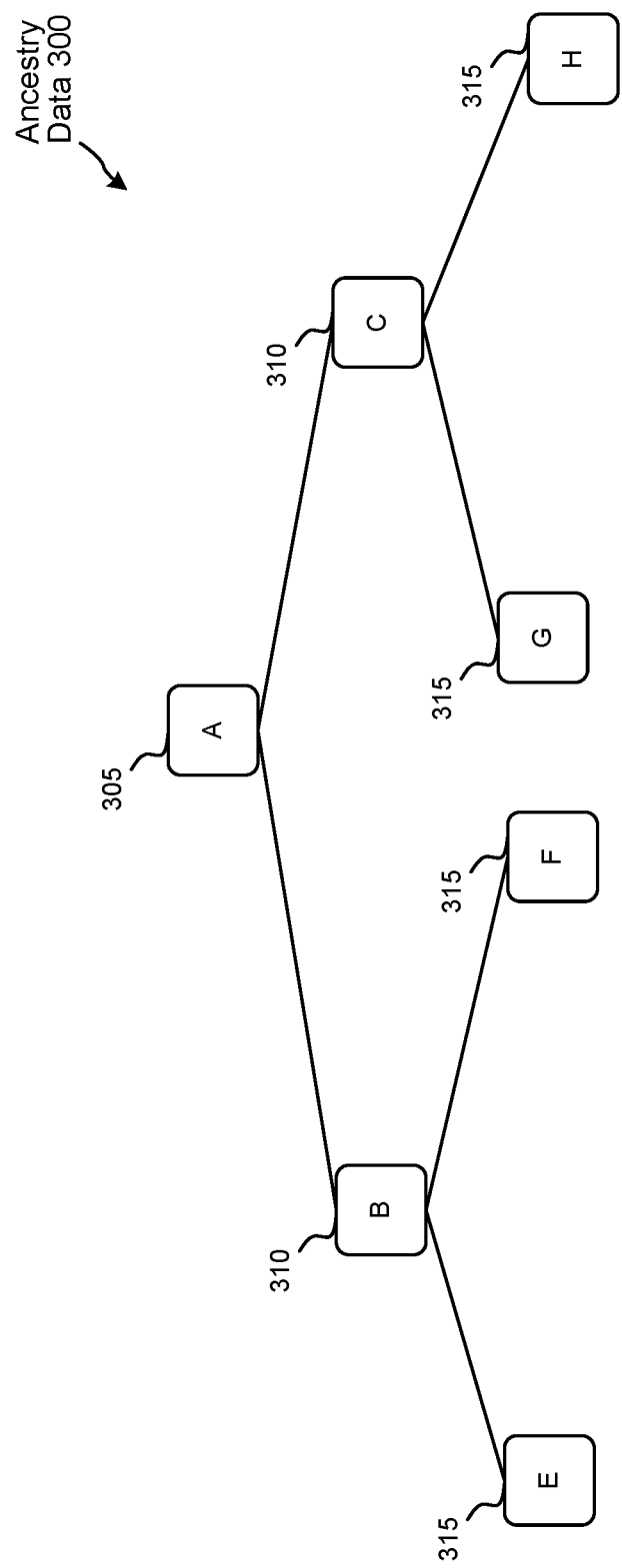
FIG. 3 is a conceptual diagram illustrating an example structure of ancestry data, according to embodiments of the present disclosure.

In some embodiments, the ancestry data for a portion of data may be represented as a tree structure. FIG. 3 represents an example representation of the ancestry data 300, where the root node 305 of the ancestry data 300 represents the portion of data for which the ancestry data 300 is associated with and the child nodes 310, 315 of the root node represents previous data used to determine the portion of the data. In some embodiments, the ancestry data 300 may include the root node 305 and the earliest corresponding child node (e.g., the child nodes 315). In other embodiments, the ancestry data 300 may include the root node 305 and the most recent corresponding child node (e.g., the child nodes 310). In some embodiments, a component may determine whether two or more portions of data are consistent by performing a union data operation on the ancestry data for both portions of data. If the output of the union data operation represents that the ancestry data for both portions of data include different versions of data of the same data type, the component may determine that the portions of data are inconsistent and may cease processing with respect to the portions of data. For example, the ancestry data for a portion of NLU output data may represent that the portion of NLU output data is based at least in part on a first version of ASR output data, and that the first version of ASR output data may be based at least in part on a second version of audio data. The ancestry data for the portion of NLU output data may further represent that the portion of NLU output data is further based at least in part on a third version of a user identifier, and that the user identifier is also based at least in part on the first version of the ASR output data.

FIG. 4A illustrates an example data flow including a component D 440 determining whether data received from component B 420 and component C 430 is consistent. With reference to FIG. 4A, the component A 410 may generate data A1 415, which corresponds to a first version of data type A, and may send (at step 1a) the data A1 415 to component B 420 and may send (at step 1b) the data A1 415 to component C 430. Component B 420 receives the data A1 415 and may use the data A1 415 to generate data B1 425, which may correspond to a first version of data type B, and may send (at step 2a) the data B1 425 to component D 440.

Component C 430 receives the data A1 415 and may use the data A1 415 to generate data C1 435, which may correspond to a first version of data type C, and may send (at step 2b) the data C1 435 to component D 440. Component D 440 may receive the data B1 425 and the data C1 435 and determine ancestry data 450 for the data B1 425 and ancestry data 455 for the data C1 435. As shown in FIG. 4A, component D 440 may use the ancestry data 450 and ancestry data 455 to determine that both the data B1 425 and the data C1 435 correspond to first versions of data type B and C, respectively, and are based at least in part on a first version of data type A (i.e., the data A1 415). In response to determining that both the data B1 425 and the data C1 435 are based at least in part on first versions of the data A1 415, the data B1 425, and the data C1 435, component D 440 may determine that the data B1 425 and the data C1 435 are consistent and may generate data D1 445 and send (at step 3) the data D1 445 for further processing (or output). In some embodiments, in addition to generating the data 415, 425, 435, 445, each component 410, 420, 430, 440 may generate ancestry data for the generated data 415, 425, 435, 445 and send the ancestry data along with the generated data 415, 425, 435, 445. In some embodiments, the ancestry data may include the received data (and the corresponding ancestry data) used to generate the data 415, 425, 435, 445. For example, before sending the data D1 445 for further processing (or output), component D 440 may generate ancestry data 460 for the data D1 445. The ancestry data 460 may include the data B1 425, the ancestry data 450, the data C1 435, and the ancestry data 455.

Figure 4B:
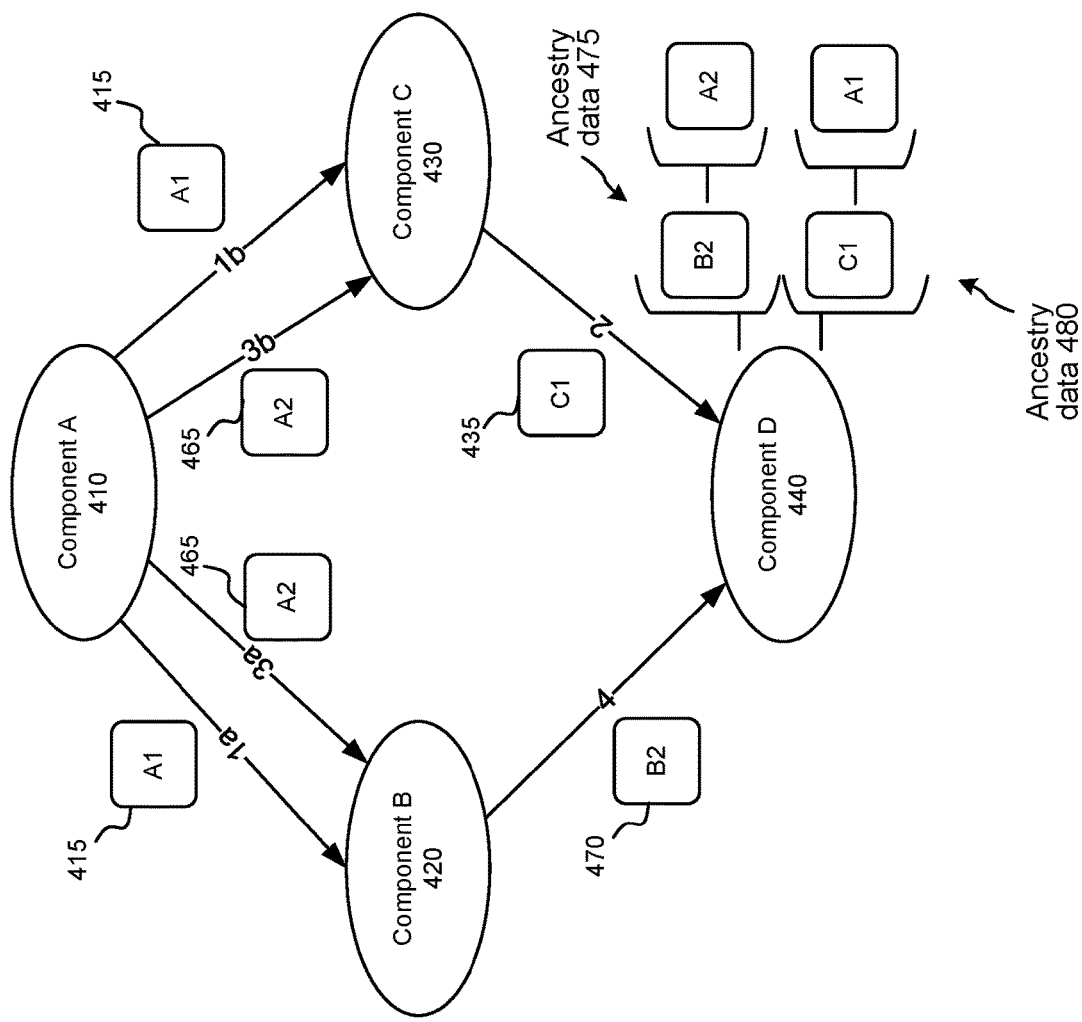
FIG. 4B is a conceptual diagram illustrating further example processing performable by the system where the system uses ancestry data to determine that received data corresponds to different versions of a data type, according to embodiments of the present disclosure.

FIG. 4B illustrates another example flow including the component D 440 determining whether data received from component B 420 and component C 430 is consistent. With reference to FIG. 4B, the component A 410 may generate data A1 415, which may correspond to a first version of data type A, and may send (at step 1a) the data A1 415 to component B 420 and may send (at step 1b) the data A1 415 to component C 430. Component C 430 receives the data A1 415 and may use the data A1 415 to generate data C1 435, which may correspond to a first version of data type C, and may send (at step 2) the data C1 435 to component D 440. Thereafter, component A 410 may generate the data A2 465, which may correspond to a second version of data type A, and send (at step 3a) the data A2 465 to component B 420 and send (at step 3b) the data A2 465 to component C 430. Component B 420 may receive the data A1 415 and the data A2 465 and, before generating and/or sending data B1 (not illustrated) to component D 440, may generate data B2 470 and send (at step 4) the data B2 470 to component D 440. As the data B2 470 was generated based on the data A2 465, which corresponds to a second version of data type A, the data B2 470 may correspond to a second version of data type B. Component D 440 receives the data C1 435 and the data B2 470, and may determine ancestry data 475 and 480 for the data C1 435 and the data B2 470. Component D 440 may determine, using the ancestry data 475 and 480, that the data C1 435 and the data B2 470 correspond to different versions of data type A (e.g., were determined based on the data A1 415 and the data A2 465, respectively), and are therefore inconsistent. Based on determining that the data C1 435 and the data B2 470 are inconsistent, component D 440 may cease processing with respect to the data C1 435 and the data B2 470.

In some embodiments, a component (or the system 120) may determine that portions of data received is inconsistent (e.g., corresponds to different versions of data of the same data type), and that other portions of the data received is unrelated to the portions of data determined to be inconsistent (e.g., corresponds to different versions of data of a different data type and/or is for use in a second operation), then the component (or the system 120) may cease processing corresponding to the first operation with respect to the inconsistent data and may perform processing corresponding to the second operation with respect to the other portions of data. Such an embodiment is illustrated in FIG. 4C.

Figure 4C:
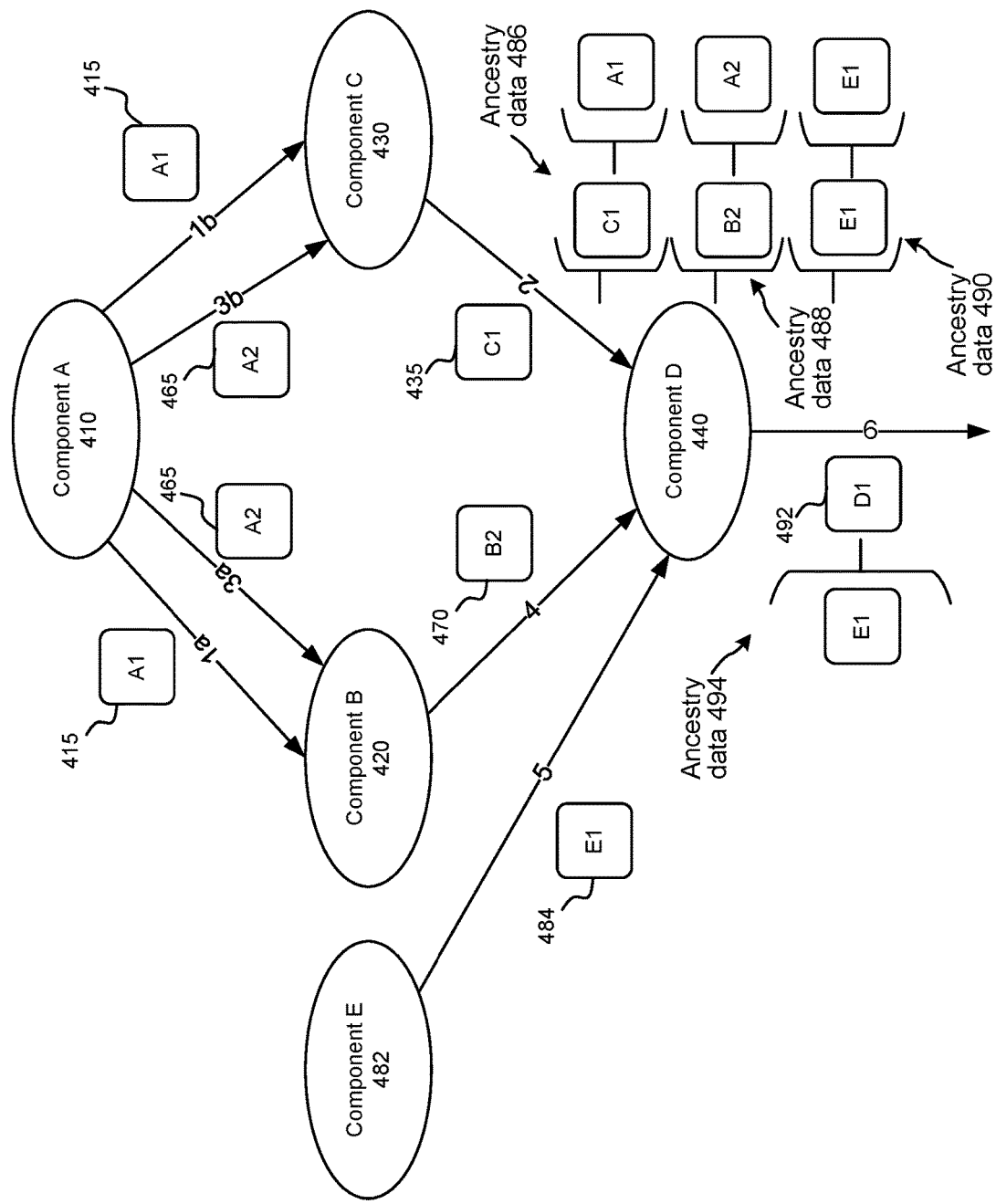
FIG. 4C is a conceptual diagram illustrating further example processing performable by the system where the system uses ancestry data to determine that only a portion of received data corresponds to different versions of a data type, according to embodiments of the present disclosure.

With reference to FIG. 4C, the component A 410 may generate data A1 415, which may correspond to a first version of data type A, and may send (at step 1*a*) the data A1 415 to component B 420 and may send (at step 1*b*) the data A1 415 to component C 430. Component C 430 receives the data A1 415 and may use the data A1 415 to generate data C1 435, which may correspond to a first version of data type C, and may send (at step 2) the data C1 435 to component D 440. Thereafter, component A 410 may generate data A2 465, which may correspond to a second version of data type A, and send (at step 3*a*) the data A2 465 to component B 420 and send (at step 3*b*) the data A2 465 to component C 430. Component B 420 may receive the data A1 415 and the data A2 465 and, before generating and/or sending data B1 (not illustrated) to component D 440, may generate the data B2 470 and send (at step 4) the data B2 470 to component D 440. As the data B2 470 was generated based on the data A2 465, which corresponds to a second version of data type A, the data B2 470 may correspond to a second version of data type B. Further, before component B 420 generates, and/or sends the data B1 to component D 440, a component E 482 may generate data E1 484, which may correspond to a first version of data type E, and send (at step 5) the data E1 484 to component D 440. Component D 440 receives the data C1 435, the data B2 470, and the data E1 484, and may determine ancestry data 486, 488, 490 for the data C1 435, the data B2 470, and the data E1 484, respectively. Component D 440 may determine, using the ancestry data 486, 488, 490, that the data C1 435 and the data B2 470 correspond to different versions of data type A (e.g., were determined based on the data A1 415 and the data A2 465, respectively) and are therefore inconsistent. Based on determining that the data C1 435 and the data B2 470 are inconsistent, component D 440 may cease processing with respect to the data C1 435 and the data B2 470. Component D 440 may further determine that the data E1 484 corresponds to a first version of data type E, and is unrelated to the data type A. Based on determining that the data E1 484 is unrelated to the data type A, component D may determine that the data E1 484 is not inconsistent, and component D 440 may perform processing with respect to the data E1 484. In some embodiments, performing processing with respect to the data E1 484 includes generating data D1 492 based on the data E1 484. Component D 440 may send (at step 6) the data D1 492 for further processing (or output). As illustrated, component D 440 may generate ancestry data 494 for the data D1 492 and send (at step 6) the ancestry data 494 along with the data D1 492.

Figure 5:
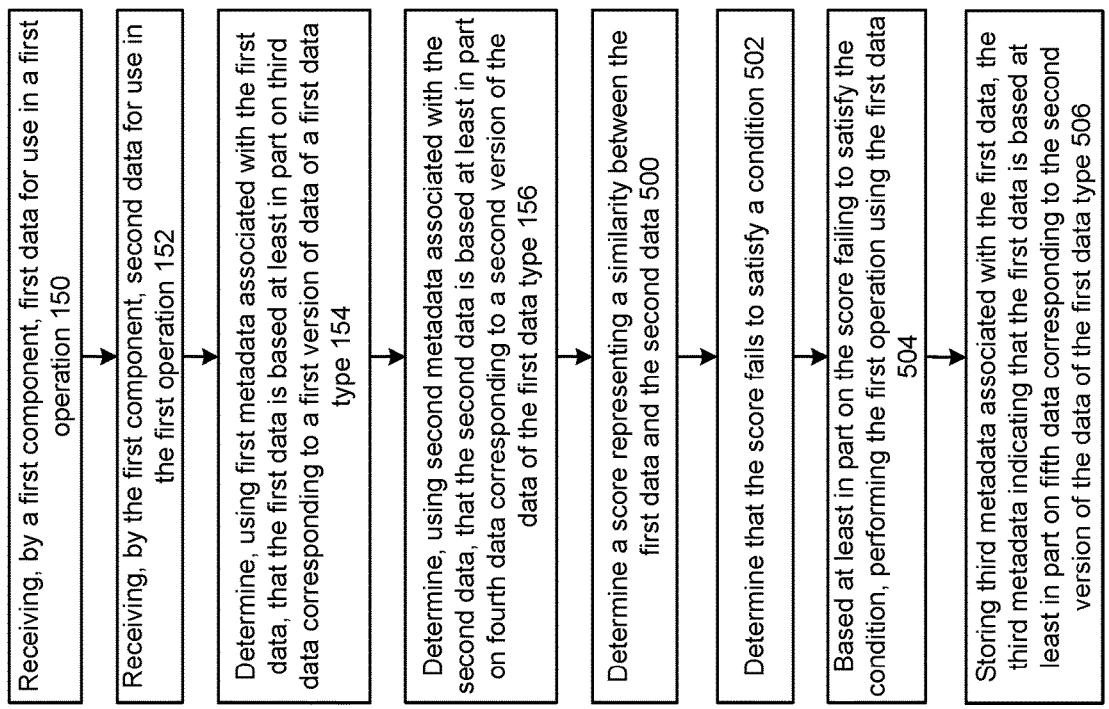
FIG. 5 is a conceptual diagram illustrating further example processing performable by the system where the system employs a threshold for determining whether received data that corresponds to different versions of a data type should be halted and/or re-executed, according to embodiments of the present disclosure.

As stated herein above, in some implementations, a component may implement a threshold of dissimilarity for determining whether two or more portions of data are inconsistent and that the component, therefore, should cease processing with respect to the two or more portions of data. For example, and with respect to FIG. 5, the system 100 may perform a process where a first component (or the system 120) may receive (150) first data for use in a first operation and receive (152) second data for use in the first operation. The first component (or the system 120) may determine (154), using first metadata associated with the first data, that the first data is based at least in part on third data corresponding to a first version of data of a first data type. The first component (or the system 120) may also determine (156), using second metadata associated with the second data, that the second data is based at least in part on fourth data corresponding to a second version of the data of the first type. For example, the first data may correspond to data determine using a first version (e.g., speculative) of ranked NLU intents and the second data may correspond to a second version (e.g., authoritative) of ranked NLU intents. The first component (or the system 120) may determine (500) a score representing a similarity between the first version of the data of the first data type and the second version of the data of the data type. The first component (or the system 120) may determine (502) that the score fails to satisfy a condition. In some implementations, the condition may be that the similarity meet a particular threshold of similarity. For example, the component may determine that the difference between the first version of ranked NLU intents and the second version of ranked NLU intents corresponds to the scores of the ranked NLU intents, but the top-ranked labels of NLU intents are the same. The component may determine that a difference in only the scores of the ranked NLU intents, and not the top-ranked labels of NLU intents, does not meet or exceed a threshold level of dissimilarity. Based at least in part on the score failing to satisfy the condition, the first component (or the system 120) may perform (504) the first operation using the first data. As the first operation is performed using the first data, rather than the second data, the ancestry data of the resulting data will include the ancestry data of the first data which corresponds to the first version of the first data type, which may cause inconsistencies with other data in downstream processing. Therefore, after performing the first operation using the first data, the first component (or the system 120) may store (506) third metadata associated with the first data which indicates that the first data is based at least in part on fifth data corresponding to the second version of the data of the first type. For example, the component may update the ancestry of the data that corresponds to the first version of ranked NLU intents to represent that the data corresponds to the second version of ranked NLU intents.

In some embodiments, a component may receive both authoritative data and speculative data that corresponds to the same data type, and may determine that the authoritative data and the speculative data also correspond to the same data (i.e., the speculation represented by the speculative data was correct). In response to such a determination, the component may cease processing with respect to only the authoritative data and may continue processing with respect to the speculative data. For example, a component may receive speculative ASR output data and, at some point after receiving the speculative ASR output data, may also receive authoritative ASR output data. The speculative ASR output data may represent a speculation (e.g., a guess) that the textual representation of a user input corresponds to "please turn on the kitchen lights." The component may determine that the authoritative ASR output text data also corresponds to "please turn on the kitchen lights." Based on determining that the speculative ASR output data and the authoritative ASR output data correspond to the same data (i.e., that the textual representation of the user input correspond to "please turn on the kitchen light"), the component may determine that the speculation represented by the speculative ASR output data was correct, and may cease processing with respect to the authoritative ASR output data and continue processing with respect to the speculative ASR output data.

Figure 6:
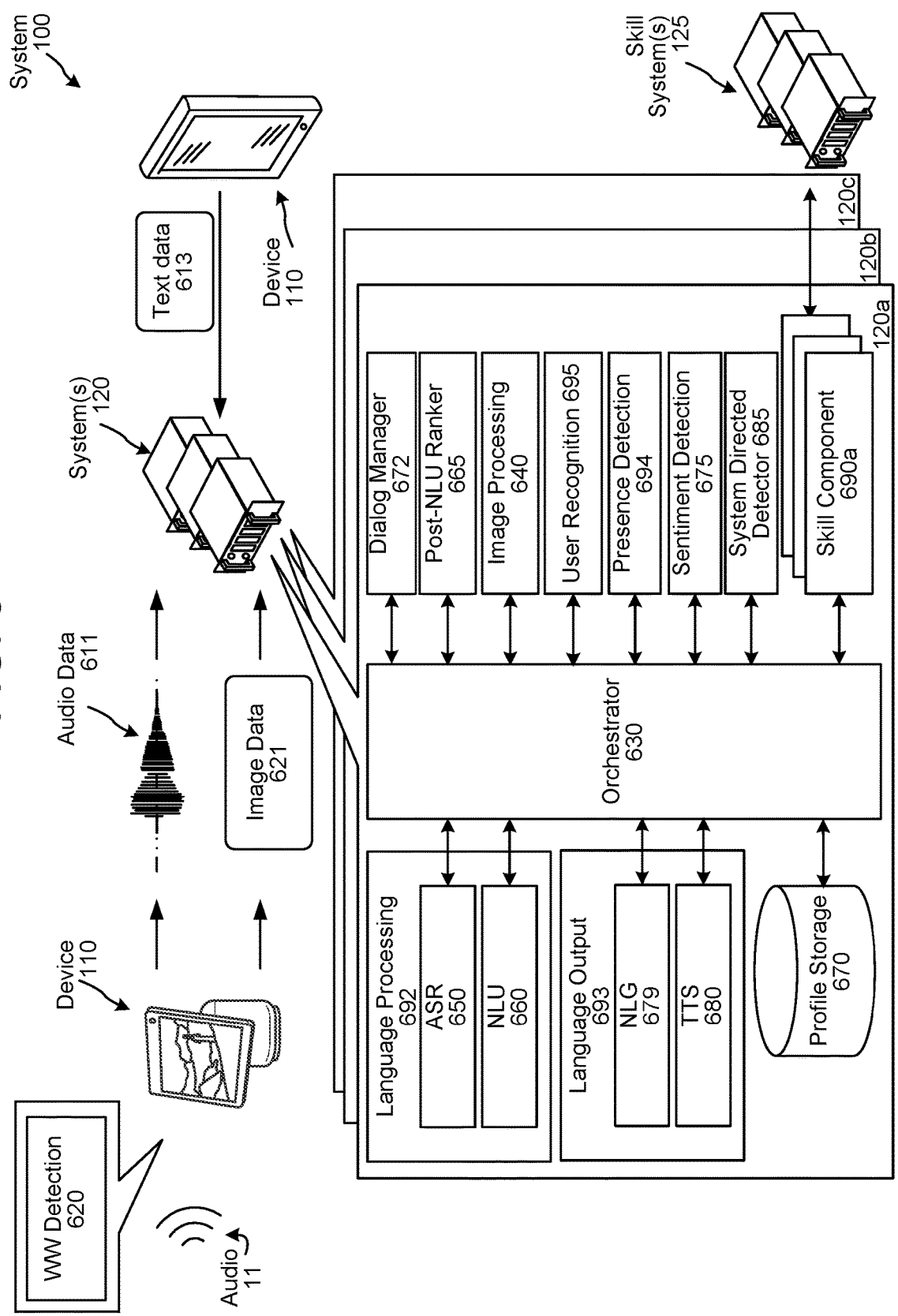
FIG. 6 is a conceptual diagram of components of a system, according to embodiments of the present disclosure.

The system 100 may operate using various components as described in FIG. 6. The various components may be located on same or different physical devices. Communication between various components may occur directly or across a network(s) 199. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/system 120. In at least some embodiments, such determination may be made using a wakeword detection component 620. The wakeword detection component 620 may be configured to detect various wakewords. In at least some examples, each wakeword may correspond to a name of a different digital assistant. An example wakeword/digital assistant name is "Alexa." In another example, input to the system may be in form of text data 613, for example as a result of a user typing an input into a user interface of device 110. Other input forms may include indication that the user has pressed a physical or virtual button on device 110, the user has made a gesture, etc. The device 110 may also capture images using camera(s) 1418 of the device 110 and may send image data 621 representing those image(s) to the system 120. The image data 621 may include raw image data or image data processed by the device 110 before sending to the system 120. The image data 621 may be used in various manners by different components of the system to perform operations such as determining whether a user is directing an utterance to the system, interpreting a user command, responding to a user command, etc.

The wakeword detection component 620 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 620 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 620 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 620 and/or input is detected by an input detector, the device 110 may "wake" and begin transmitting audio data 611, representing the audio 11, to the system(s) 120. The audio data 611 may include data corresponding to the wakeword; in other embodiments, the portion of the audio corresponding to the wakeword is removed by the device 110 prior to sending the audio data 611 to the system(s) 120. In the case of touch input detection or gesture based input detection, the audio data may not include a wakeword.

In some implementations, the system 100 may include more than one system 120. The systems 120 may respond to different wakewords and/or perform different categories of tasks. Each system 120 may be associated with its own wakeword such that speaking a certain wakeword results in audio data be sent to and processed by a particular system. For example, detection of the wakeword "Alexa" by the wakeword detection component 620 may result in sending audio data to system 120a for processing while detection of the wakeword "Computer" by the wakeword detector may result in sending audio data to system 120b for processing. The system may have a separate wakeword and system for different skills/systems (e.g., "Dungeon Master" for a game play skill/system 120c) and/or such skills/systems may be coordinated by one or more skill(s) 690 of one or more systems 120.

The device 110 may also include a system directed detector 785. (The system 120 may also include a system directed detector 685 which may operate in a manner similar to system directed detector 785.) The system directed detector 785 may be configured to determine whether an input to the system (for example speech, a gesture, etc.) is directed to the system or not directed to the system (for example directed to another user, etc.). The system directed detector 785 may work in conjunction with the wakeword detection component 620. If the system directed detector 785 determines an input is directed to the system, the device 110 may "wake" and begin sending captured data for further processing (for example, processing audio data using the language processing 692/792, processing captured image data using image processing component 640/740 or the like). If data is being processed the device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed detector 785 determines an input is not directed to the system (such as a speech or gesture directed to another user) the device 110 may discard the data and take no further action for processing purposes. In this way the system 100 may prevent processing of data not directed to the system, thus protecting user privacy. As an indicator to the user, however, the system may output an audio, visual, or other indicator when the system directed detector 785 is determining whether an input is potentially device directed. For example, the system may output an orange indicator while considering an input, and may output a green indicator if a system directed input is detected. Other such configurations are possible.

Upon receipt by the system(s) 120, the audio data 611 may be sent to an orchestrator component 630. The orchestrator component 630 may include memory and logic that enables the orchestrator component 630 to transmit various pieces and forms of data to various components of the system, as well as perform other operations as described herein.

The orchestrator component 630 may send the audio data 611 to a language processing component 692. The language processing component 692 (sometimes also referred to as a spoken language understanding (SLU) component) includes an automatic speech recognition (ASR) component 650 and a natural language understanding (NLU) component 660. The ASR component 650 may transcribe the audio data 611 into text data. The text data output by the ASR component 650 represents one or more than one (e.g., in the form of an N-best list) ASR hypotheses representing speech represented in the audio data 611. The ASR component 650 interprets the speech in the audio data 611 based on a similarity between the audio data 611 and pre-established language models. For example, the ASR component 650 may compare the audio data 611 with models for sounds (e.g., acoustic units such as phonemes, senons, phones, etc.) and sequences of sounds to identify words that match the sequence of sounds of the speech represented in the audio data 611. The ASR component 650 sends the text data generated thereby to an NLU component 660, via, in some embodiments, the orchestrator component 630. The text data sent from the ASR component 650 to the NLU component 660 may include a single top-scoring ASR hypothesis or may include an N-best list including multiple top-scoring ASR hypotheses. An N-best list may additionally include a respective score associated with each ASR hypothesis represented therein. The ASR component 650 is described in greater detail below with regard to FIG. 8.

The speech processing system 692 may further include a NLU component 660. The NLU component 660 may receive the text data from the ASR component. The NLU component 660 may attempts to make a semantic interpretation of the phrase(s) or statement(s) represented in the text data input therein by determining one or more meanings associated with the phrase(s) or statement(s) represented in the text data. The NLU component 660 may determine an intent representing an action that a user desires be performed and may determine information that allows a device (e.g., the device 110, the system(s) 120, a skill component 690, a skill system(s) 125, etc.) to execute the intent. For example, if the text data corresponds to "play the $5^{th}$ Symphony by Beethoven," the NLU component 660 may determine an intent that the system output music and may identify "Beethoven" as an artist/composer and "5th Symphony" as the piece of music to be played. For further example, if the text data corresponds to "what is the weather," the NLU component 660 may determine an intent that the system output weather information associated with a geographic location of the device 110. In another example, if the text data corresponds to "turn off the lights," the NLU component 660 may determine an intent that the system turn off lights associated with the device 110 or the user 5. However, if the NLU component 660 is unable to resolve the entity—for example, because the entity is referred to by anaphora such as "this song" or "my next appointment"—the speech processing system 692 can send a decode request to another speech processing system 692 for information regarding the entity mention and/or other context related to the utterance. The speech processing system 692 may augment, correct, or base results data upon the audio data 611 as well as any data received from the other speech processing system 692.

The NLU component 660 may return NLU output data 1085/1025 (which may include tagged text data, indicators of intent, etc.) back to the orchestrator component 630. The orchestrator component 630 may forward the NLU results data to a skill component(s) 690. If the NLU results data includes a single NLU hypothesis, the NLU component 660 and the orchestrator component 630 may direct the NLU results data to the skill component(s) 690 associated with the NLU hypothesis. If the NLU results data 1085/1025 includes an N-best list of NLU hypotheses, the NLU component 660 and the orchestrator component 630 may direct the top scoring NLU hypothesis to a skill component(s) 690 associated with the top scoring NLU hypothesis. The system may also include a post-NLU ranker 665 which may incorporate other information to rank potential interpretations determined by the NLU component 660. The local device 110 may also include its own post-NLU ranker 765, which may operate similarly to the post-NLU ranker 665. The NLU component 660, post-NLU ranker 665 and other components are described in greater detail below with regard to FIGS. 9 and 10.

A skill component may be software running on the system(s) 120 that is akin to a software application. That is, a skill component 690 may enable the system(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system(s) 120 may be configured with more than one skill component 690. For example, a weather service skill component may enable the system(s) 120 to provide weather information, a car service skill component may enable the system(s) 120 to book a trip with respect to a taxi or ride sharing service, a restaurant skill component may enable the system(s) 120 to order a pizza with respect to the restaurant's online ordering system, etc. A skill component 690 may operate in conjunction between the system(s) 120 and other devices, such as the device 110, in order to complete certain functions. Inputs to a skill component 690 may come from speech processing interactions or through other interactions or input sources. A skill component 690 may include hardware, software, firmware, or the like that may be dedicated to a particular skill component 690 or shared among different skill components 690.

A skill system(s) 125 may communicate with a skill component(s) 690 within the system(s) 120 and/or directly with the orchestrator component 630 or with other components. A skill system(s) 125 may be configured to perform one or more actions. An ability to perform such action(s) may sometimes be referred to as a "skill." That is, a skill may enable a skill system(s) 125 to execute specific functionality in order to provide data or perform some other action requested by a user. For example, a weather service skill may enable a skill system(s) 125 to provide weather information to the system(s) 120, a car service skill may enable a skill system(s) 125 to book a trip with respect to a taxi or ride sharing service, an order pizza skill may enable a skill system(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 120 may be configured with a skill component 690 dedicated to interacting with the skill system(s) 125. Unless expressly stated otherwise, reference to a skill, skill device, or skill component may include a skill component 690 operated by the system(s) 120 and/or skill operated by the skill system(s) 125. Moreover, the functionality described herein as a skill or skill may be referred to using many different terms, such as an action, bot, app, or the like. The skill 690 and or skill system(s) 125 may return output data to the orchestrator 630.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system(s) 100 may include a dialog manager component 672 that manages and/or tracks a dialog between a user and a device. As used herein, a "dialog" may refer to data transmissions (such as relating to multiple user inputs and system 100 outputs) between the system 100 and a user (e.g., through device(s) 110) that all relate to a single "conversation" between the system and the user that may have originated with a single user input initiating the dialog. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component 672 may associate a dialog session identifier with the dialog upon identifying that the user is engaging in a dialog with the user. The dialog manager component 672 may track a user input and the corresponding system generated response to the user input as a turn. The dialog session identifier may correspond to multiple turns of user input and corresponding system generated response. The dialog manager component 672 may transmit data identified by the dialog session identifier directly to the orchestrator component 630 or other component. Depending on system configuration the dialog manager 672 may determine the appropriate system generated response to give to a particular utterance or user input of a turn. Or creation of the system generated response may be managed by another component of the system (e.g., the language output component 693, NLG 679, orchestrator 630, etc.) while the dialog manager 672 selects the appropriate responses. Alternatively, another component of the system(s) 120 may select responses using techniques discussed herein. The text of a system generated response may be sent to a TTS component 680 for creation of audio data corresponding to the response. The audio data may then be sent to a user device (e.g., device 110) for ultimate output to the user. Alternatively (or in addition) a dialog response may be returned in text or some other form.

The dialog manager 672 may receive the ASR hypothesis/hypotheses (i.e., text data) and make a semantic interpretation of the phrase(s) or statement(s) represented therein. That is, the dialog manager 672 determines one or more meanings associated with the phrase(s) or statement(s) represented in the text data based on words represented in the text data. The dialog manager 672 determines a goal corresponding to an action that a user desires be performed as well as pieces of the text data that allow a device (e.g., the device 110, the system(s) 120, a skill 690, a skill system(s) 125, etc.) to execute the intent. If, for example, the text data corresponds to "what is the weather," the dialog manager 672 may determine that that the system(s) 120 is to output weather information associated with a geographic location of the device 110. In another example, if the text data corresponds to "turn off the lights," the dialog manager 672 may determine that the system(s) 120 is to turn off lights associated with the device(s) 110 or the user(s) 5.

The dialog manager 672 may send the results data to one or more skill(s) 690. If the results data includes a single hypothesis, the orchestrator component 630 may send the results data to the skill(s) 690 associated with the hypothesis. If the results data includes an N-best list of hypotheses, the orchestrator component 630 may send the top scoring hypothesis to a skill(s) 690 associated with the top scoring hypothesis.

The system 120 includes a language output component 693. The language output component 693 includes a natural language generation (NLG) component 679 and a text-to-speech (TTS) component 680. The NLG component 679 can generate text for purposes of TTS output to a user. For example the NLG component 679 may generate text corresponding to instructions corresponding to a particular action for the user to perform. The NLG component 679 may generate appropriate text for various outputs as described herein. The NLG component 679 may include one or more trained models configured to output text appropriate for a particular input. The text output by the NLG component 679 may become input for the TTS component 680. Alternatively or in addition, the TTS component 680 may receive text data from a skill 690 or other system component for output.

The NLG component 679 may include a trained model. The NLG component 679 generates text data from dialog data received by the dialog manager 672 such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates.

Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 680.

The TTS component 680 may generate audio data (e.g., synthesized speech) from text data using one or more different methods. Text data input to the TTS component 680 may come from a skill component 690, the orchestrator component 630, or another component of the system. In one method of synthesis called unit selection, the TTS component 680 matches text data against a database of recorded speech. The TTS component 680 selects matching units of recorded speech and concatenates the units together to form audio data. In another method of synthesis called parametric synthesis, the TTS component 680 varies parameters such as frequency, volume, and noise to create audio data including an artificial speech waveform. Parametric synthesis uses a computerized voice generator, sometimes called a vocoder.

The device 110 may include still image and/or video capture components such as a camera or cameras to capture one or more images. The device 110 may include circuitry for digitizing the images and/or video for transmission to the system(s) 120 as image data. The device 110 may further include circuitry for voice command-based control of the camera, allowing a user 5 to request capture of image or video data. The device 110 may process the commands locally or send audio data 611 representing the commands to the system(s) 120 for processing, after which the system(s) 120 may return output data that can cause the device 110 to engage its camera.

Upon receipt by the system(s) 120, the image data 621 may be sent to an orchestrator component 630. The orchestrator component 630 may send the image data 621 to an image processing component 640. The image processing component 640 can perform computer vision functions such as object recognition, modeling, reconstruction, etc. For example, the image processing component 640 may detect a person, face, etc. (which may then be identified using user recognition component 695). The device may also include an image processing component 740 which operates similarly to image processing component 640.

In some implementations, the image processing component 640 can detect the presence of text in an image. In such implementations, the image processing component 640 can recognize the presence of text, convert the image data to text data, and send the resulting text data via the orchestrator component 630 to the language processing component 692 for processing by the NLU component 660.

Figure 11:
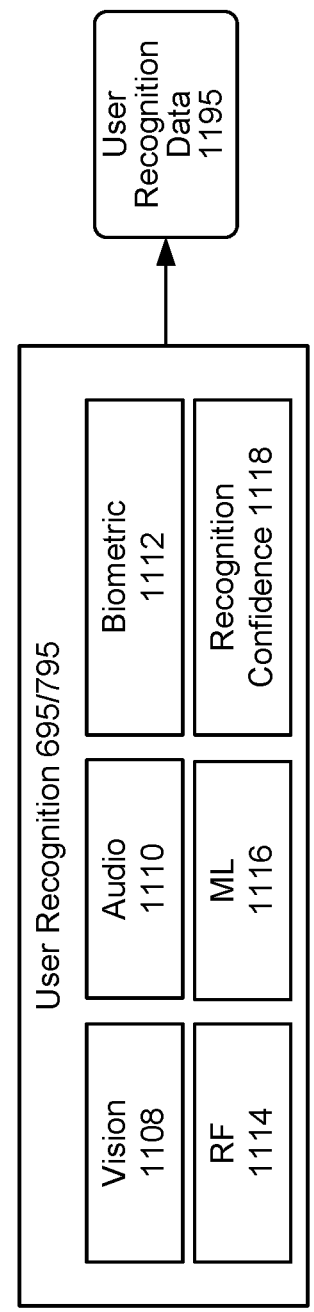
FIG. 11 is a schematic diagram of an illustrative architecture in which sensor data is combined to recognize one or more users, according to embodiments of the present disclosure.

The system(s) 120 may include a user recognition component 695 that recognizes one or more users using a variety of data, as described in greater detail below with regard to FIGS. 11-12. However, the disclosure is not limited thereto, and the device 110 may include a user recognition component 795 instead of and/or in addition to user recognition component 695 of the system(s) 120 without departing from the disclosure. User recognition component 795 operates similarly to user recognition component 695.

The user-recognition component 695 may take as input the audio data 611 and/or text data output by the ASR component 650. The user-recognition component 695 may perform user recognition by comparing audio characteristics in the audio data 611 to stored audio characteristics of users. The user-recognition component 695 may also perform user recognition by comparing biometric data (e.g., fingerprint data, iris data, etc.), received by the system in correlation with the present user input, to stored biometric data of users assuming user permission and previous authorization. The user-recognition component 695 may further perform user recognition by comparing image data (e.g., including a representation of at least a feature of a user), received by the system in correlation with the present user input, with stored image data including representations of features of different users. The user-recognition component 695 may perform additional user recognition processes, including those known in the art.

The user-recognition component 695 determines scores indicating whether user input originated from a particular user. For example, a first score may indicate a likelihood that the user input originated from a first user, a second score may indicate a likelihood that the user input originated from a second user, etc. The user-recognition component 695 also determines an overall confidence regarding the accuracy of user recognition operations.

Output of the user-recognition component 695 may include a single user identifier corresponding to the most likely user that originated the user input. Alternatively, output of the user-recognition component 695 may include an N-best list of user identifiers with respective scores indicating likelihoods of respective users originating the user input. The output of the user-recognition component 695 may be used to inform NLU processing as well as processing performed by other components of the system.

The system(s) 120/device 110 may include a presence detection component 694/794 that determines the presence and/or location of one or more users using a variety of data.

The system 100 (either on device 110, system 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 670 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system 120 with permission to allow the skill to execute with respect to the user's natural language user inputs. If a user does not enable a skill, the system 120 may not invoke the skill to execute with respect to the user's natural language user inputs.

The profile storage 670 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 670 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system(s) 120 may also include a sentiment detection component 675 that may be configured to detect a sentiment of a user from audio data representing speech/utterances from the user, image data representing an image of the user, and/or the like. The sentiment detection component 675 may be included in system(s) 120, as illustrated in FIG. 6, although the disclosure is not limited thereto and the sentiment detection component 675 may be included in other components without departing from the disclosure. For example, the sentiment detection component 775 may be included in the device 110, as a separate component, etc. Sentiment detection component 775 may operate similarly to sentiment detection component 675. The system 120 may use the sentiment detection component 675 to, for example, customize a response for a user based on an indication that the user is happy or frustrated.

Figure 7:
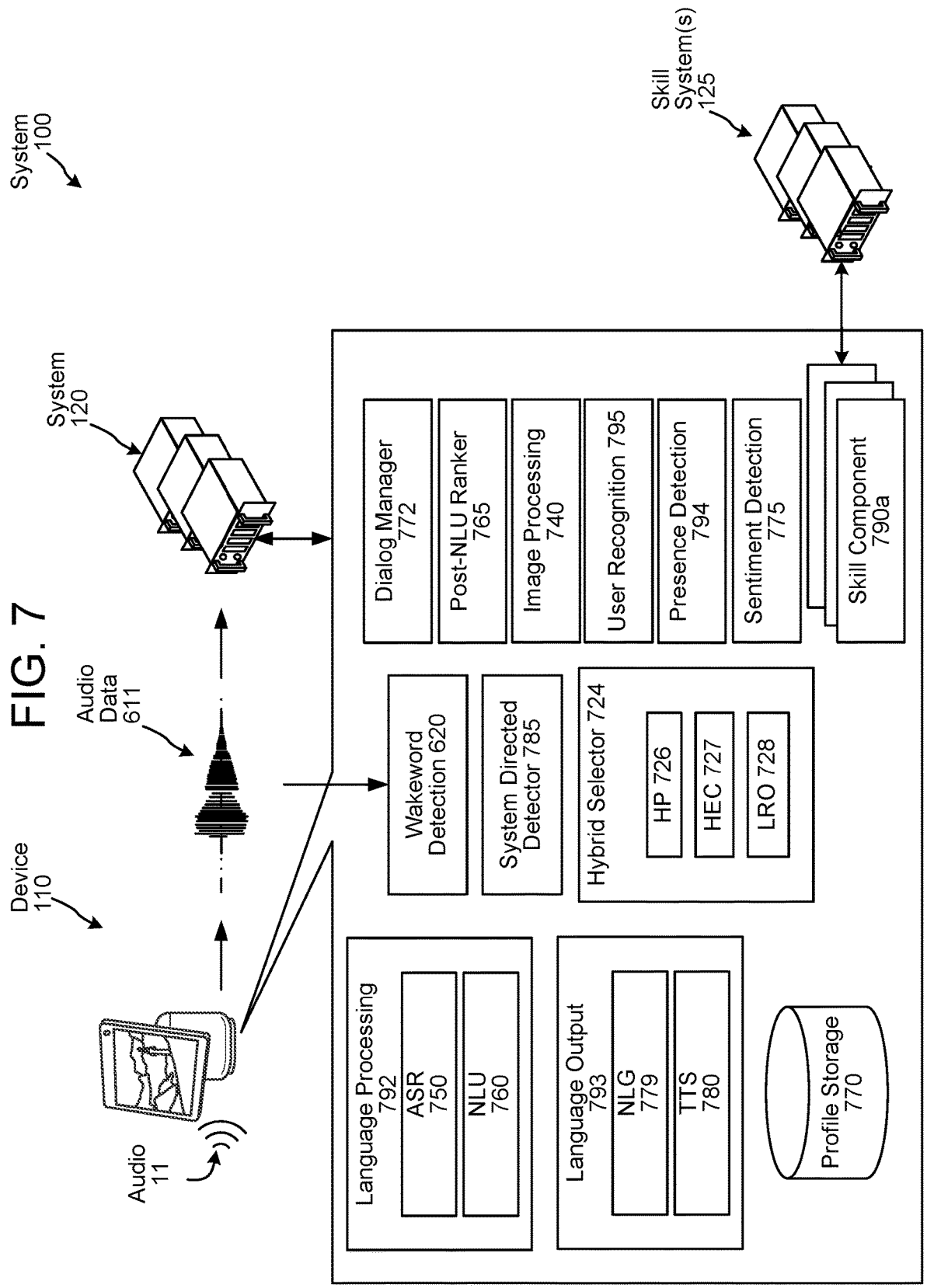
FIG. 7 is a conceptual diagram illustrating components that may be included in a device, according to embodiments of the present disclosure.

Although the components of FIG. 6 may be illustrated as part of system(s) 120, device 110, or otherwise, the components may be arranged in other device(s) (such as in device 110 if illustrated in system(s) 120 or vice-versa, or in other device(s) altogether) without departing from the disclosure. FIG. 7 illustrates such a configured device 110.

In at least some embodiments, the system 120 may receive the audio data 611 from the device 110, to recognize speech corresponding to a spoken input in the received audio data 611, and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output an audible response (e.g., using TTS processing performed by an on-device TTS component 780) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 6, the device 110 may include a wakeword detection component 620 configured to compare the audio data 611 to stored models used to detect a wakeword (e.g., "Alexa") that indicates to the device 110 that the audio data 611 is to be processed for determining NLU output data (e.g., slot data that corresponds to a named entity, label data, and/or intent data, etc.). In at least some embodiments, a hybrid selector 724, of the device 110, may send the audio data 611 to the wakeword detection component 620. If the wakeword detection component 620 detects a wakeword in the audio data 611, the wakeword detection component 620 may send an indication of such detection to the hybrid selector 724. In response to receiving the indication, the hybrid selector 724 may send the audio data 611 to the system 120 and/or the ASR component 750. The wakeword detection component 620 may also send an indication, to the hybrid selector 724, representing a wakeword was not detected. In response to receiving such an indication, the hybrid selector 724 may refrain from sending the audio data 611 to the system 120, and may prevent the ASR component 750 from further processing the audio data 611. In this situation, the audio data 611 can be discarded.

The device 110 may conduct its own speech processing using on-device language processing components, such as an SLU/language processing component 792 (which may include an ASR component 750 and an NLU component 760), similar to the manner discussed herein with respect to the SLU component 692 (or ASR component 650 and the NLU component 660) of the system 120. Language processing component 792 may operate similarly to language processing component 692, ASR component 750 may operate similarly to ASR component 650 and NLU component 760 may operate similarly to NLU component 660. The device 110 may also internally include, or otherwise have access to, other components such as one or more skill components 790 capable of executing commands based on NLU output data or other results determined by the device 110/system 120 (which may operate similarly to skill components 690), a user recognition component 795 (configured to process in a similar manner to that discussed herein with respect to the user recognition component 695 of the system 120), profile storage 770 (configured to store similar profile data to that discussed herein with respect to the profile storage 670 of the system 120), or other components. In at least some embodiments, the profile storage 770 may only store profile data for a user or group of users specifically associated with the device 110. Similar to as described above with respect to skill component 690, a skill component 790 may communicate with a skill system(s) 125. The device 110 may also have its own language output component 793 which may include NLG component 779 and TTS component 780. Language output component 793 may operate similarly to language processing component 693, NLG component 779 may operate similarly to NLG component 679 and TTS component 780 may operate similarly to TTS component 680.

In at least some embodiments, the on-device language processing components may not have the same capabilities as the language processing components of the system 120. For example, the on-device language processing components may be configured to handle only a subset of the natural language user inputs that may be handled by the system 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system 120.

The hybrid selector 724, of the device 110, may include a hybrid proxy (HP) 726 configured to proxy traffic to/from the system 120. For example, the HP 726 may be configured to send messages to/from a hybrid execution controller (HEC) 727 of the hybrid selector 724. For example, command/directive data received from the system 120 can be sent to the HEC 727 using the HP 726. The HP 726 may also be configured to allow the audio data 611 to pass to the system 120 while also receiving (e.g., intercepting) this audio data 611 and sending the audio data 611 to the HEC 727.

In at least some embodiments, the hybrid selector 724 may further include a local request orchestrator (LRO) 728 configured to notify the ASR component 750 about the availability of new audio data 611 that represents user speech, and to otherwise initiate the operations of local language processing when new audio data 611 becomes available. In general, the hybrid selector 724 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 611 is received, the HP 726 may allow the audio data 611 to pass through to the system 120 and the HP 726 may also input the audio data 611 to the on-device ASR component 750 by routing the audio data 611 through the HEC 727 of the hybrid selector 724, whereby the LRO 728 notifies the ASR component 750 of the audio data 611. At this point, the hybrid selector 724 may wait for response data from either or both of the system 120 or the local language processing components. However, the disclosure is not limited thereto, and in some examples the hybrid selector 724 may send the audio data 611 only to the local ASR component 750 without departing from the disclosure. For example, the device 110 may process the audio data 611 locally without sending the audio data 611 to the system 120.

The local ASR component 750 is configured to receive the audio data 611 from the hybrid selector 724, and to recognize speech in the audio data 611, and the local NLU component 760 is configured to determine a user intent from the recognized speech, and to determine how to act on the user intent by generating NLU output data which may include directive data (e.g., instructing a component to perform an action). Such NLU output data may take a form similar to that as determined by the NLU component 660 of the system 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 760) may be selected as usable to respond to a natural language user input, and local response data may be sent (e.g., local NLU output data, local knowledge base information, internet search results, and/or local directive data) to the hybrid selector 724, such as a "ReadyToExecute" response. The hybrid selector 724 may then determine whether to use directive data from the on-device components to respond to the natural language user input, to use directive data received from the system 120, assuming a remote response is even received (e.g., when the device 110 is able to access the system 120 over the network(s) 199), or to determine output audio requesting additional information from the user 105.

The device 110 and/or the system 120 may associate a unique identifier with each natural language user input. The device 110 may include the unique identifier when sending the audio data 611 to the system 120, and the response data from the system 120 may include the unique identifier to identify which natural language user input the response data corresponds.

In at least some embodiments, the device 110 may include, or be configured to use, one or more skill components 790 that may work similarly to the skill component(s) 690 implemented by the system 120. The skill component(s) 790 may correspond to one or more domains that are used in order to determine how to act on a spoken input in a particular way, such as by outputting a directive that corresponds to the determined intent, and which can be processed to implement the desired operation. The skill component(s) 790 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill system 125 may be configured in a local environment (e.g., home server and/or the like) such that the device 110 may communicate with the skill system 125 via a private network, such as a local area network (LAN).

As used herein, a "skill" may refer to a skill component 790, a skill system 125, or a combination of a skill component 790 and a corresponding skill system 125.

Similar to the manner discussed with regard to FIG. 6, the local device 110 may be configured to recognize multiple different wakewords and/or perform different categories of tasks depending on the wakeword. Such different wakewords may invoke different processing components of local device 110 (not illustrated in FIG. 7). For example, detection of the wakeword "Alexa" by the wakeword detection component 620 may result in sending audio data to certain language processing components 792/skills 790 for processing while detection of the wakeword "Computer" by the wakeword detector may result in sending audio data different language processing components 792/skills 790 for processing.

In some embodiments, one or more of the components and/or data disclosed as input to or output from one or more of the components discussed above in connection with FIGS. 6 and 7 may be associated with ancestry data and the one or more components may process data using such metadata according to the present teachings.

Figure 8:
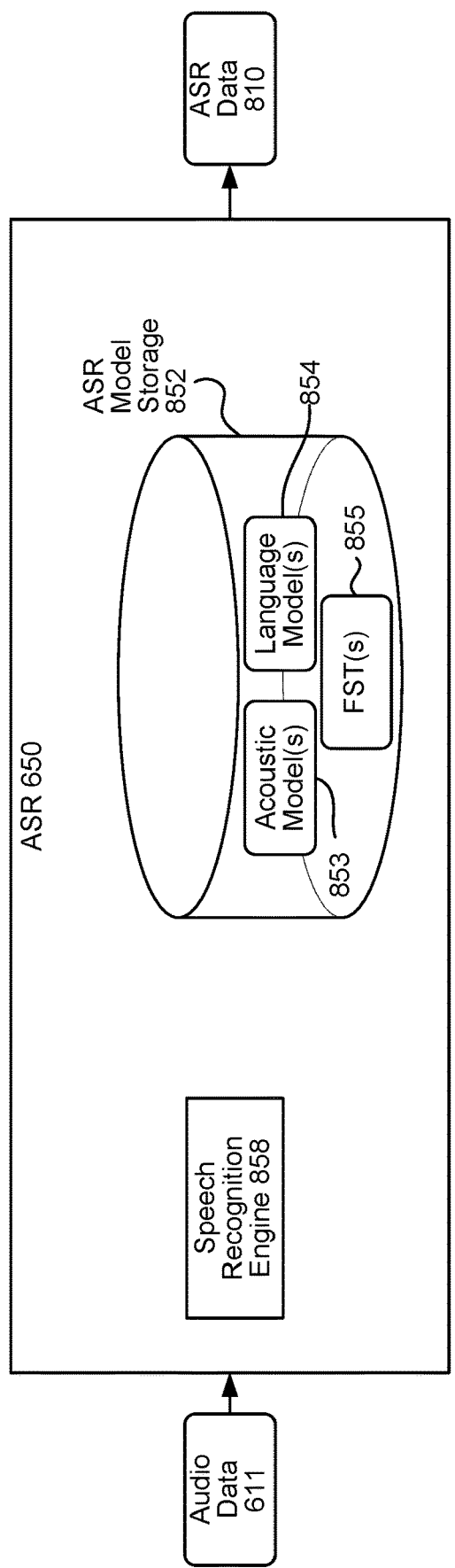
FIG. 8 is a conceptual diagram of how automatic speech recognition (ASR) processing may be performed, according to embodiments of the present disclosure.

FIG. 8 is a conceptual diagram of an ASR component 650, according to embodiments of the present disclosure. The ASR component 650 may interpret a spoken natural language input based on the similarity between the spoken natural language input and pre-established language models 854 stored in an ASR model storage 852. For example, the ASR component 650 may compare the audio data with models for sounds (e.g., subword units or phonemes) and sequences of sounds to identify words that match the sequence of sounds spoken in the natural language input. Alternatively, the ASR component 650 may use a finite state transducer (FST) 855 to implement the language model functions.

When the ASR component 650 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 853 stored in the ASR model storage 852), and the likelihood that a particular word, which matches the sounds, would be included in the sentence at the specific location (e.g., using a language or grammar model 854). Based on the considered factors and the assigned confidence score, the ASR component 650 may output an ASR hypothesis that most likely matches the spoken natural language input, or may output multiple ASR hypotheses in the form of a lattice or an N-best list, with each ASR hypothesis corresponding to a respective score.

The ASR component 650 may include a speech recognition engine 858. The ASR component 650 receives audio data 611 (for example, received from a local device 110 having processed audio detected by a microphone by an acoustic front end (AFE) or other component). The speech recognition engine 858 compares the audio data 611 with acoustic models 853, language models 854, FST(s) 855, and/or other data models and information for recognizing the speech conveyed in the audio data. The audio data 611 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 858 may process the audio data 611 with reference to information stored in the ASR model storage 852. Feature vectors of the audio data 611 may arrive at the system 120 encoded, in which case they may be decoded prior to processing by the speech recognition engine 858.

The speech recognition engine 858 attempts to match received feature vectors to language acoustic units (e.g., phonemes) and words as known in the stored acoustic models 853, language models 854, and FST(s) 855. For example, audio data 611 may be processed by one or more acoustic model(s) 853 to determine acoustic unit data. The acoustic unit data may include indicators of acoustic units detected in the audio data 611 by the ASR component 650. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 854 (and/or using FST 855) to determine ASR data 810. The ASR data 810 can include one or more hypotheses. One or more of the hypotheses represented in the ASR data 810 may then be sent to further components (such as the NLU component 660) for further processing as discussed herein. The ASR data 810 may include representations of text of an utterance, such as words, subword units, or the like.

The speech recognition engine 858 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 650 will output ASR hypotheses that make sense grammatically. The specific models used may be general models or may be models corresponding to a particular domain, such as music, banking, etc.

The speech recognition engine 858 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 858 may use the acoustic model(s) 853 to attempt to match received audio feature vectors to words or subword acoustic units. An acoustic unit may be a senone, phoneme, phoneme in context, syllable, part of a syllable, syllable in context, or any other such portion of a word. The speech recognition engine 858 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 650 outputs ASR hypotheses that make sense grammatically.

The speech recognition engine 858 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 858, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 858 may also compute scores of branches of the paths based on language models or grammars. Language modeling involves determining scores for what words are likely to be used together to form coherent words and sentences. Application of a language model may improve the likelihood that the ASR component 650 correctly interprets the speech contained in the audio data. For example, for an input audio sounding like "hello," acoustic model processing that returns the potential phoneme paths of "H E L O", "HALO", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 9:
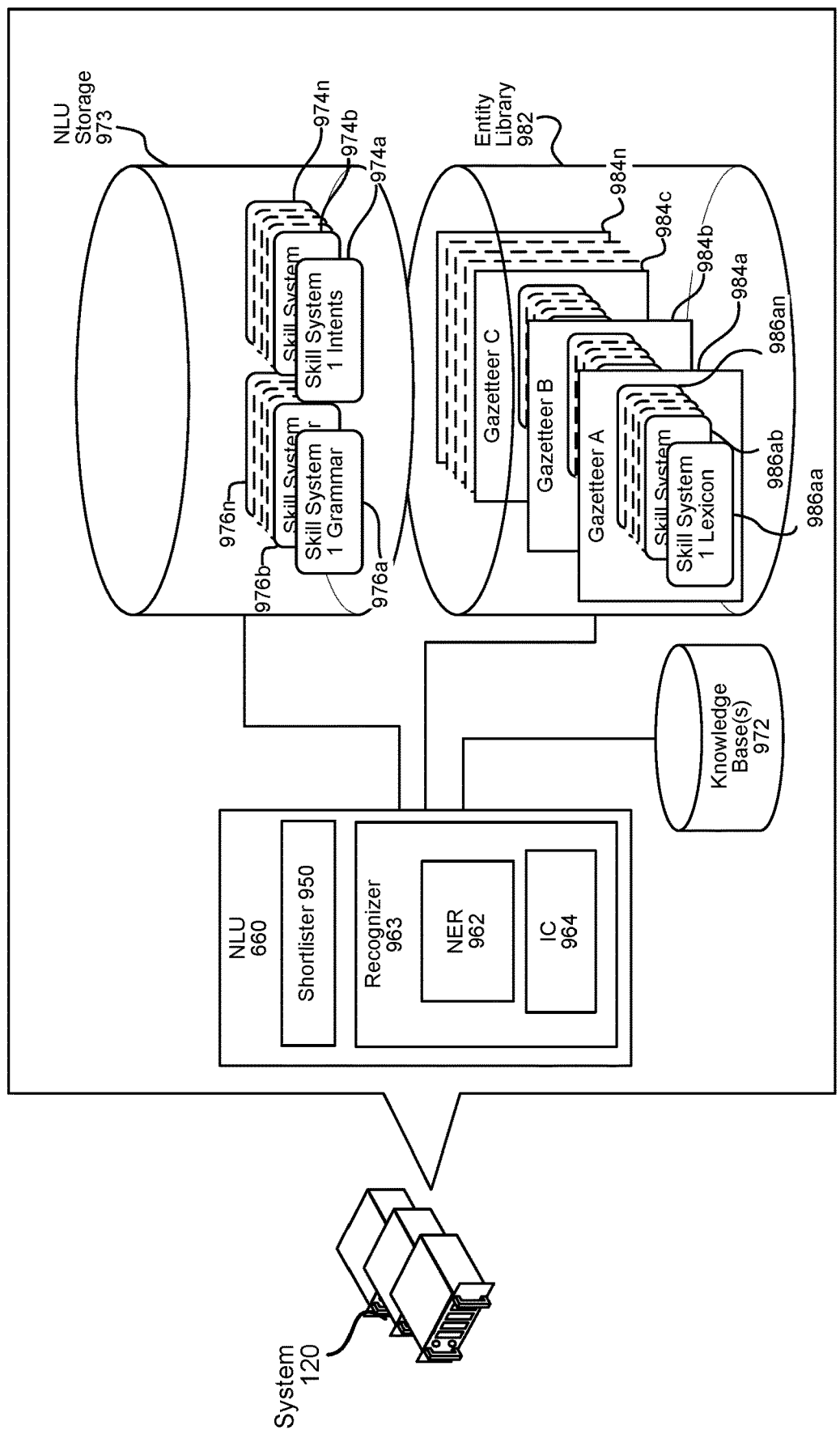
FIG. 9 is a conceptual diagram of how natural language understanding (NLU) processing may be performed, according to embodiments of the present disclosure.
Figure 10:
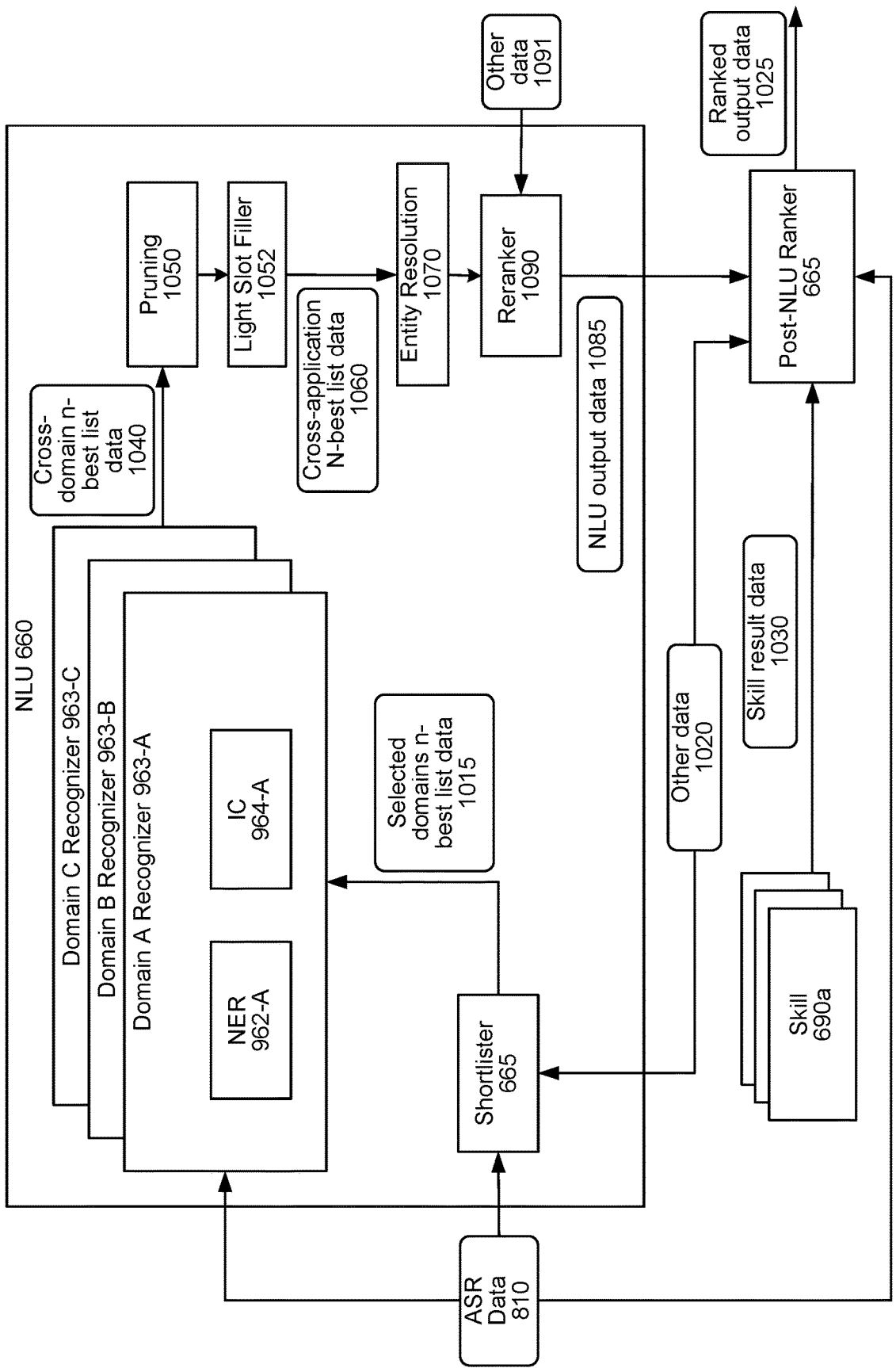
FIG. 10 is a conceptual diagram of how NLU processing may be performed, according to embodiments of the present disclosure.

FIGS. 9 and 10 illustrates how the NLU component 660 may perform NLU processing. FIG. 9 is a conceptual diagram of how natural language processing is performed, according to embodiments of the present disclosure. And FIG. 10 is a conceptual diagram of how natural language processing is performed, according to embodiments of the present disclosure.

FIG. 9 illustrates how NLU processing is performed on text data. The NLU component 660 may process text data including several ASR hypotheses of a single user input. For example, if the ASR component 650 outputs text data including an n-best list of ASR hypotheses, the NLU component 660 may process the text data with respect to all (or a portion of) the ASR hypotheses represented therein.

The NLU component 660 may annotate text data by parsing and/or tagging the text data. For example, for the text data "tell me the weather for Seattle," the NLU component 660 may tag "tell me the weather for Seattle" as an <OutputWeatther> intent as well as separately tag "Seattle" as a location for the weather information.

The NLU component 660 may include a shortlister component 950. The shortlister component 950 selects skills that may execute with respect to ASR output data 810 input to the NLU component 660 (e.g., applications that may execute with respect to the user input). The ASR output data 810 (which may also be referred to as ASR data 810) may include representations of text of an utterance, such as words, subword units, or the like. The shortlister component 950 thus limits downstream, more resource intensive NLU processes to being performed with respect to skills that may execute with respect to the user input.

Without a shortlister component 950, the NLU component 660 may process ASR output data 810 input thereto with respect to every skill of the system, either in parallel, in series, or using some combination thereof. By implementing a shortlister component 950, the NLU component 660 may process ASR output data 810 with respect to only the skills that may execute with respect to the user input. This reduces total compute power and latency attributed to NLU processing.

The shortlister component 950 may include one or more trained models. The model(s) may be trained to recognize various forms of user inputs that may be received by the system(s) 120. For example, during a training period skill system(s) 125 associated with a skill may provide the system(s) 120 with training text data representing sample user inputs that may be provided by a user to invoke the skill. For example, for a ride sharing skill, a skill system(s) 125 associated with the ride sharing skill may provide the system(s) 120 with training text data including text corresponding to "get me a cab to [location]," "get me a ride to [location]," "book me a cab to [location]," "book me a ride to [location]," etc. The one or more trained models that will be used by the shortlister component 950 may be trained, using the training text data representing sample user inputs, to determine other potentially related user input structures that users may try to use to invoke the particular skill. During training, the system(s) 120 may solicit the skill system(s) 125 associated with the skill regarding whether the determined other user input structures are permissible, from the perspective of the skill system(s) 125, to be used to invoke the skill. The alternate user input structures may be derived by one or more trained models during model training and/or may be based on user input structures provided by different skills. The skill system(s) 125 associated with a particular skill may also provide the system(s) 120 with training text data indicating grammar and annotations. The system(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 950 may be trained with respect to a different skill. Alternatively, the shortlister component 950 may use one trained model per domain, such as one trained model for skills associated with a weather domain, one trained model for skills associated with a ride sharing domain, etc.

The system(s) 120 may use the sample user inputs provided by a skill system(s) 125, and related sample user inputs potentially determined during training, as binary examples to train a model associated with a skill associated with the skill system(s) 125. The model associated with the particular skill may then be operated at runtime by the shortlister component 950. For example, some sample user inputs may be positive examples (e.g., user inputs that may be used to invoke the skill). Other sample user inputs may be negative examples (e.g., user inputs that may not be used to invoke the skill).

As described above, the shortlister component 950 may include a different trained model for each skill of the system, a different trained model for each domain, or some other combination of trained model(s). For example, the shortlister component 950 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 950 to output indications of only a portion of the skills that the ASR output data 810 may relate to. For example, a user input may correspond to "tell me about Tom Collins." If the model is clustered based on domain, the shortlister component 950 may determine the user input corresponds to a recipe skill (e.g., a drink recipe) even though the user input may also correspond to an information skill (e.g., including information about a person named Tom Collins).

The NLU component 660 may include one or more recognizers 963. In at least some embodiments, a recognizer 963 may be associated with a skill system 125 (e.g., the recognizer may be configured to interpret text data to correspond to the skill system 125). In at least some other examples, a recognizer 963 may be associated with a domain such as smart home, video, music, weather, custom, etc. (e.g., the recognizer may be configured to interpret text data to correspond to the domain).

If the shortlister component 950 determines ASR output data 810 is potentially associated with multiple domains, the recognizers 963 associated with the domains may process the ASR output data 810, while recognizers 963 not indicated in the shortlister component 950's output may not process the ASR output data 810. The "shortlisted" recognizers 963 may process the ASR output data 810 in parallel, in series, partially in parallel, etc. For example, if ASR output data 810 potentially relates to both a communications domain and a music domain, a recognizer associated with the communications domain may process the ASR output data 810 in parallel, or partially in parallel, with a recognizer associated with the music domain processing the ASR output data 810.

Each recognizer 963 may include a named entity recognition (NER) component 962. The NER component 962 attempts to identify grammars and lexical information that may be used to construe meaning with respect to text data input therein. The NER component 962 identifies portions of text data that correspond to a named entity associated with a domain, associated with the recognizer 963 implementing the NER component 962. The NER component 962 (or other component of the NLU component 660) may also determine whether a word refers to an entity whose identity is not explicitly mentioned in the text data, for example "him," "her," "it" or other anaphora, exophora, or the like.

Each recognizer 963, and more specifically each NER component 962, may be associated with a particular grammar database 976, a particular set of intents/actions 974, and a particular personalized lexicon 986. The grammar databases 976, and intents/actions 974 may be stored in an NLU storage 973. Each gazetteer 984 may include domain/skill-indexed lexical information associated with a particular user and/or device 110. For example, a Gazetteer A (984a) includes skill-indexed lexical information 986aa to 986an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 962 applies grammar information 976 and lexical information 986 associated with a domain (associated with the recognizer 963 implementing the NER component 962) to determine a mention of one or more entities in text data. In this manner, the NER component 962 identifies "slots" (each corresponding to one or more particular words in text data) that may be useful for later processing. The NER component 962 may also label each slot with a type (e.g., noun, place, city, artist name, song name, etc.).

Each grammar database 976 includes the names of entities (i.e., nouns) commonly found in speech about the particular domain to which the grammar database 976 relates, whereas the lexical information 986 is personalized to the user and/or the device 110 from which the user input originated. For example, a grammar database 976 associated with a shopping domain may include a database of words commonly used when people discuss shopping.

A downstream process called entity resolution (discussed in detail elsewhere herein) links a slot of text data to a specific entity known to the system. To perform entity resolution, the NLU component 660 may utilize gazetteer information (984a-984n) stored in an entity library storage 982. The gazetteer information 984 may be used to match text data (representing a portion of the user input) with text data representing known entities, such as song titles, contact names, etc. Gazetteers 984 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 963 may also include an intent classification (IC) component 964. An IC component 964 parses text data to determine an intent(s) (associated with the domain associated with the recognizer 963 implementing the IC component 964) that potentially represents the user input. An intent represents to an action a user desires be performed. An IC component 964 may communicate with a database 974 of words linked to intents. For example, a music intent database may link words and phrases such as "quiet," "volume off," and "mute" to a <Mute> intent. An IC component 964 identifies potential intents by comparing words and phrases in text data (representing at least a portion of the user input) to the words and phrases in an intents database 974 (associated with the domain that is associated with the recognizer 963 implementing the IC component 964).

The intents identifiable by a specific IC component 964 are linked to domain-specific (i.e., the domain associated with the recognizer 963 implementing the IC component 964) grammar frameworks 976 with "slots" to be filled. Each slot of a grammar framework 976 corresponds to a portion of text data that the system believes corresponds to an entity. For example, a grammar framework 976 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 976 may not be structured as sentences, but rather based on associating slots with grammatical tags.

For example, an NER component 962 may parse text data to identify words as subject, object, verb, preposition, etc. based on grammar rules and/or models prior to recognizing named entities in the text data. An IC component 964 (implemented by the same recognizer 963 as the NER component 962) may use the identified verb to identify an intent. The NER component 962 may then determine a grammar model 976 associated with the identified intent. For example, a grammar model 976 for an intent corresponding to <PlayMusic> may specify a list of slots applicable to play the identified "object" and any object modifier (e.g., a prepositional phrase), such as {Artist Name}, {Album Name}, {Song name}, etc. The NER component 962 may then search corresponding fields in a lexicon 986 (associated with the domain associated with the recognizer 963 implementing the NER component 962), attempting to match words and phrases in text data the NER component 962 previously tagged as a grammatical object or object modifier with those identified in the lexicon 986.

An NER component 962 may perform semantic tagging, which is the labeling of a word or combination of words according to their type/semantic meaning. An NER component 962 may parse text data using heuristic grammar rules, or a model may be constructed using techniques such as Hidden Markov Models, maximum entropy models, log linear models, conditional random fields (CRF), and the like. For example, an NER component 962 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 962 identifies "Play" as a verb based on a word database associated with the music domain, which an IC component 964 (also implemented by the music domain recognizer) may determine corresponds to a <PlayMusic> intent. At this stage, no determination has been made as to the meaning of "mother's little helper" or "the rolling stones," but based on grammar rules and models, the NER component 962 has determined the text of these phrases relates to the grammatical object (i.e., entity) of the user input represented in the text data.

An NER component 962 may tag text data to attribute meaning thereto. For example, an NER component 962 may tag "play mother's little helper by the rolling stones" as: {domain} Music, {intent}<PlayMusic>, {artist name} rolling stones, {media type} SONG, and {song title} mother's little helper. For further example, the NER component 962 may tag "play songs by the rolling stones" as: {domain} Music, {intent}<PlayMusic>, {artist name} rolling stones, and {media type} SONG.

The shortlister component 950 may receive ASR output data 810 output from the ASR component 650 or output from the device 110 (as illustrated in FIG. 10). The ASR component 650 may embed the ASR output data 810 into a form processable by a trained model(s) using sentence embedding techniques as known in the art. Sentence embedding results in the ASR output data 810 including text in a structure that enables the trained models of the shortlister component 950 to operate on the ASR output data 810. For example, an embedding of the ASR output data 810 may be a vector representation of the ASR output data 810.

The shortlister component 950 may make binary determinations (e.g., yes or no) regarding which domains relate to the ASR output data 810. The shortlister component 950 may make such determinations using the one or more trained models described herein above. If the shortlister component 950 implements a single trained model for each domain, the shortlister component 950 may simply run the models that are associated with enabled domains as indicated in a user profile associated with the device 110 and/or user that originated the user input.

The shortlister component 950 may generate n-best list data 1015 representing domains that may execute with respect to the user input represented in the ASR output data 810. The size of the n-best list represented in the n-best list data 1015 is configurable. In an example, the n-best list data 1015 may indicate every domain of the system as well as contain an indication, for each domain, regarding whether the domain is likely capable to execute the user input represented in the ASR output data 810. In another example, instead of indicating every domain of the system, the n-best list data 1015 may only indicate the domains that are likely to be able to execute the user input represented in the ASR output data 810. In yet another example, the shortlister component 950 may implement thresholding such that the n-best list data 1015 may indicate no more than a maximum number of domains that may execute the user input represented in the ASR output data 810. In an example, the threshold number of domains that may be represented in the n-best list data 1015 is ten. In another example, the domains included in the n-best list data 1015 may be limited by a threshold a score, where only domains indicating a likelihood to handle the user input is above a certain score (as determined by processing the ASR output data 810 by the shortlister component 950 relative to such domains) are included in the n-best list data 1015.

The ASR output data 810 may correspond to more than one ASR hypothesis. When this occurs, the shortlister component 950 may output a different n-best list (represented in the n-best list data 1015) for each ASR hypothesis. Alternatively, the shortlister component 950 may output a single n-best list representing the domains that are related to the multiple ASR hypotheses represented in the ASR output data 810.

As indicated above, the shortlister component 950 may implement thresholding such that an n-best list output therefrom may include no more than a threshold number of entries. If the ASR output data 810 includes more than one ASR hypothesis, the n-best list output by the shortlister component 950 may include no more than a threshold number of entries irrespective of the number of ASR hypotheses output by the ASR component 650. Alternatively or in addition, the n-best list output by the shortlister component 950 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 810, the shortlister component 950 may generate confidence scores representing likelihoods that domains relate to the ASR output data 810. If the shortlister component 950 implements a different trained model for each domain, the shortlister component 950 may generate a different confidence score for each individual domain trained model that is run. If the shortlister component 950 runs the models of every domain when ASR output data 810 is received, the shortlister component 950 may generate a different confidence score for each domain of the system. If the shortlister component 950 runs the models of only the domains that are associated with skills indicated as enabled in a user profile associated with the device 110 and/or user that originated the user input, the shortlister component 950 may only generate a different confidence score for each domain associated with at least one enabled skill. If the shortlister component 950 implements a single trained model with domain specifically trained portions, the shortlister component 950 may generate a different confidence score for each domain who's specifically trained portion is run. The shortlister component 950 may perform matrix vector modification to obtain confidence scores for all domains of the system in a single instance of processing of the ASR output data 810.

N-best list data 1015 including confidence scores that may be output by the shortlister component 950 may be represented as, for example:

Search domain, 0.67
Recipe domain, 0.62
Information domain, 0.57
Shopping domain, 0.42

As indicated, the confidence scores output by the shortlister component 950 may be numeric values. The confidence scores output by the shortlister component 950 may alternatively be binned values (e.g., high, medium, low).

The n-best list may only include entries for domains having a confidence score satisfying (e.g., equaling or exceeding) a minimum threshold confidence score. Alternatively, the shortlister component 950 may include entries for all domains associated with user enabled skills, even if one or more of the domains are associated with confidence scores that do not satisfy the minimum threshold confidence score.

The shortlister component 950 may consider other data 1020 when determining which domains may relate to the user input represented in the ASR output data 810 as well as respective confidence scores. The other data 1020 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 1020 may include an indicator of the user associated with the ASR output data 810, for example as determined by the user recognition component 695.

The other data 1020 may be character embedded prior to being input to the shortlister component 950. The other data 1020 may alternatively be embedded using other techniques known in the art prior to being input to the shortlister component 950.

The other data 1020 may also include data indicating the domains associated with skills that are enabled with respect to the device 110 and/or user that originated the user input. The shortlister component 950 may use such data to determine which domain-specific trained models to run. That is, the shortlister component 950 may determine to only run the trained models associated with domains that are associated with user-enabled skills. The shortlister component 950 may alternatively use such data to alter confidence scores of domains.

As an example, considering two domains, a first domain associated with at least one enabled skill and a second domain not associated with any user-enabled skills of the user that originated the user input, the shortlister component 950 may run a first model specific to the first domain as well as a second model specific to the second domain. Alternatively, the shortlister component 950 may run a model configured to determine a score for each of the first and second domains. The shortlister component 950 may determine a same confidence score for each of the first and second domains in the first instance. The shortlister component 950 may then alter those confidence scores based on which domains is associated with at least one skill enabled by the present user. For example, the shortlister component 950 may increase the confidence score associated with the domain associated with at least one enabled skill while leaving the confidence score associated with the other domain the same. Alternatively, the shortlister component 950 may leave the confidence score associated with the domain associated with at least one enabled skill the same while decreasing the confidence score associated with the other domain. Moreover, the shortlister component 950 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 670. When the shortlister component 950 receives the ASR output data 810, the shortlister component 950 may determine whether profile data associated with the user and/or device 110 that originated the command includes an indication of enabled skills.

The other data 1020 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 950 may use such data to determine which domain-specific trained models to run. For example, if the device 110 corresponds to a displayless type device, the shortlister component 950 may determine not to run trained models specific to domains that output video data. The shortlister component 950 may alternatively use such data to alter confidence scores of domains.

As an example, considering two domains, one that outputs audio data and another that outputs video data, the shortlister component 950 may run a first model specific to the domain that generates audio data as well as a second model specific to the domain that generates video data. Alternatively the shortlister component 950 may run a model configured to determine a score for each domain. The shortlister component 950 may determine a same confidence score for each of the domains in the first instance. The shortlister component 950 may then alter the original confidence scores based on the type of the device 110 that originated the user input corresponding to the ASR output data 810. For example, if the device 110 is a displayless device, the shortlister component 950 may increase the confidence score associated with the domain that generates audio data while leaving the confidence score associated with the domain that generates video data the same. Alternatively, if the device 110 is a displayless device, the shortlister component 950 may leave the confidence score associated with the domain that generates audio data the same while decreasing the confidence score associated with the domain that generates video data. Moreover, if the device 110 is a displayless device, the shortlister component 950 may increase the confidence score associated with the domain that generates audio data as well as decrease the confidence score associated with the domain that generates video data.

The type of device information represented in the other data 1020 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 1020 may represent the smart TV of other display device, and not the displayless device that captured the spoken user input.

The other data 1020 may also include data indicating the user input originating device's speed, location, or other mobility information. For example, the device may correspond to a vehicle including a display. If the vehicle is moving, the shortlister component 950 may decrease the confidence score associated with a domain that generates video data as it may be undesirable to output video content to a user while the user is driving. The device may output data to the system(s) 120 indicating when the device is moving.

The other data 1020 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 950 may use such data to alter confidence scores of domains. For example, the shortlister component 950 may run a first model specific to a first domain as well as a second model specific to a second domain. Alternatively, the shortlister component 950 may run a model configured to determine a score for each domain. The shortlister component 950 may also determine a same confidence score for each of the domains in the first instance. The shortlister component 950 may then alter the original confidence scores based on the first domain being invoked to cause the system to output content while the current user input was received. Based on the first domain being invoked, the shortlister component 950 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 1015 generated by the shortlister component 950 as well as the different types of other data 1020 considered by the shortlister component 950 are configurable. For example, the shortlister component 950 may update confidence scores as more other data 1020 is considered. For further example, the n-best list data 1015 may exclude relevant domains if thresholding is implemented. Thus, for example, the shortlister component 950 may include an indication of a domain in the n-best list data 1015 unless the shortlister component 950 is one hundred percent confident that the domain may not execute the user input represented in the ASR output data 810 (e.g., the shortlister component 950 determines a confidence score of zero for the domain).

The shortlister component 950 may send the ASR output data 810 to recognizers 963 associated with domains represented in the n-best list data 1015. Alternatively, the shortlister component 950 may send the n-best list data 1015 or some other indicator of the selected subset of domains to another component (such as the orchestrator component 630) which may in turn send the ASR output data 810 to the recognizers 963 corresponding to the domains included in the n-best list data 1015 or otherwise indicated in the indicator. If the shortlister component 950 generates an n-best list representing domains without any associated confidence scores, the shortlister component 950/orchestrator component 630 may send the ASR output data 810 to recognizers 963 associated with domains that the shortlister component 950 determines may execute the user input. If the shortlister component 950 generates an n-best list representing domains with associated confidence scores, the shortlister component 950/orchestrator component 630 may send the ASR output data 810 to recognizers 963 associated with domains associated with confidence scores satisfying (e.g., meeting or exceeding) a threshold minimum confidence score.

A recognizer 963 may output tagged text data generated by an NER component 962 and an IC component 964, as described herein above. The NLU component 660 may compile the output tagged text data of the recognizers 963 into a single cross-domain n-best list data 1040 and may send the cross-domain n-best list data 1040 to a pruning component 1050. Each entry of tagged text (e.g., each NLU hypothesis) represented in the cross-domain n-best list data 1040 may be associated with a respective score indicating a likelihood that the NLU hypothesis corresponds to the domain associated with the recognizer 963 from which the NLU hypothesis was output. For example, the cross-domain n-best list data 1040 may be represented as (with each line corresponding to a different NLU hypothesis):

[0.95] Intent: <PlayMusic>ArtistName: Beethoven SongName: Waldstein Sonata

[0.70] Intent: <Play Video>ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 1050 may sort the NLU hypotheses represented in the cross-domain n-best list data 1040 according to their respective scores. The pruning component 1050 may perform score thresholding with respect to the cross-domain NLU hypotheses. For example, the pruning component 1050 may select NLU hypotheses associated with scores satisfying (e.g., meeting and/or exceeding) a threshold score. The pruning component 1050 may also or alternatively perform number of NLU hypothesis thresholding. For example, the pruning component 1050 may select the top scoring NLU hypothesis(es). The pruning component 1050 may output a portion of the NLU hypotheses input thereto. The purpose of the pruning component 1050 is to create a reduced list of NLU hypotheses so that downstream, more resource intensive, processes may only operate on the NLU hypotheses that most likely represent the user's intent.

The NLU component 660 may include a light slot filler component 1052. The light slot filler component 1052 can take text from slots represented in the NLU hypotheses output by the pruning component 1050 and alter them to make the text more easily processed by downstream components. The light slot filler component 1052 may perform low latency operations that do not involve heavy operations such as reference to a knowledge base (e.g., 972). The purpose of the light slot filler component 1052 is to replace words with other words or values that may be more easily understood by downstream components. For example, if a NLU hypothesis includes the word "tomorrow," the light slot filler component 1052 may replace the word "tomorrow" with an actual date for purposes of downstream processing. Similarly, the light slot filler component 1052 may replace the word "CD" with "album" or the words "compact disc." The replaced words are then included in the cross-domain n-best list data 1060.

The cross-domain n-best list data 1060 may be input to an entity resolution component 1070. The entity resolution component 1070 can apply rules or other instructions to standardize labels or tokens from previous stages into an intent/slot representation. The precise transformation may depend on the domain. For example, for a travel domain, the entity resolution component 1070 may transform text corresponding to "Boston airport" to the standard BOS three-letter code referring to the airport. The entity resolution component 1070 can refer to a knowledge base (e.g., 972) that is used to specifically identify the precise entity referred to in each slot of each NLU hypothesis represented in the cross-domain n-best list data 1060. Specific intent/slot combinations may also be tied to a particular source, which may then be used to resolve the text. In the example "play songs by the stones," the entity resolution component 1070 may reference a personal music catalog, Amazon Music account, a user profile, or the like. The entity resolution component 1070 may output an altered n-best list that is based on the cross-domain n-best list data 1060 but that includes more detailed information (e.g., entity IDs) about the specific entities mentioned in the slots and/or more detailed slot data that can eventually be used by a skill. The NLU component 660 may include multiple entity resolution components 1070 and each entity resolution component 1070 may be specific to one or more domains.

The NLU component 660 may include a reranker 1090. The reranker 1090 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 1070.

The reranker 1090 may apply re-scoring, biasing, or other techniques. The reranker 1090 may consider not only the data output by the entity resolution component 1070, but may also consider other data 1091. The other data 1091 may include a variety of information. For example, the other data 1091 may include skill rating or popularity data. For example, if one skill has a high rating, the reranker 1090 may increase the score of a NLU hypothesis that may be processed by the skill. The other data 1091 may also include information about skills that have been enabled by the user that originated the user input. For example, the reranker 1090 may assign higher scores to NLU hypothesis that may be processed by enabled skills than NLU hypothesis that may be processed by non-enabled skills. The other data 1091 may also include data indicating user usage history, such as if the user that originated the user input regularly uses a particular skill or does so at particular times of day. The other data 1091 may additionally include data indicating date, time, location, weather, type of device 110, user identifier, context, as well as other information. For example, the reranker 1090 may consider when any particular skill is currently active (e.g., music being played, a game being played, etc.).

As illustrated and described, the entity resolution component 1070 is implemented prior to the reranker 1090. The entity resolution component 1070 may alternatively be implemented after the reranker 1090. Implementing the entity resolution component 1070 after the reranker 1090 limits the NLU hypotheses processed by the entity resolution component 1070 to only those hypotheses that successfully pass through the reranker 1090.

The reranker 1090 may be a global reranker (e.g., one that is not specific to any particular domain). Alternatively, the NLU component 660 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 660 may perform NLU processing described above with respect to domains associated with skills wholly implemented as part of the system(s) 120 (e.g., designated 690 in FIG. 6). The NLU component 660 may separately perform NLU processing described above with respect to domains associated with skills that are at least partially implemented as part of the skill system(s) 125. In an example, the shortlister component 950 may only process with respect to these latter domains. Results of these two NLU processing paths may be merged into NLU output data 1085, which may be sent to a post-NLU ranker 665, which may be implemented by the system(s) 120.

The post-NLU ranker 665 may include a statistical component that produces a ranked list of intent/skill pairs with associated confidence scores. Each confidence score may indicate an adequacy of the skill's execution of the intent with respect to NLU results data associated with the skill. The post-NLU ranker 665 may operate one or more trained models configured to process the NLU results data 1085, skill result data 1030, and the other data 1020 in order to output ranked output data 1025. The ranked output data 1025 may include an n-best list where the NLU hypotheses in the NLU results data 1085 are reordered such that the n-best list in the ranked output data 1025 represents a prioritized list of skills to respond to a user input as determined by the post-NLU ranker 665. The ranked output data 1025 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 665 enables the system to better determine the best skill to execute the user input. For example, first and second NLU hypotheses in the NLU results data 1085 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 665 (or other scheduling component such as orchestrator component 630) may solicit the first skill and the second skill to provide potential result data 1030 based on the first NLU hypothesis and the second NLU hypothesis, respectively. For example, the post-NLU ranker 665 may send the first NLU hypothesis to the first skill 690a along with a request for the first skill 690a to at least partially execute with respect to the first NLU hypothesis. The post-NLU ranker 665 may also send the second NLU hypothesis to the second skill 690b along with a request for the second skill 690b to at least partially execute with respect to the second NLU hypothesis. The post-NLU ranker 665 receives, from the first skill 690a, first result data 1030 generated from the first skill 690a's execution with respect to the first NLU hypothesis. The post-NLU ranker 665 also receives, from the second skill 690b, second results data 1030 generated from the second skill 690b's execution with respect to the second NLU hypothesis.

The result data 1030 may include various portions. For example, the result data 1030 may include content (e.g., audio data, text data, and/or video data) to be output to a user. The result data 1030 may also include a unique identifier used by the system(s) 120 and/or the skill system(s) 125 to locate the data to be output to a user. The result data 1030 may also include an instruction. For example, if the user input corresponds to "turn on the light," the result data 1030 may include an instruction causing the system to turn on a light associated with a profile of the device (110a/110b) and/or user.

The post-NLU ranker 665 may consider the first result data 1030 and the second result data 1030 to alter the first confidence score and the second confidence score of the first NLU hypothesis and the second NLU hypothesis, respectively. That is, the post-NLU ranker 665 may generate a third confidence score based on the first result data 1030 and the first confidence score. The third confidence score may correspond to how likely the post-NLU ranker 665 determines the first skill will correctly respond to the user input. The post-NLU ranker 665 may also generate a fourth confidence score based on the second result data 1030 and the second confidence score. One skilled in the art will appreciate that a first difference between the third confidence score and the fourth confidence score may be greater than a second difference between the first confidence score and the second confidence score. The post-NLU ranker 665 may also consider the other data 1020 to generate the third confidence score and the fourth confidence score. While it has been described that the post-NLU ranker 665 may alter the confidence scores associated with first and second NLU hypotheses, one skilled in the art will appreciate that the post-NLU ranker 665 may alter the confidence scores of more than two NLU hypotheses. The post-NLU ranker 665 may select the result data 1030 associated with the skill 690 with the highest altered confidence score to be the data output in response to the current user input. The post-NLU ranker 665 may also consider the ASR output data 810 to alter the NLU hypotheses confidence scores.

The orchestrator component 630 may, prior to sending the NLU results data 1085 to the post-NLU ranker 665, associate intents in the NLU hypotheses with skills 690. For example, if a NLU hypothesis includes a <PlayMusic> intent, the orchestrator component 630 may associate the NLU hypothesis with one or more skills 690 that can execute the <PlayMusic> intent. Thus, the orchestrator component 630 may send the NLU results data 1085, including NLU hypotheses paired with skills 690, to the post-NLU ranker 665. In response to ASR output data 810 corresponding to "what should I do for dinner today," the orchestrator component 630 may generates pairs of skills 690 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 665 queries each skill 690, paired with a NLU hypothesis in the NLU output data 1085, to provide result data 1030 based on the NLU hypothesis with which it is associated. That is, with respect to each skill, the post-NLU ranker 665 colloquially asks the each skill "if given this NLU hypothesis, what would you do with it." According to the above example, the post-NLU ranker 665 may send skills 690 the following data:

Skill 1: First NLU hypothesis including <Help> intent indicator
Skill 2: Second NLU hypothesis including <Order> intent indicator
Skill 3: Third NLU hypothesis including <DishType> intent indicator The post-NLU ranker 665 may query each of the skills 690 in parallel or substantially in parallel.

A skill 690 may provide the post-NLU ranker 665 with various data and indications in response to the post-NLU ranker 665 soliciting the skill 690 for result data 1030. A skill 690 may simply provide the post-NLU ranker 665 with an indication of whether or not the skill can execute with respect to the NLU hypothesis it received. A skill 690 may also or alternatively provide the post-NLU ranker 665 with output data generated based on the NLU hypothesis it received. In some situations, a skill 690 may need further information in addition to what is represented in the received NLU hypothesis to provide output data responsive to the user input. In these situations, the skill 690 may provide the post-NLU ranker 665 with result data 1030 indicating slots of a framework that the skill 690 further needs filled or entities that the skill 690 further needs resolved prior to the skill 690 being able to provided result data 1030 responsive to the user input. The skill 690 may also provide the post-NLU ranker 665 with an instruction and/or computer-generated speech indicating how the skill 690 recommends the system solicit further information needed by the skill 690. The skill 690 may further provide the post-NLU ranker 665 with an indication of whether the skill 690 will have all needed information after the user provides additional information a single time, or whether the skill 690 will need the user to provide various kinds of additional information prior to the skill 690 having all needed information. According to the above example, skills 690 may provide the post-NLU ranker 665 with the following:

Skill 1: indication representing the skill can execute with respect to a NLU hypothesis including the <Help> intent indicator
Skill 2: indication representing the skill needs to the system to obtain further information
Skill 3: indication representing the skill can provide numerous results in response to the third NLU hypothesis including the <DishType> intent indicator Result data 1030 includes an indication provided by a skill 690 indicating whether or not the skill 690 can execute with respect to a NLU hypothesis; data generated by a skill 690 based on a NLU hypothesis; as well as an indication provided by a skill 690 indicating the skill 690 needs further information in addition to what is represented in the received NLU hypothesis.

The post-NLU ranker 665 uses the result data 1030 provided by the skills 690 to alter the NLU processing confidence scores generated by the reranker 1090. That is, the post-NLU ranker 665 uses the result data 1030 provided by the queried skills 690 to create larger differences between the NLU processing confidence scores generated by the reranker 1090. Without the post-NLU ranker 665, the system may not be confident enough to determine an output in response to a user input, for example when the NLU hypotheses associated with multiple skills are too close for the system to confidently determine a single skill 690 to invoke to respond to the user input. For example, if the system does not implement the post-NLU ranker 665, the system may not be able to determine whether to obtain output data from a general reference information skill or a medical information skill in response to a user input corresponding to "what is acne."

The post-NLU ranker 665 may prefer skills 690 that provide result data 1030 responsive to NLU hypotheses over skills 690 that provide result data 1030 corresponding to an indication that further information is needed, as well as skills 690 that provide result data 1030 indicating they can provide multiple responses to received NLU hypotheses. For example, the post-NLU ranker 665 may generate a first score for a first skill 690a that is greater than the first skill's NLU confidence score based on the first skill 690a providing result data 1030 including a response to a NLU hypothesis. For further example, the post-NLU ranker 665 may generate a second score for a second skill 690b that is less than the second skill's NLU confidence score based on the second skill 690b providing result data 1030 indicating further information is needed for the second skill 690b to provide a response to a NLU hypothesis. Yet further, for example, the post-NLU ranker 665 may generate a third score for a third skill 690c that is less than the third skill's NLU confidence score based on the third skill 690c providing result data 1030 indicating the third skill 690c can provide multiple responses to a NLU hypothesis.

The post-NLU ranker 665 may consider other data 1020 in determining scores. The other data 1020 may include rankings associated with the queried skills 690. A ranking may be a system ranking or a user-specific ranking. A ranking may indicate a veracity of a skill from the perspective of one or more users of the system. For example, the post-NLU ranker 665 may generate a first score for a first skill 690a that is greater than the first skill's NLU processing confidence score based on the first skill 690a being associated with a high ranking. For further example, the post-NLU ranker 665 may generate a second score for a second skill 690b that is less than the second skill's NLU processing confidence score based on the second skill 690b being associated with a low ranking.

The other data 1020 may include information indicating whether or not the user that originated the user input has enabled one or more of the queried skills 690. For example, the post-NLU ranker 665 may generate a first score for a first skill 690a that is greater than the first skill's NLU processing confidence score based on the first skill 690*a* being enabled by the user that originated the user input. For further example, the post-NLU ranker 665 may generate a second score for a second skill 690*b* that is less than the second skill's NLU processing confidence score based on the second skill 690*b* not being enabled by the user that originated the user input. When the post-NLU ranker 665 receives the NLU results data 1085, the post-NLU ranker 665 may determine whether profile data, associated with the user and/or device that originated the user input, includes indications of enabled skills.

The other data 1020 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 665 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 665 may increase the NLU processing confidence score associated with a first skill configured to output visual data and/or decrease the NLU processing confidence score associated with a second skill configured to output audio data.

The other data 1020 may include information indicating the veracity of the result data 1030 provided by a skill 690. For example, if a user says "tell me a recipe for pasta sauce," a first skill 690*a* may provide the post-NLU ranker 665 with first result data 1030 corresponding to a first recipe associated with a five star rating and a second skill 690*b* may provide the post-NLU ranker 665 with second result data 1030 corresponding to a second recipe associated with a one star rating. In this situation, the post-NLU ranker 665 may increase the NLU processing confidence score associated with the first skill 690*a* based on the first skill 690*a* providing the first result data 1030 associated with the five star rating and/or decrease the NLU processing confidence score associated with the second skill 690*b* based on the second skill 690*b* providing the second result data 1030 associated with the one star rating.

The other data 1020 may include information indicating the type of device that originated the user input. For example, the device may correspond to a "hotel room" type if the device is located in a hotel room. If a user inputs a command corresponding to "order me food" to the device located in the hotel room, the post-NLU ranker 665 may increase the NLU processing confidence score associated with a first skill 690*a* corresponding to a room service skill associated with the hotel and/or decrease the NLU processing confidence score associated with a second skill 690*b* corresponding to a food skill not associated with the hotel.

The other data 1020 may include information indicating a location of the device and/or user that originated the user input. The system may be configured with skills 690 that may only operate with respect to certain geographic locations. For example, a user may provide a user input corresponding to "when is the next train to Portland." A first skill 690*a* may operate with respect to trains that arrive at, depart from, and pass through Portland, Oregon. A second skill 690*b* may operate with respect to trains that arrive at, depart from, and pass through Portland, Maine. If the device and/or user that originated the user input is located in Seattle, Washington, the post-NLU ranker 665 may increase the NLU processing confidence score associated with the first skill 690*a* and/or decrease the NLU processing confidence score associated with the second skill 690*b*. Likewise, if the device and/or user that originated the user input is located in Boston, Massachusetts, the post-NLU ranker 665 may increase the NLU processing confidence score associated with the second skill 690*b* and/or decrease the NLU processing confidence score associated with the first skill 690*a*.

The other data 1020 may include information indicating a time of day. The system may be configured with skills 690 that operate with respect to certain times of day. For example, a user may provide a user input corresponding to "order me food." A first skill 690*a* may generate first result data 1030 corresponding to breakfast. A second skill 690*b* may generate second result data 1030 corresponding to dinner. If the system(s) 120 receives the user input in the morning, the post-NLU ranker 665 may increase the NLU processing confidence score associated with the first skill 690*a* and/or decrease the NLU processing score associated with the second skill 690*b*. If the system(s) 120 receives the user input in the afternoon or evening, the post-NLU ranker 665 may increase the NLU processing confidence score associated with the second skill 690*b* and/or decrease the NLU processing confidence score associated with the first skill 690*a*.

The other data 1020 may include information indicating user preferences. The system may include multiple skills 690 configured to execute in substantially the same manner. For example, a first skill 690*a* and a second skill 690*b* may both be configured to order food from respective restaurants. The system may store a user preference (e.g., in the profile storage 670) that is associated with the user that provided the user input to the system(s) 120 as well as indicates the user prefers the first skill 690*a* over the second skill 690*b*. Thus, when the user provides a user input that may be executed by both the first skill 690*a* and the second skill 690*b*, the post-NLU ranker 665 may increase the NLU processing confidence score associated with the first skill 690*a* and/or decrease the NLU processing confidence score associated with the second skill 690*b*.

The other data 1020 may include information indicating system usage history associated with the user that originated the user input. For example, the system usage history may indicate the user originates user inputs that invoke a first skill 690*a* more often than the user originates user inputs that invoke a second skill 690*b*. Based on this, if the present user input may be executed by both the first skill 690*a* and the second skill 690*b*, the post-NLU ranker 665 may increase the NLU processing confidence score associated with the first skill 690*a* and/or decrease the NLU processing confidence score associated with the second skill 690*b*.

The other data 1020 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 665 may increase the NLU processing confidence score associated with a first skill 690*a* that generates audio data. The post-NLU ranker 665 may also or alternatively decrease the NLU processing confidence score associated with a second skill 690*b* that generates image data or video data.

The other data 1020 may include information indicating how long it took a skill 690 to provide result data 1030 to the post-NLU ranker 665. When the post-NLU ranker 665 multiple skills 690 for result data 1030, the skills 690 may respond to the queries at different speeds. The post-NLU ranker 665 may implement a latency budget. For example, if the post-NLU ranker 665 determines a skill 690 responds to the post-NLU ranker 665 within a threshold amount of time from receiving a query from the post-NLU ranker 665, the post-NLU ranker 665 may increase the NLU processing confidence score associated with the skill 690. Conversely, if the post-NLU ranker 665 determines a skill 690 does not respond to the post-NLU ranker 665 within a threshold amount of time from receiving a query from the post-NLU ranker 665, the post-NLU ranker 665 may decrease the NLU processing confidence score associated with the skill 690.

It has been described that the post-NLU ranker 665 uses the other data 1020 to increase and decrease NLU processing confidence scores associated with various skills 690 that the post-NLU ranker 665 has already requested result data from. Alternatively, the post-NLU ranker 665 may use the other data 1020 to determine which skills 690 to request result data from. For example, the post-NLU ranker 665 may use the other data 1020 to increase and/or decrease NLU processing confidence scores associated with skills 690 associated with the NLU results data 1085 output by the NLU component 660. The post-NLU ranker 665 may select n-number of top scoring altered NLU processing confidence scores. The post-NLU ranker 665 may then request result data 1030 from only the skills 690 associated with the selected n-number of NLU processing confidence scores.

As described, the post-NLU ranker 665 may request result data 1030 from all skills 690 associated with the NLU results data 1085 output by the NLU component 660. Alternatively, the system(s) 120 may prefer result data 1030 from skills implemented entirely by the system(s) 120 rather than skills at least partially implemented by the skill system(s) 125. Therefore, in the first instance, the post-NLU ranker 665 may request result data 1030 from only skills associated with the NLU results data 1085 and entirely implemented by the system(s) 120. The post-NLU ranker 665 may only request result data 1030 from skills associated with the NLU results data 1085, and at least partially implemented by the skill system(s) 125, if none of the skills, wholly implemented by the system(s) 120, provide the post-NLU ranker 665 with result data 1030 indicating either data response to the NLU results data 1085, an indication that the skill can execute the user input, or an indication that further information is needed.

As indicated above, the post-NLU ranker 665 may request result data 1030 from multiple skills 690. If one of the skills 690 provides result data 1030 indicating a response to a NLU hypothesis and the other skills provide result data 1030 indicating either they cannot execute or they need further information, the post-NLU ranker 665 may select the result data 1030 including the response to the NLU hypothesis as the data to be output to the user. If more than one of the skills 690 provides result data 1030 indicating responses to NLU hypotheses, the post-NLU ranker 665 may consider the other data 1020 to generate altered NLU processing confidence scores, and select the result data 1030 of the skill associated with the greatest score as the data to be output to the user.

A system that does not implement the post-NLU ranker 665 may select the highest scored NLU hypothesis in the NLU results data 1085. The system may send the NLU hypothesis to a skill 690 associated therewith along with a request for output data. In some situations, the skill 690 may not be able to provide the system with output data. This results in the system indicating to the user that the user input could not be processed even though another skill associated with lower ranked NLU hypothesis could have provided output data responsive to the user input.

The post-NLU ranker 665 reduces instances of the aforementioned situation. As described, the post-NLU ranker 665 queries multiple skills associated with the NLU results data 1085 to provide result data 1030 to the post-NLU ranker 665 prior to the post-NLU ranker 665 ultimately determining the skill 690 to be invoked to respond to the user input. Some of the skills 690 may provide result data 1030 indicating responses to NLU hypotheses while other skills 690 may providing result data 1030 indicating the skills cannot provide responsive data. Whereas a system not implementing the post-NLU ranker 665 may select one of the skills 690 that could not provide a response, the post-NLU ranker 665 only selects a skill 690 that provides the post-NLU ranker 665 with result data corresponding to a response, indicating further information is needed, or indicating multiple responses can be generated.

The post-NLU ranker 665 may select result data 1030, associated with the skill 690 associated with the highest score, for output to the user. Alternatively, the post-NLU ranker 665 may output ranked output data 1025 indicating skills 690 and their respective post-NLU ranker rankings. Since the post-NLU ranker 665 receives result data 1030, potentially corresponding to a response to the user input, from the skills 690 prior to post-NLU ranker 665 selecting one of the skills or outputting the ranked output data 1025, little to no latency occurs from the time skills provide result data 1030 and the time the system outputs responds to the user.

If the post-NLU ranker 665 selects result audio data to be output to a user and the system determines content should be output audibly, the post-NLU ranker 665 (or another component of the system(s) 120) may cause the device 110 to output audio corresponding to the result audio data. If the post-NLU ranker 665 selects result text data to output to a user and the system determines content should be output visually, the post-NLU ranker 665 (or another component of the system(s) 120) may cause the device 110 to display text corresponding to the result text data. If the post-NLU ranker 665 selects result audio data to output to a user and the system determines content should be output visually, the post-NLU ranker 665 (or another component of the system(s) 120) may send the result audio data to the ASR component 650. The ASR component 650 may generate output text data corresponding to the result audio data. The system(s) 120 may then cause the device 110 to display text corresponding to the output text data. If the post-NLU ranker 665 selects result text data to output to a user and the system determines content should be output audibly, the post-NLU ranker 665 (or another component of the system(s) 120) may send the result text data to the TTS component 680. The TTS component 680 may generate output audio data (corresponding to computer-generated speech) based on the result text data. The system(s) 120 may then cause the device 110 to output audio corresponding to the output audio data.

As described, a skill 690 may provide result data 1030 either indicating a response to the user input, indicating more information is needed for the skill 690 to provide a response to the user input, or indicating the skill 690 cannot provide a response to the user input. If the skill 690 associated with the highest post-NLU ranker score provides the post-NLU ranker 665 with result data 1030 indicating a response to the user input, the post-NLU ranker 665 (or another component of the system(s) 120, such as the orchestrator component 630) may simply cause content corresponding to the result data 1030 to be output to the user. For example, the post-NLU ranker 665 may send the result data 1030 to the orchestrator component 630. The orchestrator component 630 may cause the result data 1030 to be sent to the device (110a/110b), which may output audio and/or display text corresponding to the result data 1030. The orchestrator component 630 may send the result data 1030 to the ASR component 650 to generate output text data and/or may send the result data 1030 to the TTS component 680 to generate output audio data, depending on the situation.

The skill 690 associated with the highest post-NLU ranker score may provide the post-NLU ranker 665 with result data 1030 indicating more information is needed as well as instruction data. The instruction data may indicate how the skill 690 recommends the system obtain the needed information. For example, the instruction data may correspond to text data or audio data (i.e., computer-generated speech) corresponding to "please indicate _____." The instruction data may be in a format (e.g., text data or audio data) capable of being output by the device (110a/110b). When this occurs, the post-NLU ranker 665 may simply cause the received instruction data be output by the device (110a/110b). Alternatively, the instruction data may be in a format that is not capable of being output by the device (110a/110b). When this occurs, the post-NLU ranker 665 may cause the ASR component 650 or the TTS component 680 to process the instruction data, depending on the situation, to generate instruction data that may be output by the device (110a/110b). Once the user provides the system with all further information needed by the skill 690, the skill 690 may provide the system with result data 1030 indicating a response to the user input, which may be output by the system as detailed above.

The system may include "informational" skills 690 that simply provide the system with information, which the system outputs to the user. The system may also include "transactional" skills 690 that require a system instruction to execute the user input. Transactional skills 690 include ride sharing skills, flight booking skills, etc. A transactional skill 690 may simply provide the post-NLU ranker 665 with result data 1030 indicating the transactional skill 690 can execute the user input. The post-NLU ranker 665 may then cause the system to solicit the user for an indication that the system is permitted to cause the transactional skill 690 to execute the user input. The user-provided indication may be an audible indication or a tactile indication (e.g., activation of a virtual button or input of text via a virtual keyboard). In response to receiving the user-provided indication, the system may provide the transactional skill 690 with data corresponding to the indication. In response, the transactional skill 690 may execute the command (e.g., book a flight, book a train ticket, etc.). Thus, while the system may not further engage an informational skill 690 after the informational skill 690 provides the post-NLU ranker 665 with result data 1030, the system may further engage a transactional skill 690 after the transactional skill 690 provides the post-NLU ranker 665 with result data 1030 indicating the transactional skill 690 may execute the user input.

In some instances, the post-NLU ranker 665 may generate respective scores for first and second skills that are too close (e.g., are not different by at least a threshold difference) for the post-NLU ranker 665 to make a confident determination regarding which skill should execute the user input. When this occurs, the system may request the user indicate which skill the user prefers to execute the user input. The system may output TTS-generated speech to the user to solicit which skill the user wants to execute the user input.

Figure 13:
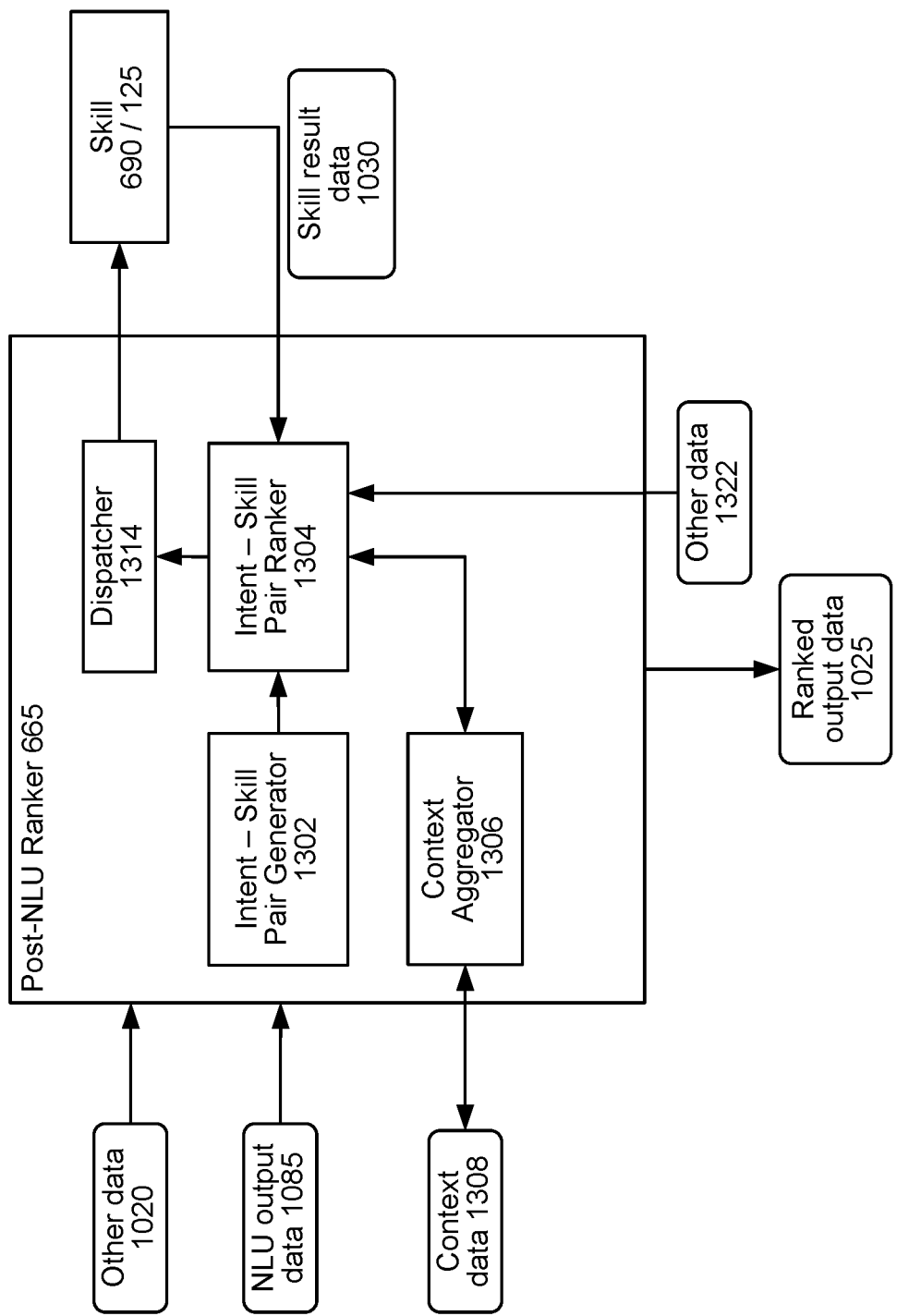
FIG. 13 is a conceptual diagram illustrating how a post-NLU ranker may process according to embodiments of the present disclosure.

FIG. 13 illustrates other configurations and operations of the post-NLU ranker 665. When the post-NLU ranker 665 receives NLU results data 1085, the NLU results data 1085 may be sent to an intent-skill pair generator 1302. The intent-skill pair generator 1302 may include information about what skills are capable of handling what intents. Such information may be context agnostic, and may thus indicate what skills are capable of handling what intents generally, without regard to the context associated with the user input. The intent-skill pair generator 1302 thus receives the NLU results data 1085 and identifies what particular candidate skills may handle the intent for NLU hypothesis. For example, if a NLU hypothesis includes a particular intent, the intent-skill pair generator 1302 identifies each skill that may execute with respect to the intent. For further example, if the NLU results data 1085 include multiple NLU hypotheses including multiple intents, the intent-skill pair generator 1302 associates each different NLU hypothesis with each skill that may execute with respect to the NLU hypothesis. As illustrated, the intent-skill pair generator 1302 may be implemented at part of the post-NLU ranker 665. However, one skill in the art will appreciate that the intent-skill pair generator 1302 may be implemented as part of the NLU component 660 or in another component without departing from the present disclosure. In such a case, the NLU results data 1085 may include intent-skill pairs.

The post-NLU ranker 665 may also include an intent-skill pair ranker 1304. The intent-skill pair ranker 1304 ranks the intent-skill pairs generated by the intent-skill pair generator 1302 based on, for example, the number of filled slots of a NLU hypothesis, an NLU confidence score associated with a NLU hypothesis, context information output by a context aggregator 1306, and/or other data.

The post-NLU ranker 665 may include the context aggregator 1306. The context aggregator 1306 receives context data 1308 from various contextual sources. The context data 1308 may include time data, which represents a time of receipt of the user input by the device 110, a time or receipt of the user input by the system(s) 120, a user identifier associated with the user input, a device identifier of the device 110, whether other devices are linked to the device 110, and/or other information. The context aggregator 1306 may aggregate the context data 1308 and put the context data 1308 in a form that can be processed by the intent-skill pair ranker 1304. Context data 1308 may include data obtained from the device 110 or from other services connected to the system(s) 120.

The context data 1308 may include skill availability data. Such information may indicate what skills are available and authorized to process the user input. For example, if the user has only enabled certain skills, the enabled skills may be noted in the skill availability data.

The context data 1308 may also include dialogue data. A "dialogue" or "dialogue session" as used herein may refer to data transmissions (such as relating to multiple user inputs and system(s) 120 outputs) between the system(s) 120 and a local device (e.g., the device 110) that all relate to a single originating user input. Thus, the data transmissions of a dialogue session may share a dialogue identifier or other unique identifier that may be used by the orchestrator component 630, skill(s) 690, skill system(s) 125, etc. to track information across the dialogue session. For example, the device 110 may send the system(s) 120 data corresponding to "Alexa, play jeopardy." The system(s) 120 may output data corresponding to a jeopardy statement to the device 110 for output to a user(s). A user may then respond to the statement, which the device 110 sends as data to the system(s) 120. The sending of data from the device 110 to the system(s) 120 and the sending of data from the system(s) 120 to the device 110 may all correspond to a single dialogue session related to the originating user input "play jeopardy." In some examples, a dialogue-initiating user input may start with a wakeword and end with a command, such as "Alexa, play jeopardy," where "Alexa" is the wakeword and "play jeopardy" is the command. Subsequent user inputs of the same dialogue session may or may not start with speaking of a wakeword. Each user input of a dialogue may be associated with a unique user input identifier such that multiple user input identifiers may be associated with a single dialogue session identifier.

Dialogue data may include interactive focus information, (e.g., representing which skill was most recently invoked to execute a previous user input for the user and/or device 110 associated with the present user input). Dialogue data may also include content focus information (e.g., representing a skill that is streaming data to the device 110 when the data corresponding to the current user input is received by the system(s) 120). The context data 1308 may be one portion of the data used by the intent-skill pair ranker 1304 to determine which skill should execute the current user input. Thus, unlike certain systems that use interactive focus and content focus as binary determinations regarding which skill should execute a current user input, the presently disclosed architecture considers focus along with other data, thereby minimizing disproportionate routing.

The context data 1308 may also include device data. Device data may indicate characteristics of the device 110 from which the user input was received. For example, such data may include information such as display capabilities of the device, a quality of one or more speakers of the device, a device type, etc. Certain capabilities of a solo device or group of devices may be stored with the system and looked up during a particular interaction to determine if a device/group of devices can handle a go-back request. Device data may also represent a skill with which the device 110 is associated. The device data may also indicate whether the device 110 is currently streaming data or was streaming data when the user input was received and sent to the system(s) 120. The context data 1308 (and/or other data 1322) may include a metadata flag/indicator that represents whether the particular skill being executed is one that can handle a go-back (or other navigational) request.

The context data 1308 may also include user profile data. The user profile data may represent preferences and/or characteristics of the user that originated the current user input. Such data may be received from the profile storage 670.

The context data 1308 may also include location data. The location data may represent a location of the device 110 from which the user input was received.

The context data 1308 may also include anaphora data. Anaphora data may be data used to resolve anaphora, exophora, or other references (like pronouns such as he, she, etc.) to entities that are not explicitly named in a user input. The anaphora data may include entity identifiers or other information used to resolve anaphoric references in a user input.

For example, while interacting with the system, the user may refer to an entity involved in a previous exchange in a manner that is not explicit. For example, after the system answers the Starbucks query with the location of the nearest Starbucks, the user may wish to know the hours for that Starbucks and may ask the system "how late are they open?" Even though the user did not explicitly state what "they" refers to, the user may expect the system to provide the hours (or the closing time) of the Starbucks that was just part of an exchange between the user and the system. In another example, after asking the system to "play Beethoven's $5^{th}$ Symphony" the user may ask the system "when did he write that?" In order to answer the second query, the system must understand that "he" refers to Beethoven and "that" refers to the musical work $5^{th}$ Symphony. Words that refer to an entity but do not explicitly name the entity are an example of anaphora, namely a word referring to or replacing another word.

Other references to other text may also be processed by the system. For example, exophora is a reference in text to something external to the text, endophora is a reference to something preceding or following the reference within the text, and cataphora is a reference to a following word or group or words. The system may be configured to process these, and other similar types of references (which may generally be referred to below as anaphora). Further, while a language such as English may use unknown words to substitute for anaphora/(e.g., pronouns), other languages, such as Japanese may allow phrasing of anaphora without a specific word to represent the anaphora (referred to as zero-phrase anaphora), and other languages may use other forms of reference. The present system may be used to resolve many such forms of anaphora across many different languages.

The context data 1308 may also include data regarding whether one or more skills are "in focus." A skill may be in interactive focus, meaning the skill was the most recent skill that executed a user input for a user or device associated with a present user input and/or the skill may be involved with an open dialogue (e.g., series of user inputs and responses) with a user device. Interactive focus attempts to continue a conversation between a user and the system and/or a skill for purposes of processing the dialogue. However, there may be instances where a user inputs a command that may be handled by a skill that is currently in interactive focus, but which the user does not intend to be executed by such skill. The system may process the context data 1308 and other data to determine how best to process a user input when one or more skills may be in focus.

A skill may alternatively be in content focus, meaning the skill is associated with content that is streaming to the user and/or device associated with a current user input when the current user input is received by the system. For example, a previous user input of "Play music" may result in the system streaming music to a device from a specific music skill. While the skill is streaming the music, the same user may input a second user input. Since the second user input was received when the music skill was streaming the music, the system may query that music skill in the first instance, even if the second user input is not necessarily intended for the music skill. The music skill may be configured to attempt to execute the subsequent user input (and potentially output an error) even though the user may have intended another skill to execute such user input.

The context data 1308 may also include other context data not explicitly recited herein.

The intent-skill pair ranker 1304 may operate one or more trained models that are configured to process the NLU results data 1085, skill result data 1030, and other data 1322 in order to determine a single best skill for executing the current user input from the available pairs output by the intent-skill pair generator 1302. The intent-skill pair ranker 1304 may send queries to the skills and request a first skill and a second skill (for example the candidate skills identified by the pair generator 1302), to provide potential result data indicating whether the skill can handle the intent at the particular moment and if so, what the output data for the particular skill would be (e.g., data the skill would provide to a user if the skill were selected to execute the user input) based on the NLU results data 1085. For example, the intent-skill pair ranker 1304 may send a first NLU hypothesis, associated with a first skill, to the first skill along with a request for the first skill to at least partially execute with respect to the first NLU hypothesis. The intent-skill pair ranker 1304 may also send a second NLU hypothesis, associated with the second skill, to the second skill along with a request for the second skill to at least partially execute with respect to the second NLU hypothesis. The intent-skill pair ranker 1304 receives, from the first skill, first result data 1030 generated from the first skill's execution with respect to the first NLU hypothesis. The intent-skill pair ranker 1304 also receives, from the second skill, second results data 1030 generated from the second skill's execution with respect to the second NLU hypothesis. Based on the first results data 1030, a first NLU confidence score associated with the first NLU hypothesis, the second results data 1030, a second NLU confidence score associated with the second NLU hypothesis, and other data 1322 (e.g., context data, user profile data, etc.), the intent-skill pair ranker 1304 determines the best skill for executing the current user input. The intent-skill pair ranker 1304 sends an indication of the best skill to a dispatcher component 1314.

The dispatcher component 1314 may then send the selected skill the information needed to execute the user input, including an indication of the intent, the appropriate context data 1308 (such as device identifier, user identifier, or the like), slot data, utterance identifier, dialogue identifier, or any other information needed.

One or more models implemented by components of the orchestrator component 630, post-NLU ranker 665, shortlister component 950, or other component may be trained and operated according to various machine learning techniques.

The device 110 and/or the system(s) 120 may include a user recognition component 695 that recognizes one or more users using a variety of data. As illustrated in FIG. 11, the user recognition component 695 may include one or more subcomponents including a vision component 1108, an audio component 1110, a biometric component 1112, a radio frequency (RF) component 1114, a machine learning (ML) component 1116, and a recognition confidence component 1118. In some instances, the user recognition component 695 may monitor data and determinations from one or more subcomponents to determine an identity of one or more users associated with data input to the device 110 and/or the system(s) 120. The user recognition component 695 may output user recognition data 1195, which may include a user identifier associated with a user the user recognition component 695 determines originated data input to the device 110 and/or the system(s) 120. The user recognition data 1195 may be used to inform processes performed by various components of the device 110 and/or the system(s) 120.

The vision component 1108 may receive data from one or more sensors capable of providing images (e.g., cameras) or sensors indicating motion (e.g., motion sensors). The vision component 1108 can perform facial recognition or image analysis to determine an identity of a user and to associate that identity with a user profile associated with the user. In some instances, when a user is facing a camera, the vision component 1108 may perform facial recognition and identify the user with a high degree of confidence. In other instances, the vision component 1108 may have a low degree of confidence of an identity of a user, and the user recognition component 695 may utilize determinations from additional components to determine an identity of a user. The vision component 1108 can be used in conjunction with other components to determine an identity of a user. For example, the user recognition component 695 may use data from the vision component 1108 with data from the audio component 1110 to identify what user's face appears to be speaking at the same time audio is captured by a device 110 the user is facing for purposes of identifying a user who spoke an input to the device 110 and/or the system(s) 120.

The overall system of the present disclosure may include biometric sensors that transmit data to the biometric component 1112. For example, the biometric component 1112 may receive data corresponding to fingerprints, iris or retina scans, thermal scans, weights of users, a size of a user, pressure (e.g., within floor sensors), etc., and may determine a biometric profile corresponding to a user. The biometric component 1112 may distinguish between a user and sound from a television, for example. Thus, the biometric component 1112 may incorporate biometric information into a confidence level for determining an identity of a user. Biometric information output by the biometric component 1112 can be associated with specific user profile data such that the biometric information uniquely identifies a user profile of a user.

The radio frequency (RF) component 1114 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 1114 the strength of the signal (e.g., as a received signal strength indication (RSSI)). The RF component 1114 may use the RSSI to determine an identity of a user (with an associated confidence level). In some instances, the RF component 1114 may determine that a received RF signal is associated with a mobile device that is associated with a particular user identifier.

In some instances, a personal device (such as a phone, tablet, wearable or other device) may include some RF or other detection processing capabilities so that a user who speaks an input may scan, tap, or otherwise acknowledge his/her personal device to the device 110. In this manner, the user may "register" with the system 100 for purposes of the system 100 determining who spoke a particular input. Such a registration may occur prior to, during, or after speaking of an input.

The ML component 1116 may track the behavior of various users as a factor in determining a confidence level of the identity of the user. By way of example, a user may adhere to a regular schedule such that the user is at a first location during the day (e.g., at work or at school). In this example, the ML component 1116 would factor in past behavior and/or trends in determining the identity of the user that provided input to the device 110 and/or the system(s) 120. Thus, the ML component 1116 may use historical data and/or usage patterns over time to increase or decrease a confidence level of an identity of a user.

In at least some instances, the recognition confidence component 1118 receives determinations from the various components 1108, 1110, 1112, 1114, and 1116, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 1195.

The audio component 1110 may receive data from one or more sensors capable of providing an audio signal (e.g., one or more microphones) to facilitate recognition of a user. The audio component 1110 may perform audio recognition on an audio signal to determine an identity of the user and associated user identifier. In some instances, aspects of device 110 and/or the system(s) 120 may be configured at a computing device (e.g., a local server). Thus, in some instances, the audio component 1110 operating on a computing device may analyze all sound to facilitate recognition of a user. In some instances, the audio component 1110 may perform voice recognition to determine an identity of a user.

The audio component 1110 may also perform user identification based on audio data 611 input into the device 110 and/or the system(s) 120 for speech processing. The audio component 1110 may determine scores indicating whether speech in the audio data 611 originated from particular users. For example, a first score may indicate a likelihood that speech in the audio data 611 originated from a first user associated with a first user identifier, a second score may indicate a likelihood that speech in the audio data 611 originated from a second user associated with a second user identifier, etc. The audio component 1110 may perform user recognition by comparing speech characteristics represented in the audio data 611 to stored speech characteristics of users (e.g., stored voice profiles associated with the device 110 that captured the spoken user input).

Figure 12:
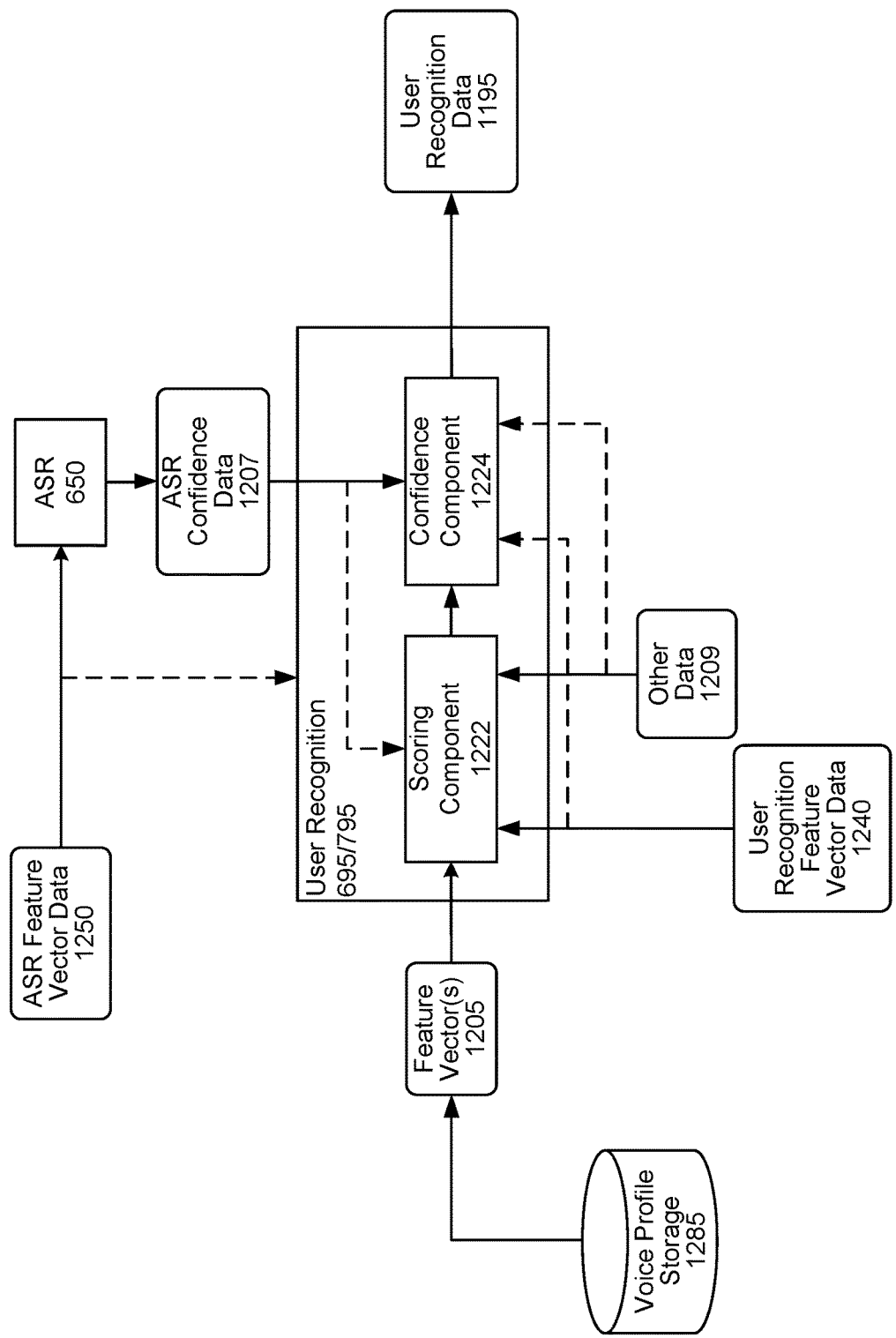
FIG. 12 is a system flow diagram illustrating an example of speech-based user recognition processing, according to embodiments of the present disclosure.

FIG. 12 illustrates user recognition processing as may be performed by the user recognition component 695. The ASR component 650 performs ASR processing on ASR feature vector data 1250. ASR confidence data 1207 may be passed to the user recognition component 695.

The user recognition component 695 performs user recognition using various data including the user recognition feature vector data 1240, feature vectors 1205 representing voice profiles of users of the system 100, the ASR confidence data 1207, and other data 1209. The user recognition component 695 may output the user recognition data 1195, which reflects a certain confidence that the user input was spoken by one or more particular users. The user recognition data 1195 may include one or more user identifiers (e.g., corresponding to one or more voice profiles). Each user identifier in the user recognition data 1195 may be associated with a respective confidence value, representing a likelihood that the user input corresponds to the user identifier. A confidence value may be a numeric or binned value.

The feature vector(s) 1205 input to the user recognition component 695 may correspond to one or more voice profiles. The user recognition component 695 may use the feature vector(s) 1205 to compare against the user recognition feature vector 1240, representing the present user input, to determine whether the user recognition feature vector 1240 corresponds to one or more of the feature vectors 1205 of the voice profiles. Each feature vector 1205 may be the same size as the user recognition feature vector 1240.

To perform user recognition, the user recognition component 695 may determine the device 110 from which the audio data 611 originated. For example, the audio data 611 may be associated with metadata including a device identifier representing the device 110. Either the device 110 or the system(s) 120 may generate the metadata. The system 100 may determine a group profile identifier associated with the device identifier, may determine user identifiers associated with the group profile identifier, and may include the group profile identifier and/or the user identifiers in the metadata. The system 100 may associate the metadata with the user recognition feature vector 1240 produced from the audio data 611. The user recognition component 695 may send a signal to voice profile storage 1285, with the signal requesting only audio data and/or feature vectors 1205 (depending on whether audio data and/or corresponding feature vectors are stored) associated with the device identifier, the group profile identifier, and/or the user identifiers represented in the metadata. This limits the universe of possible feature vectors 1205 the user recognition component 695 considers at runtime and thus decreases the amount of time to perform user recognition processing by decreasing the amount of feature vectors 1205 needed to be processed. Alternatively, the user recognition component 695 may access all (or some other subset of) the audio data and/or feature vectors 1205 available to the user recognition component 695. However, accessing all audio data and/or feature vectors 1205 will likely increase the amount of time needed to perform user recognition processing based on the magnitude of audio data and/or feature vectors 1205 to be processed.

If the user recognition component 695 receives audio data from the voice profile storage 1285, the user recognition component 695 may generate one or more feature vectors 1205 corresponding to the received audio data.

The user recognition component 695 may attempt to identify the user that spoke the speech represented in the audio data 611 by comparing the user recognition feature vector 1240 to the feature vector(s) 1205. The user recognition component 695 may include a scoring component 1222 that determines respective scores indicating whether the user input (represented by the user recognition feature vector 1240) was spoken by one or more particular users (represented by the feature vector(s) 1205). The user recognition component 695 may also include a confidence component 1224 that determines an overall accuracy of user recognition processing (such as those of the scoring component 1222) and/or an individual confidence value with respect to each user potentially identified by the scoring component 1222. The output from the scoring component 1222 may include a different confidence value for each received feature vector 1205. For example, the output may include a first confidence value for a first feature vector 1205 (representing a first voice profile), a second confidence value for a second feature vector 1205 (representing a second voice profile), etc. Although illustrated as two separate components, the scoring component 1222 and the confidence component 1224 may be combined into a single component or may be separated into more than two components.

The scoring component 1222 and the confidence component 1224 may implement one or more trained machine learning models (such as neural networks, classifiers, etc.) as known in the art. For example, the scoring component 1222 may use probabilistic linear discriminant analysis (PLDA)

techniques. PLDA scoring determines how likely it is that the user recognition feature vector 1240 corresponds to a particular feature vector 1205. The PLDA scoring may generate a confidence value for each feature vector 1205 considered and may output a list of confidence values associated with respective user identifiers. The scoring component 1222 may also use other techniques, such as GMMs, generative Bayesian models, or the like, to determine confidence values.

The confidence component 1224 may input various data including information about the ASR confidence 1207, speech length (e.g., number of frames or other measured length of the user input), audio condition/quality data (such as signal-to-interference data or other metric data), fingerprint data, image data, or other factors to consider how confident the user recognition component 695 is with regard to the confidence values linking users to the user input. The confidence component 1224 may also consider the confidence values and associated identifiers output by the scoring component 1222. For example, the confidence component 1224 may determine that a lower ASR confidence 1207, or poor audio quality, or other factors, may result in a lower confidence of the user recognition component 695. Whereas a higher ASR confidence 1207, or better audio quality, or other factors, may result in a higher confidence of the user recognition component 695. Precise determination of the confidence may depend on configuration and training of the confidence component 1224 and the model(s) implemented thereby. The confidence component 1224 may operate using a number of different machine learning models/techniques such as GMM, neural networks, etc. For example, the confidence component 1224 may be a classifier configured to map a score output by the scoring component 1222 to a confidence value.

The user recognition component 695 may output user recognition data 1195 specific to a one or more user identifiers. For example, the user recognition component 695 may output user recognition data 1195 with respect to each received feature vector 1205. The user recognition data 1195 may include numeric confidence values (e.g., 0.0-1.0, 0-1000, or whatever scale the system is configured to operate). Thus, the user recognition data 1195 may output an n-best list of potential users with numeric confidence values (e.g., user identifier 123-0.2, user identifier 234-0.8). Alternatively or in addition, the user recognition data 1195 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user recognition component 695 may output an n-best list of user identifiers with binned confidence values (e.g., user identifier 123-low, user identifier 234-high). Combined binned and numeric confidence value outputs are also possible. Rather than a list of identifiers and their respective confidence values, the user recognition data 1195 may only include information related to the top scoring identifier as determined by the user recognition component 695. The user recognition component 695 may also output an overall confidence value that the individual confidence values are correct, where the overall confidence value indicates how confident the user recognition component 695 is in the output results. The confidence component 1224 may determine the overall confidence value.

The confidence component 1224 may determine differences between individual confidence values when determining the user recognition data 1195. For example, if a difference between a first confidence value and a second confidence value is large, and the first confidence value is above a threshold confidence value, then the user recognition component 695 is able to recognize a first user (associated with the feature vector 1205 associated with the first confidence value) as the user that spoke the user input with a higher confidence than if the difference between the confidence values were smaller.

The user recognition component 695 may perform thresholding to avoid incorrect user recognition data 1195 being output. For example, the user recognition component 695 may compare a confidence value output by the confidence component 1224 to a threshold confidence value. If the confidence value does not satisfy (e.g., does not meet or exceed) the threshold confidence value, the user recognition component 695 may not output user recognition data 1195, or may only include in that data 1195 an indicator that a user that spoke the user input could not be recognized. Further, the user recognition component 695 may not output user recognition data 1195 until enough user recognition feature vector data 1240 is accumulated and processed to verify a user above a threshold confidence value. Thus, the user recognition component 695 may wait until a sufficient threshold quantity of audio data of the user input has been processed before outputting user recognition data 1195. The quantity of received audio data may also be considered by the confidence component 1224.

The user recognition component 695 may be defaulted to output binned (e.g., low, medium, high) user recognition confidence values. However, such may be problematic in certain situations. For example, if the user recognition component 695 computes a single binned confidence value for multiple feature vectors 1205, the system may not be able to determine which particular user originated the user input. In this situation, the user recognition component 695 may override its default setting and output numeric confidence values. This enables the system to determine a user, associated with the highest numeric confidence value, originated the user input.

The user recognition component 695 may use other data 1209 to inform user recognition processing. A trained model(s) or other component of the user recognition component 695 may be trained to take other data 1209 as an input feature when performing user recognition processing. Other data 1209 may include a variety of data types depending on system configuration and may be made available from other sensors, devices, or storage. The other data 1209 may include a time of day at which the audio data 611 was generated by the device 110 or received from the device 110, a day of a week in which the audio data audio data 611 was generated by the device 110 or received from the device 110, etc.

The other data 1209 may include image data or video data. For example, facial recognition may be performed on image data or video data received from the device 110 from which the audio data 611 was received (or another device). Facial recognition may be performed by the user recognition component 695. The output of facial recognition processing may be used by the user recognition component 695. That is, facial recognition output data may be used in conjunction with the comparison of the user recognition feature vector 1240 and one or more feature vectors 1205 to perform more accurate user recognition processing.

The other data 1209 may include location data of the device 110. The location data may be specific to a building within which the device 110 is located. For example, if the device 110 is located in user A's bedroom, such location may increase a user recognition confidence value associated with user A and/or decrease a user recognition confidence value associated with user B.

The other data 1209 may include data indicating a type of the device 110. Different types of devices may include, for example, a smart watch, a smart phone, a tablet, and a vehicle. The type of the device 110 may be indicated in a profile associated with the device 110. For example, if the device 110 from which the audio data 611 was received is a smart watch or vehicle belonging to a user A, the fact that the device 110 belongs to user A may increase a user recognition confidence value associated with user A and/or decrease a user recognition confidence value associated with user B.

The other data 1209 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the vehicle generated the audio data 611. As such, if the vehicle is located at a coordinate corresponding to a work location/building of user A, such may increase a user recognition confidence value associated with user A and/or decrease user recognition confidence values of all other users indicated in a group profile associated with the vehicle. A profile associated with the device 110 may indicate global coordinates and associated locations (e.g., work, home, etc.). One or more user profiles may also or alternatively indicate the global coordinates.

The other data 1209 may include data representing activity of a particular user that may be useful in performing user recognition processing. For example, a user may have recently entered a code to disable a home security alarm. A device 110, represented in a group profile associated with the home, may have generated the audio data 611. The other data 1209 may reflect signals from the home security alarm about the disabling user, time of disabling, etc. If a mobile device (such as a smart phone, Tile, dongle, or other device) known to be associated with a particular user is detected proximate to (for example physically close to, connected to the same Wi-Fi network as, or otherwise nearby) the device 110, this may be reflected in the other data 1209 and considered by the user recognition component 695.

Depending on system configuration, the other data 1209 may be configured to be included in the user recognition feature vector data 1240 so that all the data relating to the user input to be processed by the scoring component 1222 may be included in a single feature vector. Alternatively, the other data 1209 may be reflected in one or more different data structures to be processed by the scoring component 1222.

Figure 14:
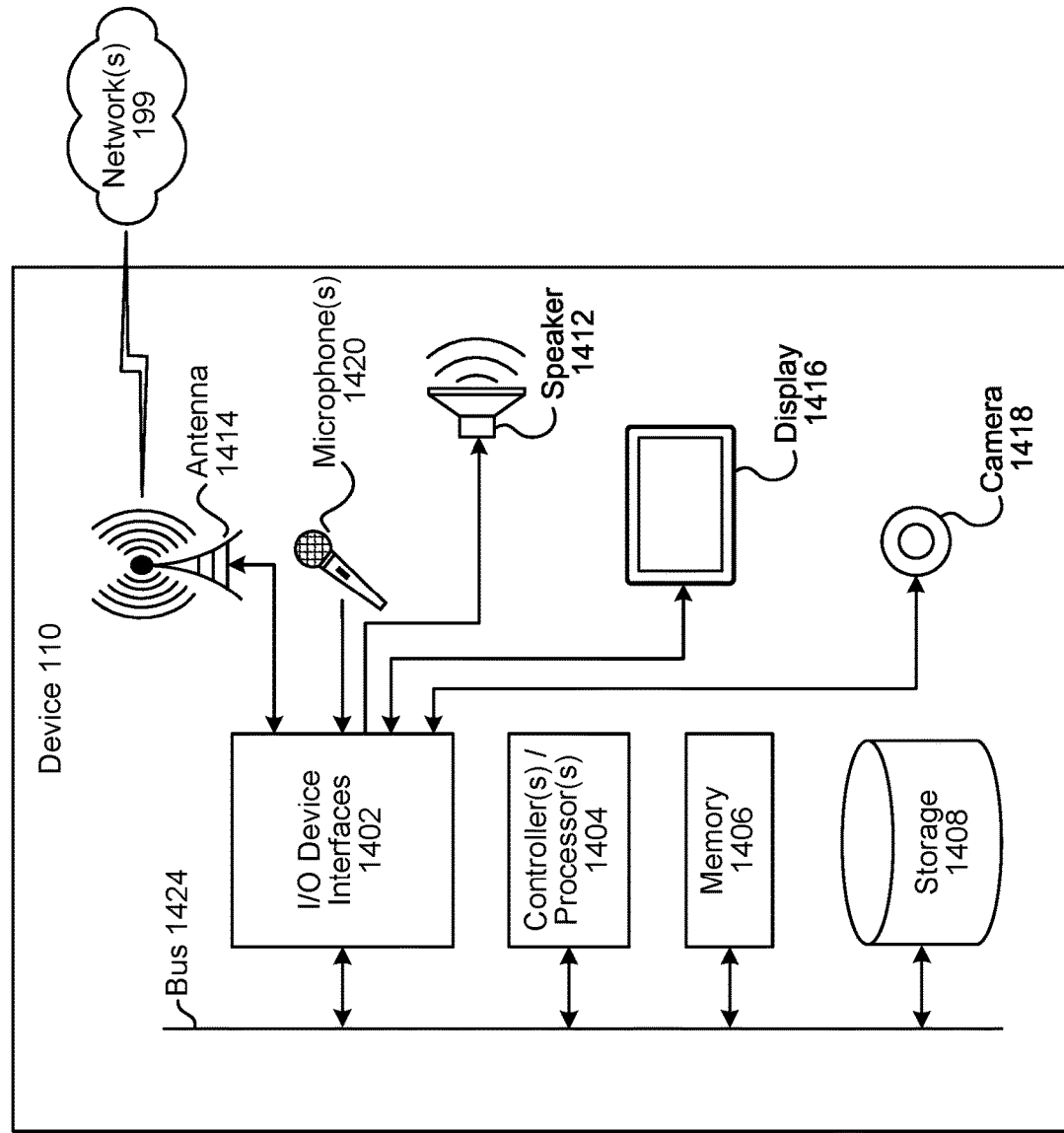
FIG. 14 is a block diagram conceptually illustrating example components of a device, according to embodiments of the present disclosure.
Figure 15:
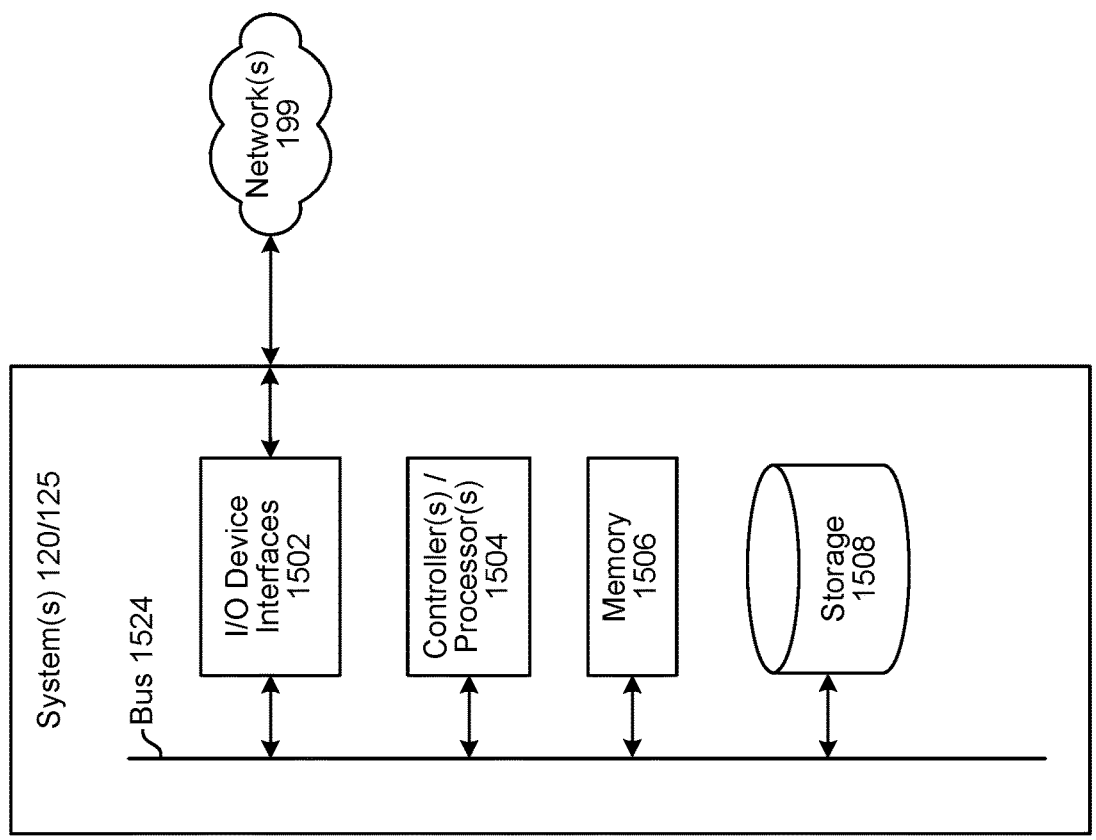
FIG. 15 is a block diagram conceptually illustrating example components of a system, according to embodiments of the present disclosure.

FIG. 14 is a block diagram conceptually illustrating a device 110 that may be used with the system. FIG. 15 is a block diagram conceptually illustrating example components of a remote device, such as the natural language command processing system 120, which may assist with ASR processing, NLU processing, etc., and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/system 120 may be located remotely from the device 110 as its operations may not require proximity to the user. The server/system 120 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). One benefit to the server/system 120 being in a user's home/business is that data used to process a command/return a response may be kept within the user's home, thus reducing potential privacy concerns.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (1404/1504), which may each include a central processing unit (CPU) for processing data and computer-readable instructions, and a memory (1406/1506) for storing data and instructions of the respective device. The memories (1406/1506) may individually include volatile random access memory (RAM), non-volatile read only memory (ROM), non-volatile magnetoresistive memory (MRAM), and/or other types of memory. Each device (110/120/125) may also include a data storage component (1408/1508) for storing data and controller/processor-executable instructions. Each data storage component (1408/1508) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1402/1502).

Computer instructions for operating each device (110/120/125) and its various components may be executed by the respective device's controller(s)/processor(s) (1404/1504), using the memory (1406/1506) as temporary "working" storage at runtime. A device's computer instructions may be stored in a non-transitory manner in non-volatile memory (1406/1506), storage (1408/1508), or an external device(s). Alternatively, some or all of the executable instructions may be embedded in hardware or firmware on the respective device in addition to or instead of software.

Each device (110/120/125) includes input/output device interfaces (1402/1502). A variety of components may be connected through the input/output device interfaces (1402/

1502), as will be discussed further below. Additionally, each device (110/120/125) may include an address/data bus (1424/1524) for conveying data among components of the respective device. Each component within a device (110/120/125) may also be directly connected to other components in addition to (or instead of) being connected to other components across the bus (1424/1524).

Referring to FIG. 14, the device 110 may include input/output device interfaces 1402 that connect to a variety of components such as an audio output component such as a speaker 1412, a wired headset or a wireless headset (not illustrated), or other component capable of outputting audio. The device 110 may also include an audio capture component. The audio capture component may be, for example, a microphone 1420 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1416 for displaying content. The device 110 may further include a camera 1418.

Via antenna(s) 1414, the input/output device interfaces 1402 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1402/1502) may also include communication components that allow data to be exchanged between devices such as different physical servers in a collection of servers or other components.

The components of the device(s) 110, the natural language command processing system 120, or a skill system 125 may include their own dedicated processors, memory, and/or storage. Alternatively, one or more of the components of the device(s) 110, the natural language command processing system 120, or a skill system 125 may utilize the I/O interfaces (1402/1502), processor(s) (1404/1504), memory (1406/1506), and/or storage (1408/1508) of the device(s) 110, natural language command processing system 120, or the skill system 125, respectively. Thus, the ASR component 650 may have its own I/O interface(s), processor(s), memory, and/or storage; the NLU component 660 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and a skill system 125, as described herein, are illustrative, and may be located as a stand-alone device or may be included, in whole or in part, as a component of a larger device or system. As can be appreciated, a number of components may exist either on a system 120 and/or on device 110. For example, language processing 692/792 (which may include ASR 650/750), language output 693/793 (which may include NLG 679/779 and TTS 680/780), etc., for example as illustrated in FIGS. 6 and 7. Unless expressly noted otherwise, the system version of such components may operate similarly to the device version of such components and thus the description of one version (e.g., the system version or the local version) applies to the description of the other version (e.g., the local version or system version) and vice-versa.

Figure 16:
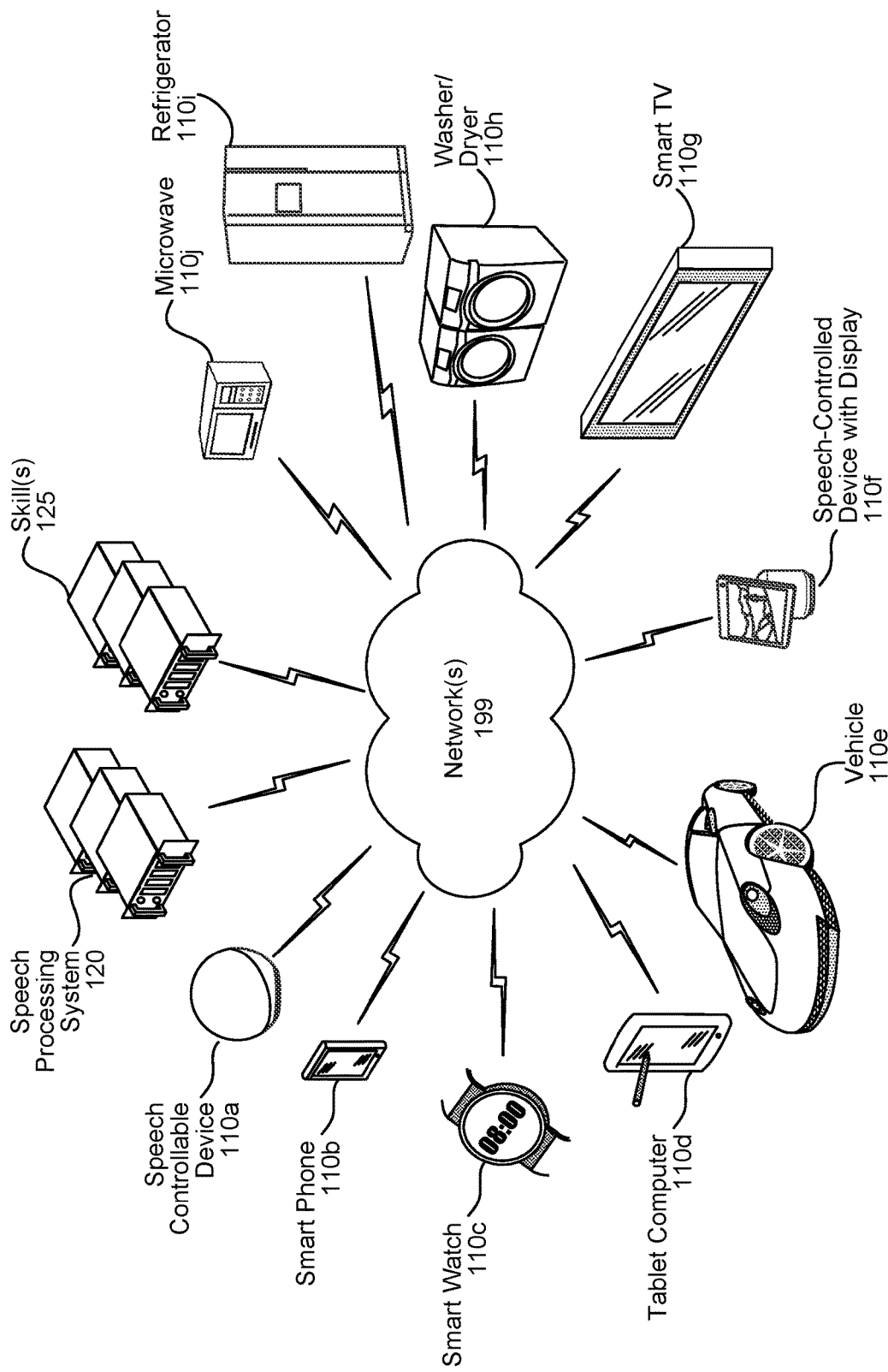
FIG. 16 illustrates an example of a computer network for use with the overall system, according to embodiments of the present disclosure.

As illustrated in FIG. 16, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, etc. (e.g., a device such as a FireTV stick, Echo Auto or the like) may be connected to the network(s) 199 through a wireless service provider, over a Wi-Fi or cellular network connection, or the like. Other devices are included as network-connected support devices, such as the natural language command processing system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 650, the NLU component 660, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
    receiving, by an orchestrator component of a speech processing system, first natural language understanding (NLU) output data corresponding to a first utterance;
    receiving, by the orchestrator component, a first user profile identifier corresponding to the first utterance;
    determining, using first metadata associated with the first NLU output data, that the first NLU output data is based at least in part on first automatic speech recognition (ASR) output data, the first ASR output data corresponding to a first version of ASR output data;
    determining, using second metadata associated with the first user profile identifier, that the first user profile identifier is based at least in part on second ASR output data, the second ASR output data corresponding to a second version of the ASR output data;
    determining that the first NLU output data and the first user profile identifier are to be used in a first computing operation;
    determining, based at least in part on the first metadata and the second metadata that the first ASR output data is different from the second ASR output data; and
    based at least in part on determining that the first ASR output data is different from the second ASR output data, ceasing processing corresponding to the first computing operation with respect to the first NLU output data and the first user profile identifier.

2. The computer-implemented method of claim 1, further comprising:
    receiving, by the orchestrator component, second NLU output data corresponding to a second utterance;
    receiving, by the orchestrator component, first data representing a user presence;
    receiving, by the orchestrator component, a second user profile identifier corresponding to the second utterance;
    determining, using third metadata associated with the second NLU output data, that the second NLU output data is based at least in part on third ASR output data, the third ASR output data corresponding to a third version of ASR output data;
    determining, using fourth metadata associated with the first data, that the first data is based at least in part on first user presence data, the first user presence data corresponding to a first version of user presence data;
    determining, using fifth metadata associated with the second user profile identifier, that the second user profile identifier is based at least in part on fourth ASR output data, the fourth ASR output data corresponding to a fourth version of ASR output data;
    determining that the second NLU output data, the first data, and the second user profile identifier are to be used in a second computing operation;
    determining, based at least in part on the third metadata and the fifth metadata that the third ASR output data is different from the second ASR output data;
    based at least in part on determining the third ASR output data is different from the fourth ASR output data, ceasing processing corresponding to the second computing operation with respect to the second NLU output data and the second user profile identifier; and
    using the first data to perform at least partial processing corresponding to the second computing operation.

3. The computer-implemented method of claim 1, further comprising:
    receiving, by the orchestrator component, second NLU output data corresponding to a second utterance;
    receiving third metadata indicating that the second NLU output data is based at least in part on a third version of ASR output data;
    determining that the second NLU output data is to be used in a second computing operation;
    performing, by the orchestrator component, the second computing operation to output first data;
    generating fourth metadata indicating that the first data is based at least in part on the second NLU output data and the third ASR output data; and
    sending, to a first component of the speech processing system, the first data and the fourth metadata.

4. The computer-implemented method of claim 1, further comprising:
    receiving, by the orchestrator component, second NLU output data corresponding to a second utterance;
    receiving, by the orchestrator component, a second user profile identifier corresponding to the second utterance;
    determining, using third metadata associated with the second NLU output data, that the second NLU output data is based at least in part on third ASR output data, the third ASR output data corresponding to a third version of ASR output data;
    determining, using fourth metadata associated with the second user profile identifier, that the second user profile identifier is based at least in part on fourth ASR output data, the fourth ASR output data corresponding to a fourth version of ASR output data;
    determining that the second NLU output data and the second user profile identifier are to be used in a second computing operation;
    determining a score representing a similarity between the third ASR output data and the fourth ASR output data;
    determining that the score fails to satisfy a condition; and based at least in part on the score failing to satisfy the condition, performing the second computing operation using the second NLU output data.

5. A computer-implemented method, comprising:
receiving, by a first component, first data for use in a first operation;
receiving, by the first component, second data for use in the first operation;
determining, using first metadata associated with the first data, that the first data is based at least in part on third data corresponding to a first version of data of a first data type;
determining, using second metadata associated with the second data, that the second data is based at least in part on fourth data corresponding to a second version of the data of the first data type;
determining that the first version is different from the second version; and
based at least in part on determining that the first version is different from the second version, ceasing processing corresponding to the first operation with respect to the first data and the second data.

6. The computer-implemented method of claim 5, wherein:
the first component corresponds to an orchestrator component of a speech processing system,
the first data corresponds to natural language understanding (NLU) results data,
the second data corresponds to user recognition data, and
the first data type corresponds to automatic speech recognition (ASR) results data.

7. The computer-implemented method of claim 5, further comprising:
receiving, by the first component, fifth data for use in a second operation;
receiving, by the first component, sixth data for use in the second operation;
determining, using third metadata associated with the fifth data, that the fifth data is based at least in part on seventh data corresponding to a first version of data of a second data type;
determining, using fourth metadata associated with the sixth data, that the sixth data is based at least in part on eighth data corresponding to a second version of data of the second data type, the second version of the data of the second data type being more recent than the first version of the data of the second data type;
determining that the first version of the data of the second data type and the second version of the data of the second data type are the same; and
based at least in part on determining that the first version of the data of the second data type is the same as the second version of the data of the second data type, ceasing processing with respect to the sixth data.

8. The computer-implemented method of claim 5, further comprising:
receiving, by the first component, fifth data for use in a second operation;
receiving, by the first component, sixth data for use in the second operation;
receiving, by the first component, seventh data for use in the second operation;
determining, using third metadata associated with the fifth data, that the fifth data is based at least in part on eighth data corresponding to a first version of data of a second data type;
determining, using fourth metadata associated with the sixth data, that the sixth data is based at least in part on ninth data corresponding to a first version of data of a third data type different from the data of the second data type;
determining, using fifth metadata associated with the seventh data, that the seventh data is based at least in part on tenth data corresponding to a second version of data of the second data type;
based at least in part on the first version of the data of the second data type being different from the second version of the data of the second data type, ceasing processing with respect to the fifth data and the seventh data; and
using the sixth data to perform at least partial processing with regard to the second operation.

9. The computer-implemented method of claim 5, comprising:
receiving, by the first component, fifth data for use in a second operation;
receiving third metadata indicating that the fifth data is based at least in part on sixth data;
performing, by the first component, the second operation to output seventh data;
generating fourth metadata indicating that the seventh data is based at least in part on the fifth data and the sixth data; and
sending, to a second component of a speech processing system, the seventh data and the fourth metadata.

10. The computer-implemented method of claim 5, further comprising:
receiving, by the first component, fifth data for use in a second operation;
receiving, by the first component, sixth data for use in the second operation;
determining, using third metadata associated with the fifth data, that the fifth data is based at least in part on sixth data corresponding to a first version of data of a second data type;
determining, using fourth metadata associated with the sixth data, that the sixth data is based at least in part on seventh data corresponding to a second version of data of the second data type;
determining a score representing a similarity between the sixth data and the seventh data;
determining that the score fails to satisfy a condition; and
based at least in part on the score failing to satisfy the condition, performing the second operation using the fifth data.

11. The computer-implemented method of claim 10, further comprising:
storing fifth metadata associated with the fifth data, the fifth metadata indicating that the fifth data is based at least in part on seventh data corresponding to the second version of the data of the second data type.

12. The computer-implemented method of claim 5, wherein:
determining that the first version is different from the second version based at least in part on the first version being generated during a first period of time and the second version being generated during a second period of time.

13. A system comprising:
at least one processor; and
at least one memory comprising instructions that, when executed by the at least one processor, cause the system to:

receive, by a first component, first data for use in a first operation;

receive, by the first component, second data for use in the first operation;

determine, using first metadata associated with the first data, that the first data is based at least in part on third data corresponding to a first version of data of a first data type;

determine, using second metadata associated with the second data, that the second data is based at least in part on fourth data corresponding to a second version of the data of the first data type;

determine that the first version is different from the second version; and based at least in part on determination that the first version is different from the second version, cease processing corresponding to the first operation with respect to the first data and the second data.

14. The system of claim 13, wherein:

the first component corresponds to an orchestrator component of a speech processing system, the first data corresponds to natural language understanding (NLU) results data, the second data corresponds to user recognition data, and the first data type corresponds to automatic speech recognition (ASR) results data.

15. The system of claim 13, wherein the at least one memory further includes instructions that, when executed by the at least one processor, further cause the system to:

receive, by the first component, fifth data for use in a second operation;

receive, by the first component, sixth data for use in the second operation;

determine, using third metadata associated with the fifth data, that the fifth data is based at least in part on seventh data corresponding to a first version of data of a second data type;

determine, using fourth metadata associated with the sixth data, that the sixth data is based at least in part on eighth data corresponding to a second version of data of the second data type, the second version of the data of the second data type being more recent than the first version of the data of the second data type;

determine that the first version of the data of the second data type and the second version of the data of the second data type are the same; and based at least in part on determining that the first version of the data of the second data type is the same as the second version of the data of the second data type, cease processing with respect to the sixth data.

16. The system of claim 13, wherein the at least one memory further includes instructions that, when executed by the at least one processor, further cause the system to:

receive, by the first component, fifth data for use in a second operation;

receive, by the first component, sixth data for use in the second operation;

receive, by the first component, seventh data for use in the second operation;

determine, using third metadata associated with the fifth data, that the fifth data is based at least in part on eighth data corresponding to a first version of data of a second data type;

determine, using fourth metadata associated with the sixth data, that the sixth data is based at least in part on ninth data corresponding to a first version of data of a third data type different from the data of the second data type;

determine, using fifth metadata associated with the seventh data, that the seventh data is based at least in part on tenth data corresponding to a second version of data of the second data type;

based at least in part on the determination that the first version of the data of the second data type being different from the second version of the data of the second data type, ceasing processing with respect to the fifth data and the seventh data; and use the sixth data to perform at least partial processing with regard to the second operation.

17. The system of claim 13, wherein the at least one memory further includes instructions that, when executed by the at least one processor, further cause the system to:

receive, by the first component, fifth data for use in a second operation;

receive third metadata indicating that the fifth data is based at least in part on sixth data;

perform, by the first component, the second operation to output seventh data;

generate fourth metadata indicating that the seventh data is based at least in part on the fifth data and the sixth data; and send, to a second component of a speech processing system, the seventh data and the fourth metadata.

18. The system of claim 13, wherein the at least one memory further includes instructions that, when executed by the at least one processor, further cause the system to:

receive, by the first component, fifth data for use in a second operation;

receive, by the first component, sixth data for use in the second operation;

determine, using third metadata associated with the fifth data, that the fifth data is based at least in part on sixth data corresponding to a first version of data of a second data type;

determine, using fourth metadata associated with the sixth data, that the sixth data is based at least in part on seventh data corresponding to a second version of data of the second data type;

determine a score representing a similarity between the sixth data and the seventh data;

determine that the score fails to satisfy a condition; and based at least in part on the determination that score fails to satisfy the condition, perform the second operation using the fifth data.

19. The system of claim 18, wherein the at least one memory further includes instructions that, when executed by the at least one processor, further cause the system to:

store fifth metadata associated with the fifth data, the fifth metadata indicating that the fifth data is based at least in part on seventh data corresponding to the second version of the data of the second data type.

20. The system of claim 13, wherein the determination that the first version is different from the second version is based at least in part on a determination that the first version was generated during a first period of time and the second version was generated during a second period of time.

* * * * *